US 11,654,641 B2
United States Patent
Ly et al.

(10) Patent No.: US 11,654,641 B2
(45) Date of Patent: May 23, 2023

(54) COMPOSITE PLY PLACEMENT SYSTEM AND METHOD

(71) Applicant: The Boeing Company, Chicago, IL (US)

(72) Inventors: Long Ly, Renton, WA (US); Scott Krajca, Seattle, WA (US); Darrell Jones, Mill Creek, WA (US); Chace Wilcoxson, Kent, WA (US); Mark Bunker, Seattle, WA (US); Joel Crain, Renton, WA (US); Keegan Chamberlain, Seattle, WA (US)

(73) Assignee: The Boeing Company, Arlington, VA (US)

(*) Notice: Subject to any disclaimer, the term of this patent is extended or adjusted under 35 U.S.C. 154(b) by 0 days.

(21) Appl. No.: 17/516,050

(22) Filed: Nov. 1, 2021

(65) Prior Publication Data
US 2022/0176650 A1 Jun. 9, 2022

Related U.S. Application Data

(60) Provisional application No. 63/199,095, filed on Dec. 7, 2020.

(51) Int. Cl.
*B32B 41/00* (2006.01)
*B29C 70/38* (2006.01)
*B29C 70/54* (2006.01)

(52) U.S. Cl.
CPC ............. *B29C 70/38* (2013.01); *B29C 70/54* (2013.01)

(58) Field of Classification Search
CPC ....... B29C 70/38; B29C 70/54; B29C 70/541; B29C 31/08; B65H 2701/172; B65H 2701/1938; B65H 5/10; B65H 5/14; B65H 5/04; B25J 9/026; B25J 15/0608; B25J 15/0616; B29L 2031/3076; B65G 47/92; B32B 37/00
(Continued)

(56) References Cited

U.S. PATENT DOCUMENTS 4,208,238 A   6/1980 August et al.
6,814,916 B2  11/2004 Willden et al.
(Continued)

FOREIGN PATENT DOCUMENTS

EP   0 448 557   10/1991
EP   0 511 937   11/1992

OTHER PUBLICATIONS

European Patent Office, Extended European Search Report, App. No. 21208618.5 (dated May 6, 2022).
(Continued)

*Primary Examiner* — Michael N Orlando
*Assistant Examiner* — Joshel Rivera
(74) *Attorney, Agent, or Firm* — Walters & Wasylyna LLC

(57) ABSTRACT

A system for placing a composite ply includes a transfer end effector that is movable relative to a carrier transfer device, configured to convey a ply carrier that supports the composite ply, and a placement end effector that is movable relative to the transfer end effector and to a forming tool. The transfer end effector is configured to remove the ply carrier, supporting the composite ply, from the carrier transfer device and to position the ply carrier for removal by the placement end effector. The placement end effector is configured to remove the ply carrier from the transfer end effector and to apply the composite ply to the forming tool.

21 Claims, 30 Drawing Sheets

(58) Field of Classification Search
USPC .................... 156/60, 64, 350, 351, 378, 379
See application file for complete search history.

(56) References Cited

U.S. PATENT DOCUMENTS

| | | |
|---|---|---|
| 7,118,370 B2 | 10/2006 | Willden et al. |
| 7,137,182 B2 | 11/2006 | Nelson |
| 7,651,650 B2 | 1/2010 | Willden et al. |
| 8,142,181 B2 | 3/2012 | Willden et al. |
| 8,236,222 B2 | 8/2012 | Henderson et al. |
| 8,336,596 B2 | 12/2012 | Nelson et al. |
| 8,578,995 B2 | 11/2013 | Nelson |
| 8,808,490 B2 | 8/2014 | Hagman et al. |
| 9,656,829 B2 | 5/2017 | Hagman et al. |
| 9,663,247 B2 | 5/2017 | Rotter et al. |
| 10,086,596 B2 | 10/2018 | Desjardien et al. |
| 10,456,960 B2 | 10/2019 | Chapman et al. |
| 10,688,697 B2 | 6/2020 | Sundquist et al. |
| 2016/0368226 A1 | 12/2016 | Encinosa et al. |
| 2019/0308377 A1 | 10/2019 | Petrovski et al. |
| 2020/0016797 A1 | 1/2020 | Chapman et al. |
| 2021/0107182 A1 | 4/2021 | Hopkins et al. |
| 2021/0107241 A1 | 4/2021 | Hopkins et al. |
| 2021/0107242 A1 | 4/2021 | Hopkins et al. |

OTHER PUBLICATIONS

R.O. Buckingham et al: "Automating the Manufacture of Composite Broadgoods," Elsevier Science Limited, Composites Part A, vol. 27A, No. 3 (Mar. 1, 1996).
Solvay: P720X Release film (Mar. 21, 2013).

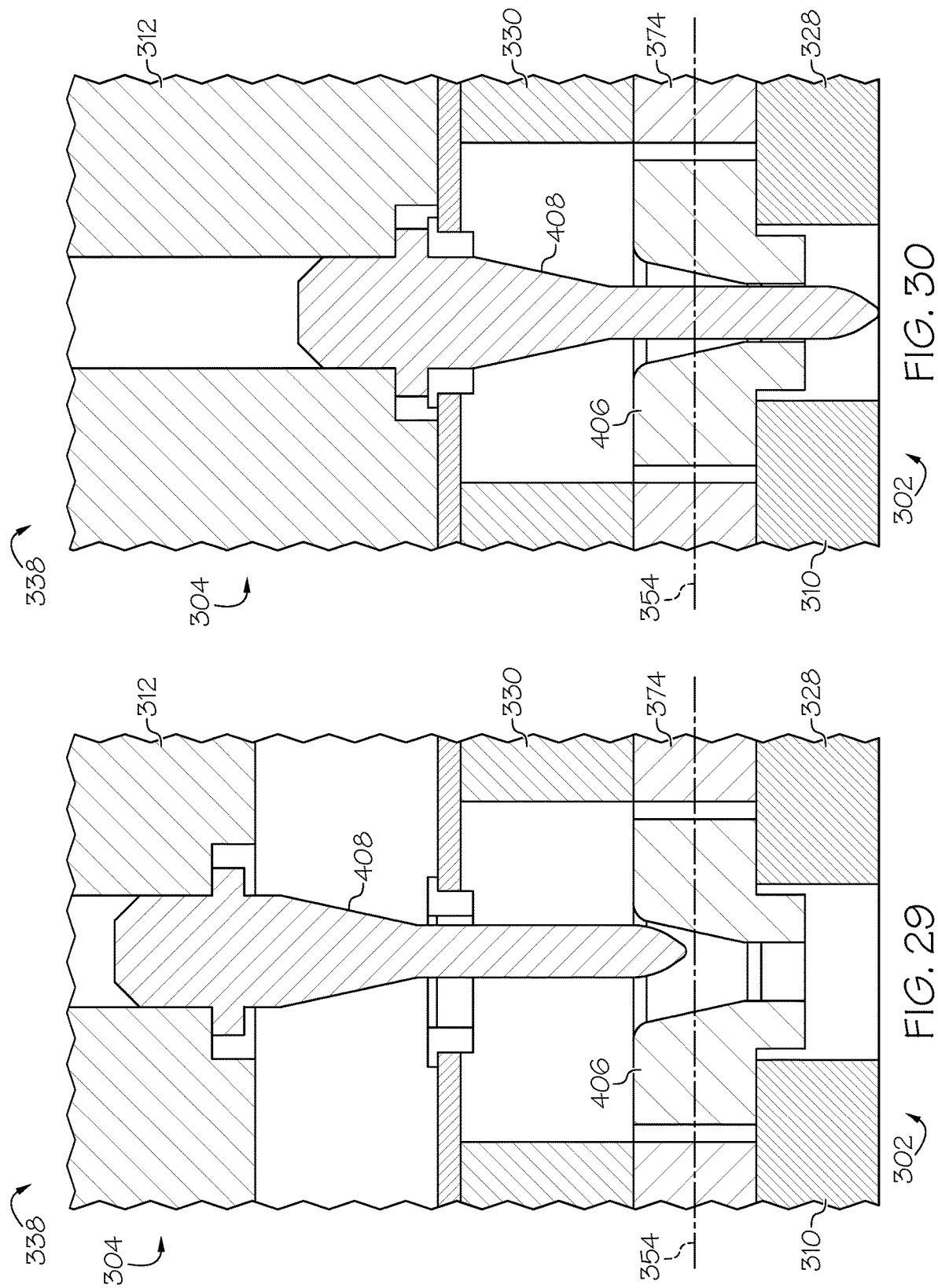

COMPOSITE PLY PLACEMENT SYSTEM AND METHOD

PRIORITY

This application claims priority from U.S. Ser. No. 63/199,095 filed on Dec. 7, 2020.

FIELD

The present disclosure relates generally to the manufacture of composite structures and, more particularly, to systems and methods that enable transfer and placement of composite plies during ply-by-ply formation of composite structures.

BACKGROUND

Formed composite structures are commonly used in applications where light weight and high strength are desired, such as in aircraft and vehicles. Often, these applications utilize contoured parts that must be formed and then cured. Conventional formation of composite structures, particularly relatively large composite structures or composite structures having a complex contour, requires extensive manual labor prior to curing. For example, composite fiber plies (e.g., pre-impregnated fiber plies or dry fabric) are laid by hand over a shaped forming tool or mandrel. The part is then cured, often by heating. The resulting part matches the shape of the forming tool. However, manual layup of the fiber plies is time consuming and laborious.

Some known composite manufacturing processes attempt to automate a portion of the formation operation. As an example, a drape forming process includes heating a laminate of pre-impregnated fiber plies ("composite charge") and forcing it around a mandrel with the use of a vacuum bag. However, this method has achieved limited success on thick laminates or structures with more complex shapes. As another example, a compactor may be used to compress the composite charge against a tool surface during fabrication. However, this method often requires supplemental manual formation after compaction when the tool surface and resulting structure is contoured. Accordingly, while such methods may be effective at forming relatively small and thin composite structures or composite structures with relatively simple shapes, they may be inefficient when applied to forming large composite structures or composite structures with more complex shapes.

Accordingly, those skilled in the art continue with research and development efforts in the field of composite manufacturing and, more particularly, to the manufacture of relatively large and/or relatively complex composite structures.

SUMMARY

Disclosed are examples of a system for placing a composite ply, an apparatus for transferring a composite ply, an apparatus for placing a composite ply and a method of placing a composite structure. The following is a non-exhaustive list of examples, which may or may not be claimed, of the subject matter according to the present disclosure.

In an example, the system includes a transfer end effector that is movable relative to a carrier transfer device, configured to convey a ply carrier that supports the composite ply, and a placement end effector that is movable relative to the transfer end effector and to a forming tool. The transfer end effector is configured to remove the ply carrier, supporting the composite ply, from the carrier transfer device and to position the ply carrier for removal by the placement end effector. The placement end effector is configured to remove the ply carrier from the transfer end effector and to apply the composite ply to the forming tool.

In an example, the transfer apparatus includes a magnetic chuck, including a magnetic-chuck support member, a magnet coupled to the magnetic-chuck support member, a magnetic-chuck pliable member coupled to the magnetic-chuck support member, and a magnetic-chuck actuator coupled to the magnetic-chuck support member and to the magnet. The magnetic-chuck pliable member is configured to contact a ply carrier, supporting a composite ply. The magnetic-chuck actuator is configured to selectively move the magnet relative to the magnetic-chuck support member and to the magnetic-chuck pliable member to magnetically engage or magnetically disengage the ply carrier.

In an example, the placement apparatus includes a vacuum chuck, including a vacuum table and a vacuum-chuck pliable member 358 coupled to the vacuum table 344. The vacuum-chuck pliable member is configured to contact a ply carrier, supporting a composite ply. The vacuum table is configured to selectively apply a retention vacuum to the ply carrier through the vacuum-chuck pliable member.

In an example, the method includes steps of: (1) magnetically engaging a ply carrier, supporting the composite ply; (2) reorienting the ply carrier; (3) applying a retention vacuum to the ply carrier; (4) magnetically disengaging the ply carrier; (5) applying the composite ply to a forming tool; (6) ceasing the retention vacuum to a select portion of the ply carrier; and (7) releasing the composite ply from the ply carrier.

Other examples of the disclosed system, apparatuses and method will become apparent from the following detailed description, the accompanying drawings, and the appended claims.

BRIEF DESCRIPTION OF THE DRAWINGS

FIG. 29 is a schematic, elevation view, in section, of a second indexing device, depicting alignment of the placement end effector with the transfer end effector;

FIG. 30 is a schematic, elevation view, in section, of the second indexing device shown in FIG. 29, depicting the placement end effector indexed with the transfer end effector;

DETAILED DESCRIPTION

Figure 1:
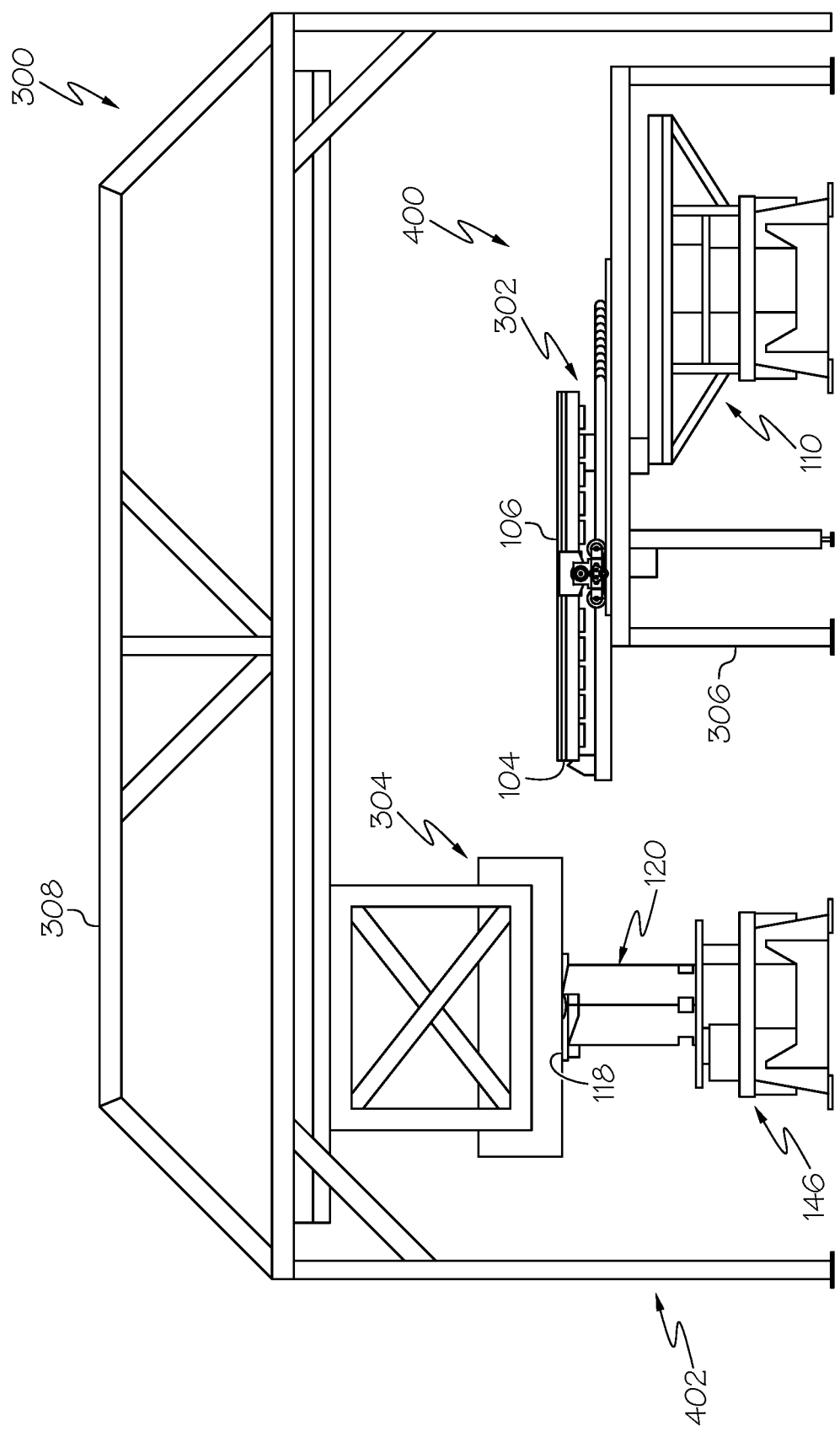
FIG. 1 is a schematic, elevation view of an example of a system for placing a composite ply.

The following detailed description refers to the accompanying drawings, which illustrate specific examples described by the present disclosure. Other examples having different structures and operations do not depart from the scope of the present disclosure. Like reference numerals may refer to the same feature, element, or component in the different drawings. Throughout the present disclosure, any one of a plurality of items may be referred to individually as the item and a plurality of items may be referred to collectively as the items and may be referred to with like reference numerals. Moreover, as used herein, a feature, element, component or step preceded with the word "a" or "an" should be understood as not excluding a plurality of features, elements, components or steps, unless such exclusion is explicitly recited.

Illustrative, non-exhaustive examples, which may be, but are not necessarily, claimed, of the subject matter according the present disclosure are provided below. Reference herein to "example" means that one or more feature, structure, element, component, characteristic, and/or operational step described in connection with the example is included in at least one aspect, embodiment, and/or implementation of the subject matter according to the present disclosure. Thus, the phrases "an example," "another example," "one or more examples," and similar language throughout the present disclosure may, but do not necessarily, refer to the same example. Further, the subject matter characterizing any one example may, but does not necessarily, include the subject matter characterizing any other example. Moreover, the subject matter characterizing any one example may be, but is not necessarily, combined with the subject matter characterizing any other example.

Referring to FIGS. 1-34, by way of examples, the present disclosure is directed to a system for placing a composite ply (referred to herein as "system" 300). Referring to FIG. 35, by way of examples, the present disclosure is also directed to a method of placing a composite ply (referred to herein as "method" 1200). Referring generally to FIGS. 1-35, the present disclosure is also directed to a method of transferring a composite ply using a transfer apparatus 400 and a method of placing a composite ply using a placement apparatus 402.

Examples of the system 300 and method 1200 enable automated fabrication of the composite structure 102 and, more particularly, automated transfer and placement of at least one composite ply 106 over a forming tool 120 for manufacture of the composite structure 102. Automation of the placement process can provide a reduction in processing time, a reduction in labor and costs, and/or a reduction of process variations (e.g., human error) that may lead to undesired inconsistencies in the finished composite structure as compared to conventional composite fabrication. In particular, the system 300 and method 1200 enable ply-by-ply application (e.g., layup) of composite material to fabricate the composite structure 102. Ply-by-ply application facilitates fabrication of large composite structures, thick composite structures and/or composite structures with complex shapes. Ply-by-ply application also can provide a reduction in buckling or wrinkling of plies within the composite structure as compared to conventional composite fabrication.

Generally, a composite ply (e.g., composite ply 106) includes a single ply (e.g., one layer of thickness) of composite material. The composite material may take the form of any one of various suitable types of composite material having any one of various ply angles. In one or more examples, the composite ply 106 is formed by laminating multiple courses of unidirectional composite tape, which is pre-impregnated with a resin matrix. Throughout the present disclosure, the phrase "the composite ply" refers to at least one ply of composite material, unless explicitly stated otherwise. The composite ply 106 may also be referred to as a composite patch or a composite charge.

Referring to FIGS. 1, 2 and 31-34, which schematically illustrate examples of the system 300. In one or more examples, the system 300 includes an apparatus for transferring a composite ply (referred to herein as the transfer apparatus 400) and an apparatus for placing the composite ply (referred to herein as the placement apparatus 402).

In one or more examples, the system 300 includes a transfer end effector 302. The transfer end effector 302 may be a component of, or may form a part of, the transfer apparatus 400. The transfer end effector 302 is movable relative to a carrier transfer device 110. The carrier transfer device 110 is configured to convey a ply carrier 104 that supports the composite ply 106. The system 300 also includes a placement end effector 304. The placement end effector 304 may be a component of, or may form a part of, the placement apparatus 402. The placement end effector 304 is movable relative to the transfer end effector 302 and to a forming tool 120. The transfer end effector 302 is configured to remove the ply carrier 104, supporting the composite ply 106, from the carrier transfer device 110 and to position the ply carrier 104 for removal by the placement end effector 304. The placement end effector 304 is configured to remove the ply carrier 104 from the transfer end effector 302 and to apply the composite ply 106 to the forming tool 120.

Figure 42:
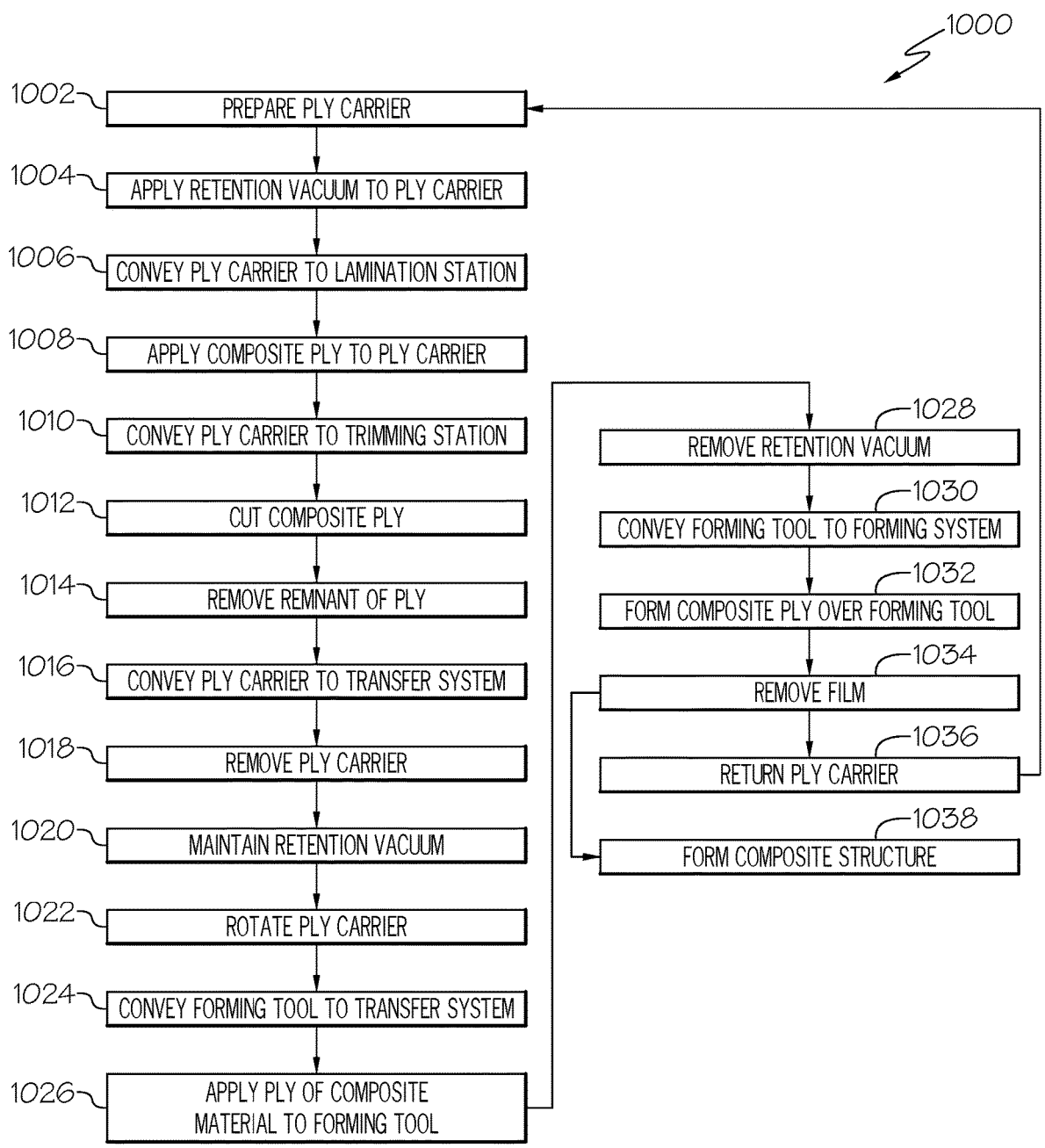
FIG. 42 is a flow diagram of an example of a method of fabricating a composite structure.

Referring briefly to FIG. 42, which schematically illustrates an example of the ply carrier 104 and a carrier transfer device 110. The ply carrier 104 is configured to receive the composite ply 106 thereon. For example, the ply carrier 104 includes a ply support surface 108. The ply support surface 108 is configured to support the composite ply 106. Once at least one composite ply 106 is formed on the ply carrier 104, the ply carrier 104 facilitates sequential conveyance of the composite ply 106 through the system 300.

Figure 2:
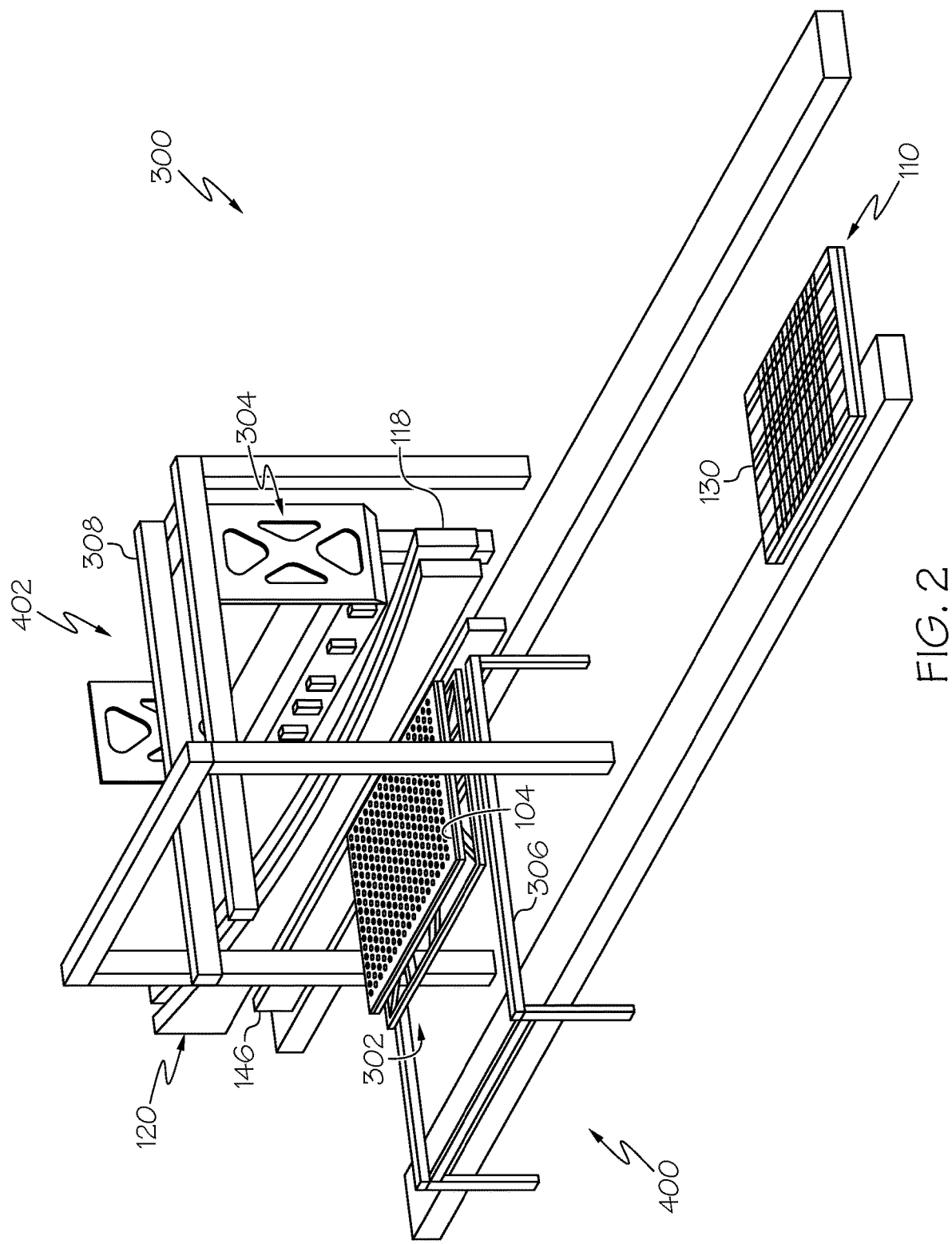
FIG. 2 is a schematic, perspective view of an example of the system.

In one or more examples, the system 300 includes the carrier transfer device 110. The carrier transfer device 110 is configured to convey the ply carrier 104. For example, the carrier transfer device 110 includes, or takes the form of, a mobile platform that supports the ply carrier 104 and moves the ply carrier 104 into position relative to the transfer apparatus 400 and/or the transfer end effector 302, as illustrated in FIGS. 1 and 2.

In one or more examples, the ply carrier 104 includes a base plate 124 and a film 126 that is positioned on the base plate 124. In these examples, the film 126 forms the ply support surface 108. In other examples, the ply carrier 104 may not include the film 126. In these examples, the base plate 124 forms the ply support surface 108.

The base plate 124 provides a support structure for fabrication of the composite ply 106. Generally, the base plate 124 is relatively thin and substantially planar or at least has a substantially planar surface to which the film 126 is coupled or that forms the ply support surface 108. In one or more examples, the base plate 124 is made of a flexible material. In one or more examples, the base plate 124 is made of a resilient material. The base plate 124 facilities transfer and application of the composite ply 106 to the forming tool 120. In one or more examples, the base plate 124 is capable of deforming during application (e.g., stamping) of the composite ply 106 to the forming tool 120 and then returning to its original (e.g., substantially planar) shape. Thus, in production, the base plate 124 is reusable for application of a number of composite plies 106, thereby reducing equipment and material costs.

In one or more examples, the base plate 124 is made of a metallic material. As an example, the base plate 124 includes, or takes the form of, a metal sheet, such as a sheet of spring steel. In other examples, the base plate 124 may be made of any other suitable material. In one or more examples, the base plate 124 is made of a material that is sufficiently flexible and resilient to enable contouring of the base plate 124 during application of the composite ply 106 to the forming tool 120.

The film 126 provides a contact surface onto which the composite ply 106 is supported. In one or more examples, composite material is laid up on the film 126 during fabrication of the composite ply 106. Generally, the film 126 is a relatively thin and flexible sheet of material that covers the base plate 124. The film 126 facilities fabrication of the composite ply 106 and application and formation of the composite ply 106 over the forming tool 120. The film 126 provides a work surface to which the composite ply 106 is formed and/or temporarily held. The film 126 is capable of deforming during application and formation of the composite ply 106 over the forming tool 120. The film 126 is also capable of being removed from the composite ply 106, after formation of the composite ply 106 over the forming tool 120.

Generally, the film 126 has surface properties that enable the composite ply 106 to temporarily adhere to the film 126 via the resin matrix, thereby retaining the composite ply 106 on the ply support surface 108 but enabling the film 126 to be removed from the composite ply 106 after formation of the composite ply 106 over the forming tool 120. The film 126 also provides protection to the composite ply 106 during application of the composite ply 106 to the forming tool 120 and formation of the composite ply 106 over the forming tool 120. The film 126 further provides stability to the composite ply 106.

In one or more examples, the film 126 is made of a plastic material, such as a thermoplastic material. As an example, the film 126 includes, or takes the form of, a sheet of polyethylene, such as a sheet of yellow poly. In one or more examples, the film 126 is made of fluorinated ethylene propylene (FEP) or ethylene tetrafluoroethylene (ETFE). In one or more examples, the film 126 is a release film, such as a polyester release film, with high modulus and low elongation that provide a substantially flat contact surface that is compatible with most resin systems and adhesives. In one or more examples, the film 126 is made of a metallic foil. In other examples, the film 126 may be made of any other suitable material.

In one or more examples, the film 126 may be treated to alter the physical and/or chemical properties of the material and/or the surface of the film 126. As an example, the film 126, such as the plastic material, such as the polyethylene, may be heat-treated. As another example, the film 126, such as the plastic material, such as the polyethylene, may be Corona-treated. As another example, the film 126 may be heat-treated and Corona-treated.

The film 126 is releasably coupled to the base plate 124 prior to application of the composite ply 106 on the ply support surface 108. The film 126 remains coupled to the base plate 124 during transfer of the composite ply 106 and during application of the composite ply 106 to the forming tool 120. The film 126 is released from the base plate 124 after application of the composite ply 106 to the forming tool 120.

Referring now to FIGS. 3-11, which schematically illustrate examples of the transfer apparatus 400 and the transfer end effector 302. In one or more examples, the base plate 124 is magnetic. The transfer end effector 302 includes a magnetic chuck 310. The magnetic chuck 310 is configured to magnetically engage the base plate 124 for removal of the ply carrier 104 from the carrier transfer device 110 by the transfer end effector 302. The magnetic chuck 310 is further configured to magnetically disengage the base plate 124 for removal of the ply carrier 104 from the transfer end effector 302 by the placement end effector 304.

Figure 3:
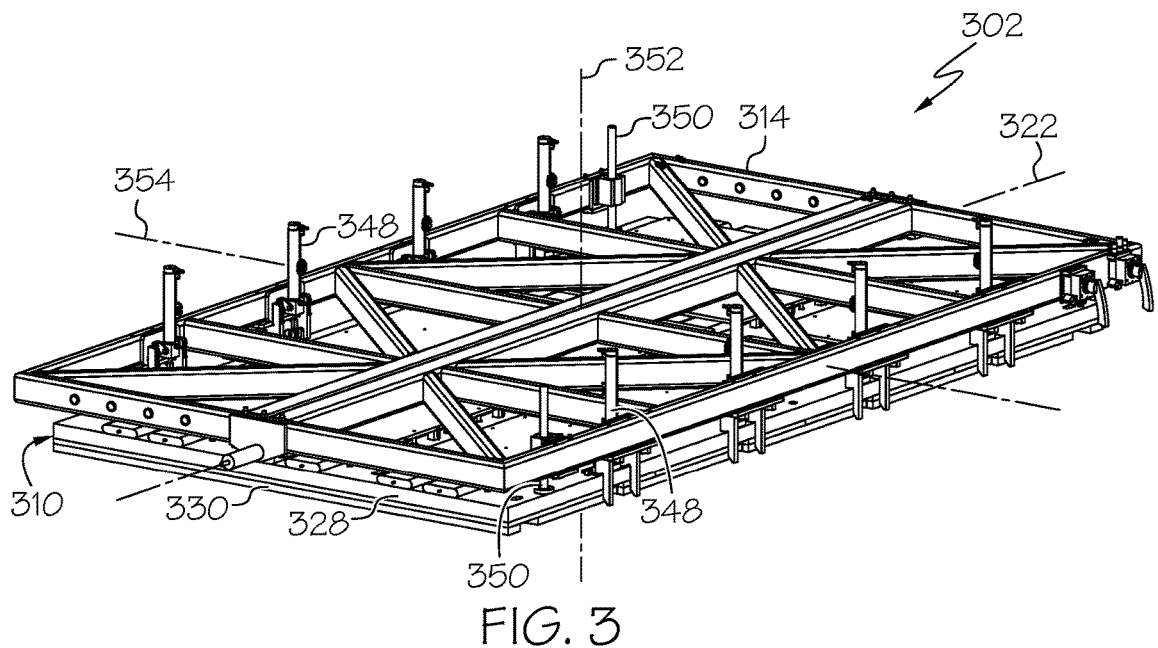
FIG. 3 is a schematic, perspective view of an example of a transfer end effector of the system.
Figure 4:
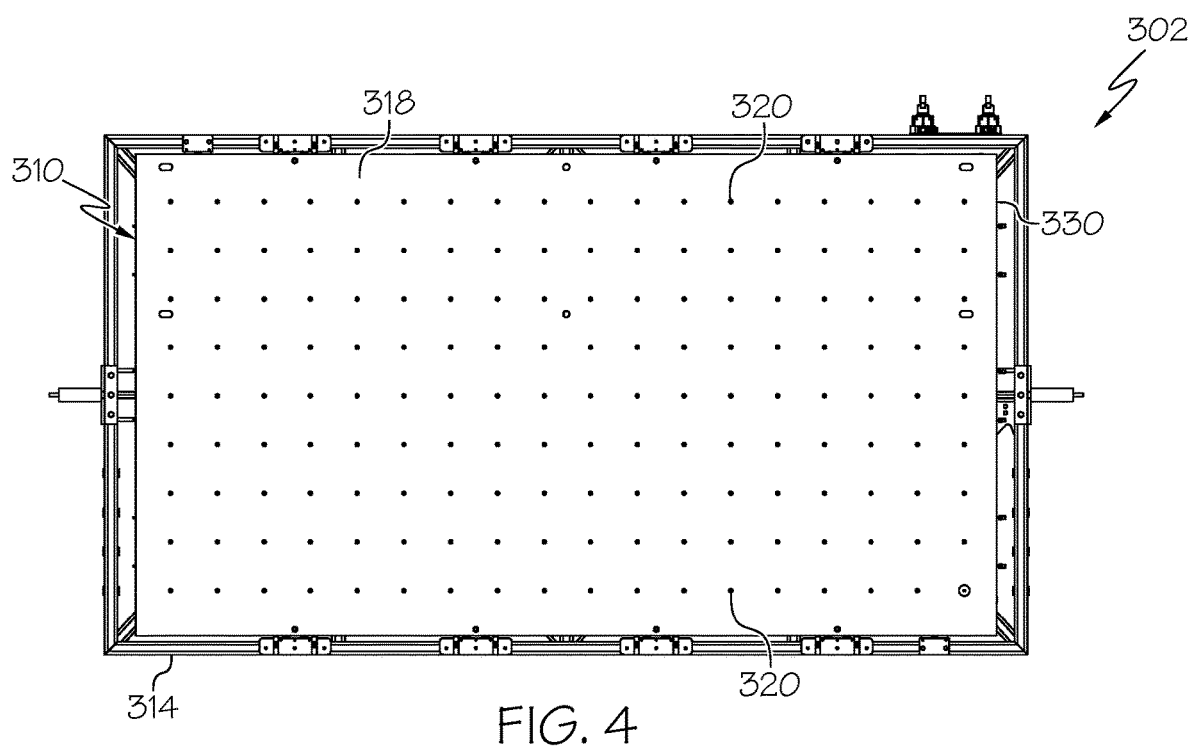
FIG. 4 is a schematic, plan view of an example of a transfer end effector.
Figure 5:
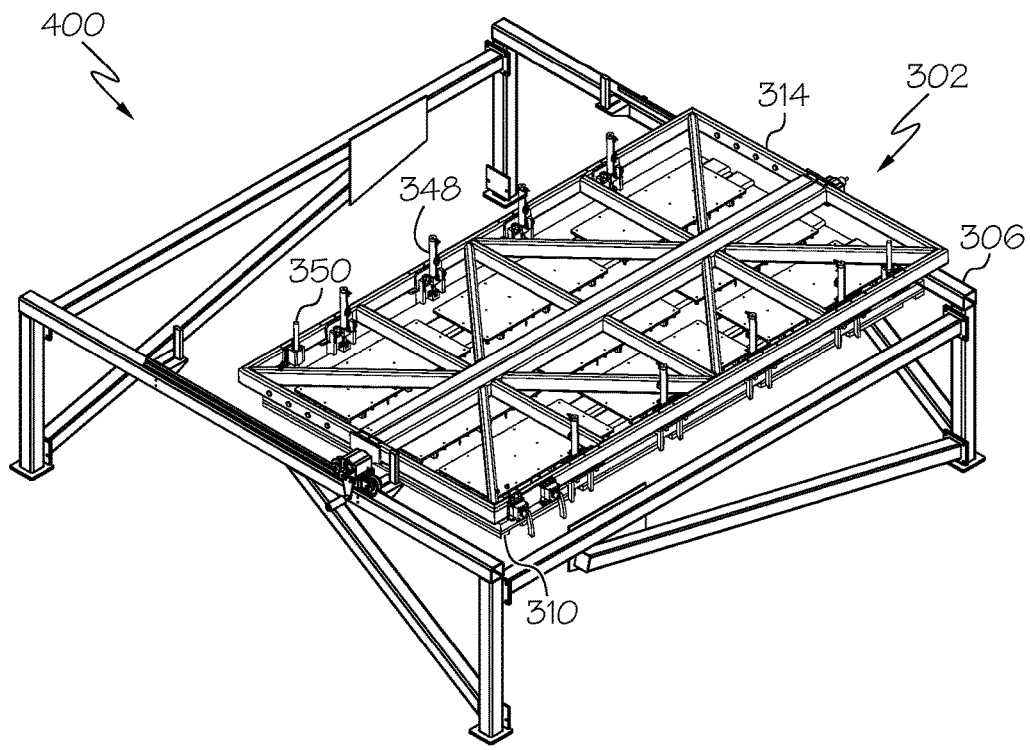
FIG. 5 is a schematic, perspective view on an example of a transfer apparatus, depicting the transfer end effector in a pick-up orientation.
Figure 6:
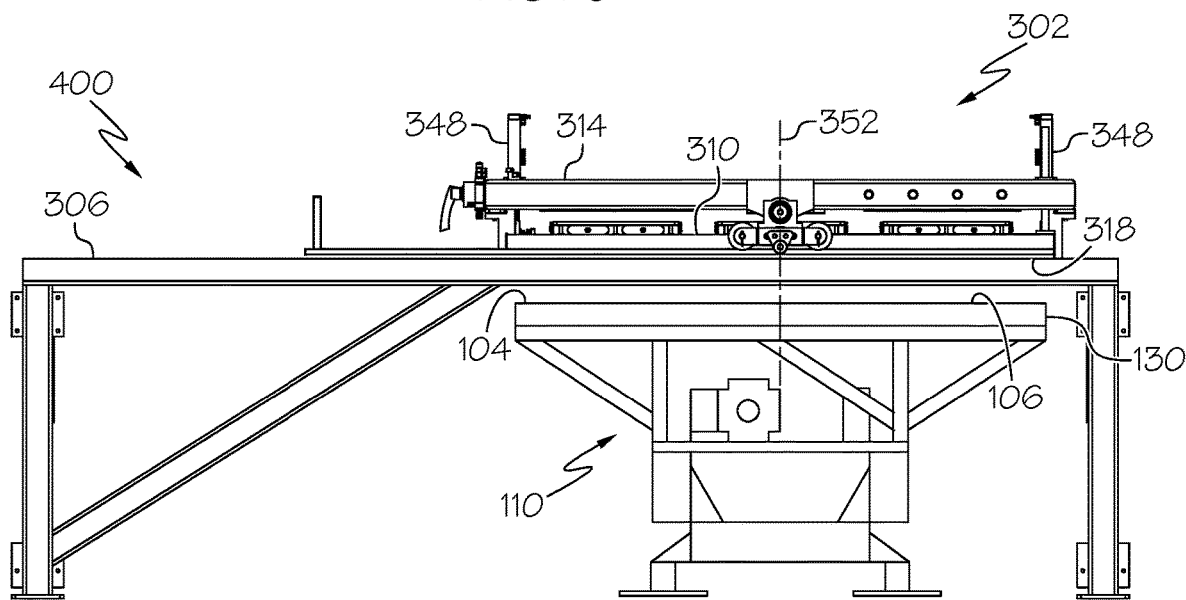
FIG. 6 is a schematic, elevation view of an example of the transfer apparatus and a carrier transfer device of the system, depicting the transfer end effector in the pick-up orientation.
Figure 7:
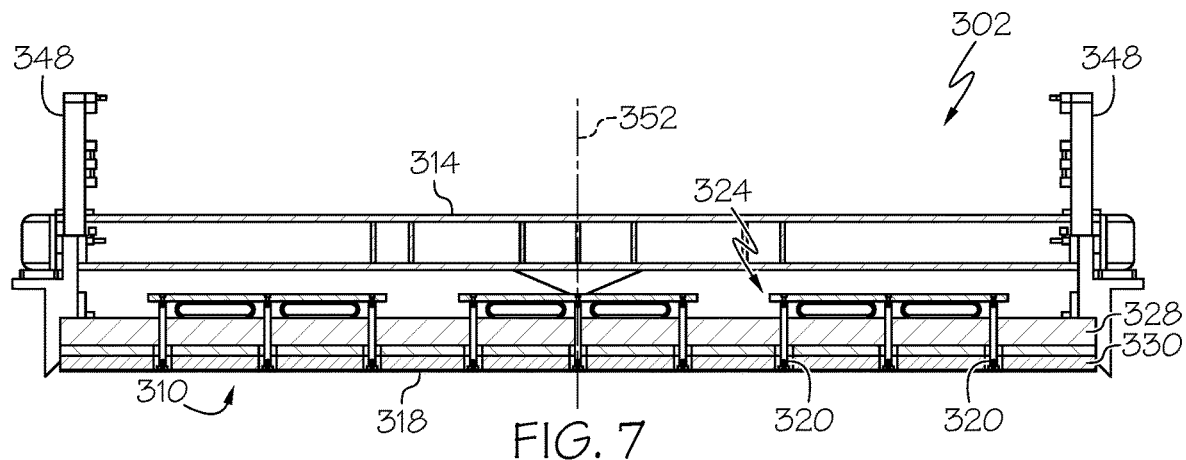
FIG. 7 is a schematic, elevation view of an example of the transfer end effector.

As best illustrated in FIGS. 3-7, in one or more examples, the transfer end effector 302 includes a transfer frame 314. The magnetic chuck 310 is coupled to the transfer frame 314. The magnetic chuck 310 includes a magnetic-chuck contact surface 318 (FIGS. 4, 6 and 7). The magnetic chuck 310 is movable relative to the transfer frame 314 to position the magnetic-chuck contact surface 318 in contact with the composite ply 106, supported by the ply carrier 104, for removal of the ply carrier 104 from the carrier transfer device 110 by the transfer end effector 302 (e.g., as shown in FIG. 6).

The transfer frame 314 may include any rigid structure, formed by one or more structural and/or nonstructural frame members. The transfer frame 314 provides support to the magnetic chuck 310. The transfer end effector 302 may also include one or more joints, couplings and drive components (e.g., motors, actuators, etc.) configured to move the magnetic chuck 310 in one or more linear directions relative to the transfer frame 314.

As best illustrated in FIGS. 3 and 5-7, in one or more examples, the transfer end effector 302 includes a transfer actuator 348. The transfer actuator 348 is coupled to the transfer frame 314 and to the magnetic chuck 310. The transfer actuator 348 is configured to selectively drive and control movement of the magnetic chuck 310 relative to the transfer frame 314 along a first movement axis 352 (FIGS. 3 and 6). In one or more examples, the transfer end effector 302 includes a plurality of transfer actuators 348, for example, located around a perimeter of the transfer frame 314 and the magnetic chuck 310.

The transfer actuators 348 may include any one of various suitable types of selectively controlled actuators. In one or more examples, the transfer actuators 348 may include, or take the form of, linear actuators, such as pneumatic actuators, electro-mechanical actuators and the like.

In one or more examples, the transfer end effector 302 also includes a transfer guide 350. The transfer guide 350 is coupled to the transfer frame 314 and to the magnetic chuck 310. The transfer guide 350 is configured to direct and assist linear movement of the magnetic chuck 310 along the first movement axis 352.

As best illustrated in FIG. 6, in one or more examples, movement of the magnetic chuck 310 relative to the transfer frame 314 along the first movement axis 352 in a first direction (e.g., downward) places the magnetic-chuck contact surface 318 in contact with the composite ply 106, supported by the ply carrier 104, for magnetic engagement with the ply carrier 104. Movement of the magnetic chuck 310 relative to the transfer frame 314 along the first movement axis 352 in a second direction, opposite to the first direction, (e.g., upward) moves the magnetic-chuck contact surface 318, magnetically engaged with the ply carrier 104, away from the carrier transfer device 110 for removal of the ply carrier 104 from the carrier transfer device 110.

As illustrated in FIGS. 5, 6, 10, 11 and 31-34, in one or more examples, the system 300 includes a transfer support platform 306. The transfer support platform 306 may be a component of, or may form a part of, the transfer apparatus 400. The transfer frame 314 of the transfer end effector 302 is coupled to the transfer support platform 306. The transfer end effector 302 is rotatable about a rotation axis 322 (FIGS. 3 and 10) relative to the transfer support platform 306 to position the ply carrier 104 for removal from the transfer end effector 302 by the placement end effector 304.

The transfer support platform 306 may include any rigid structure, formed by one or more structural and/or nonstructural frame members. The transfer support platform 306 may also include one or more joints, couplings and drive components (e.g., motors, actuators, etc.) configured to move the transfer end effector 302 in one or more linear directions and/or orient the transfer end effector 302 in a plurality of rotational orientations relative to the transfer support platform 306.

Figure 8:
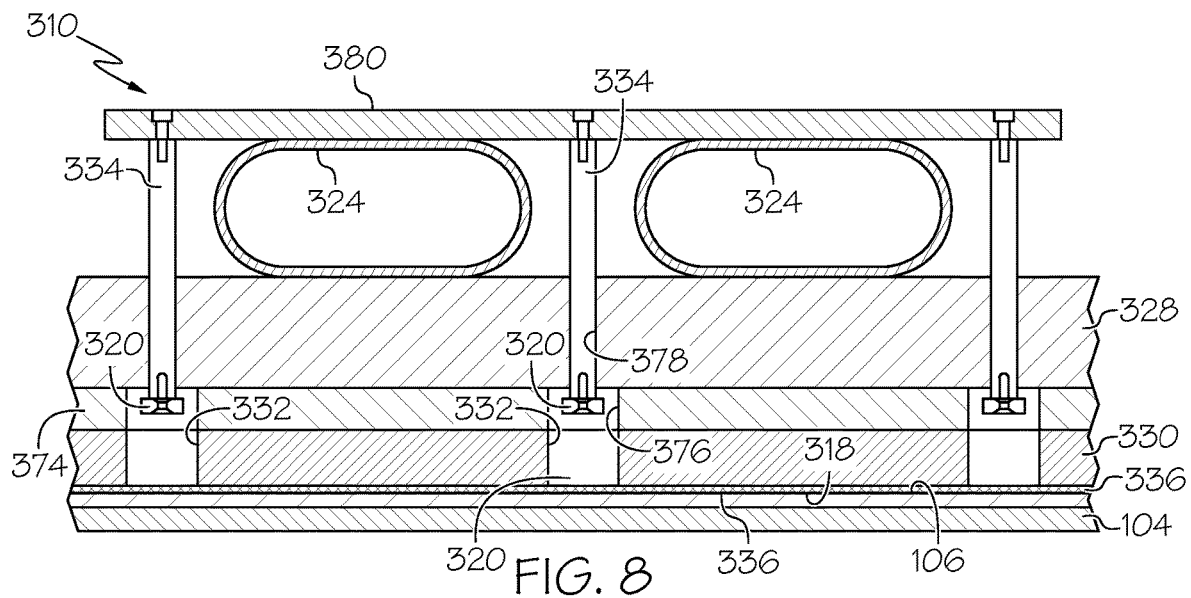
FIG. 8 is a schematic, elevation view of an example of a magnetic chuck of the transfer end effector, depicting the magnetic chuck in a disengaged state.
Figure 9:
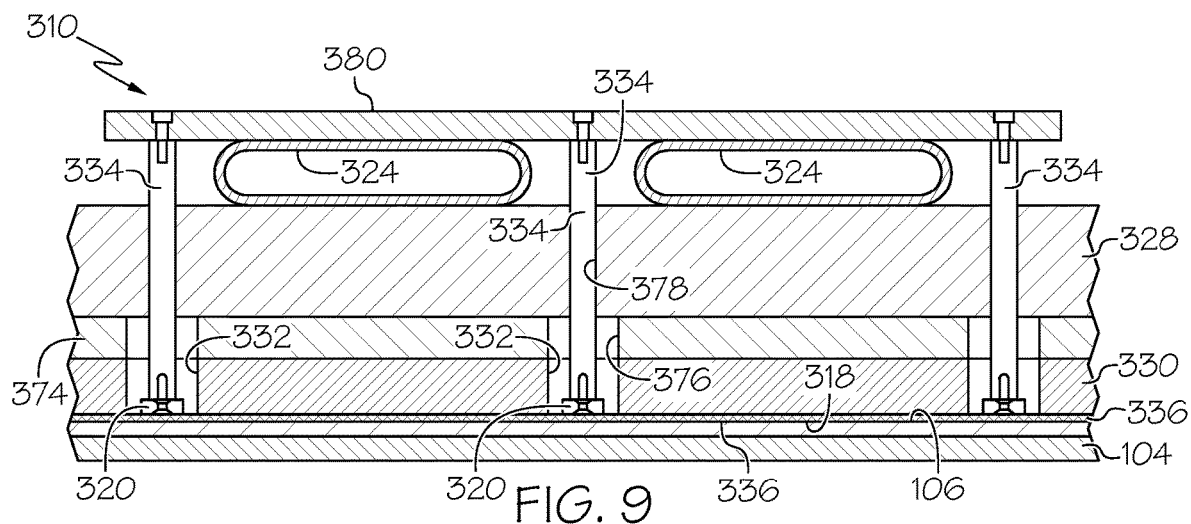
FIG. 9 is a schematic, elevation view of an example of the magnetic chuck of the transfer end effector, depicting the magnetic chuck in an engaged state.

Referring now to FIG. 7, which schematically illustrates an example of the transfer end effector 302 and FIGS. 8 and 9, which schematically illustrate examples of a portion of the magnetic chuck 310 of the transfer end effector 302. In one or more examples, the magnetic chuck 310 includes a plurality of magnets 320. The magnets 320 are configured to magnetically engage the base plate 124 of the ply carrier 104 for removal of the ply carrier 104 from the carrier transfer device 110 by the transfer end effector 302.

In one or more examples, the magnets 320 are permanent magnets. In one or more examples, the magnets 320 are rare-earth magnets, such as neodymium magnets or the like. In one or more examples, the magnets 320 are electromagnets.

While a plurality of magnets 320 are shown and described in relation to the illustrated examples, in other examples, the magnetic chuck 310 may include a single magnet 320. As such, the use of the plural form of magnets throughout the present disclosure is not intended to be limiting or exclude examples having one magnet. It should be recognized that the number of magnets, the size of each magnet, the arrangement of the magnets and/or the location of the magnets may depend on various factors, such as, but not limited to, the size and/or shape of the base plate 124 of the ply carrier 104.

In one or more examples, the magnetic chuck 310 includes a magnetic-chuck support member 328. The magnets 320 are coupled to the magnetic-chuck support member 328. The magnetic-chuck support member 328 is coupled to and is movable relative to the transfer frame 314. For example, the transfer actuator 348 and the transfer guide 350 are arranged between and are coupled to the transfer frame 314 and the magnetic-chuck support member 328 and are further configured to move the magnetic-chuck support member 328 along the first movement axis 352 relative to the transfer frame 314.

The magnetic-chuck support member 328 provides a support structure for the magnets 320. Generally, the magnetic-chuck support member 328 is rigid and is substantially planar or at least has a substantially planar surface to which the magnets 320 are coupled. In one or more examples, the magnetic-chuck support member 328 forms the magnetic-chuck contact surface 318. The magnetic-chuck support member 328 may be made of any suitable material, including, but not limited to, metal, plastic, wood, composite and the like.

As illustrated in FIGS. 8 and 9, the magnets 320 are movable relative to the magnetic-chuck support member 328 between a retracted position (e.g., as shown in FIG. 8) and an extended position (e.g., as shown in FIG. 9). Movement of the magnets 320 relative to the magnetic-chuck support member 328 selectively positions the magnets 320 into magnetic engage with or magnetic disengagement from the base plate 124 of the ply carrier 104.

In one or more examples, the magnetic chuck 310 includes a magnetic-chuck pliable member 330. The magnetic-chuck pliable member 330 is coupled to the magnetic-chuck support member 328, opposite the transfer frame 314. In these examples, the magnetic-chuck pliable member 330 forms the magnetic-chuck contact surface 318. The magnets 320 are movable relative to the magnetic-chuck pliable member 330 between the retracted position and the extended position. Movement of the magnets 320 relative to the magnetic-chuck pliable member 330 selectively positions the magnets 320 into magnetic engage with or magnetic disengagement from the base plate 124 of the ply carrier 104.

The magnetic-chuck pliable member 330 provides a cushion for contact with and protection of the composite ply 106 during removal and hand-off of the ply carrier 104. Generally, the magnetic-chuck pliable member 330 is substantially planar or at least has a substantially planar surface for contact with the ply carrier 104. The magnetic-chuck pliable member 330 may be made of any suitable material, including, but not limited to, foam and the like.

In one or more examples, the magnetic-chuck pliable member 330 includes a plurality of magnet openings 332. Each one of the magnets 320 is located within a corresponding one of the magnet openings 332 of the magnetic-chuck pliable member 330. Each one of the magnets 320 is movable within a respective one of the magnet openings 332 to position the magnets 320 into magnetic engage with or magnetic disengagement from the base plate 124 of the ply carrier 104.

In one or more examples, the magnetic chuck 310 includes a spacer 374. The spacer 374 is located between the magnetic-chuck support member 328 and the magnetic-chuck pliable member 330. For example, the spacer 374 is coupled to the magnetic-chuck support member 328, opposite the transfer frame 314, and the magnetic-chuck pliable member 330 is coupled to the spacer 374, opposite the magnetic-chuck support member 328. The magnets 320 are movable relative to the spacer 374 between the retracted position and the extended position. The spacer 374 includes a plurality of second magnet openings 376. Each one of the second magnet openings 376 of the spacer 374 is aligned with and is in volumetric communication with a corresponding one of the magnet openings 332 of the magnetic-chuck pliable member 330. In these examples, each one of the magnets 320 is housed within a corresponding one of the second magnet openings 376 when moved to the retracted position (e.g., as shown in FIG. 8).

In other examples (not illustrated), the magnetic-chuck support member 328 may include a plurality of openings or recesses configured to house the magnets 320 when moved to the retracted position.

In one or more examples, the magnetic chuck 310 includes a magnetic-chuck liner 336. The magnetic-chuck liner 336 is coupled to the magnetic-chuck pliable member 330, opposite the magnetic-chuck support member 328. In these examples, the magnetic-chuck liner 336 forms the magnetic-chuck contact surface 318.

The magnetic-chuck liner 336 provides a protective surface for which to contact the composite ply 106 during removal and transfer of the ply carrier 104. Generally, the magnetic-chuck liner 336 is a relatively thin and flexible sheet of material that covers and protects the magnetic-chuck pliable member 330 and the magnets 320 from direct contact with the resin matrix of the composite ply 106. The magnetic-chuck liner 336 may have surface properties that prevent the composite ply 106 from adhering to the magnetic-chuck liner 336 via the resin matrix.

In one or more examples, magnetic chuck 310 includes a plurality of magnetic-chuck actuator rods 334 that extends through the magnetic-chuck support member 328 and that is coupled to the plurality of magnets 320. The magnetic chuck 310 also includes a magnetic-chuck actuator 324 that is configured to selectively extend or retract the plurality of magnetic-chuck actuator rods 334 relative to the magnetic-chuck support member 328. Extension and retraction of the magnetic-chuck actuator rods 334 moves the plurality of magnets 320 between a magnetically engaged position and a magnetically disengaged position.

In one or more examples, each one of the magnets 320 is coupled to a corresponding one of the magnetic-chuck actuator rods 334. In one or more examples, more than one magnet 320 is coupled to the same magnetic-chuck actuator rod 334. In one or more examples, the magnetic chuck 310 includes a plurality of rod apertures 378 that extend through the magnetic-chuck support member 328. Each one of the rod apertures 378 is aligned with and is in volumetric communication with a corresponding one of the magnet openings 332 of the magnetic-chuck pliable member 330. Each one of the magnetic-chuck actuator rods 334 is positioned within and passes through a corresponding one of the rod apertures 378. In one or more examples, the magnetic chuck 310 may include bushings positioned within the rod apertures 378 to guide and facilitate movement of the magnetic-chuck actuator rods 334 within the rod apertures 378.

In one or more examples, the magnetic chuck 310 includes an actuator transmission component 380. The actuator transmission component 380 is configured to transfer motion and power from the magnetic-chuck actuator 324 to the magnetic-chuck actuator rods 334. The actuator transmission component 380 is coupled to and between the magnetic-chuck actuator 324 to the magnetic-chuck actuator rods 334. In one or more examples, the actuator transmission component 380 provides a structural support for the magnetic-chuck actuator rods 334.

In one or more examples, the magnetic-chuck actuator 324 includes, or takes the form of, at least one inflatable bladder. In these examples, the magnetic-chuck actuator 324 is selectively inflated to retract the magnetic-chuck actuator rods 334 and, thus, position the magnets 320 in the magnetically disengaged position (e.g., moves the magnets 320 away from the ply carrier 104), as illustrated in FIG. 8. The magnetic-chuck actuator 324 is selectively deflated to extend the magnetic-chuck actuator rods 334 and, thus, position the magnets 320 in the magnetically engaged position (e.g., moves the magnets 320 toward the ply carrier 104), as illustrated in FIG. 9. In these examples, the actuator transmission component 380 includes, or takes the form of, a panel member that is positioned on and coupled to the magnetic-chuck actuator 324 (e.g., the at least one inflatable bladder), opposite the magnetic-chuck support member 328. The actuator transmission component 380 provides an actuation surface on which the magnetic-chuck actuator 324 works to extend and retract the magnetic-chuck actuator rods 334.

In one or more examples, the magnetic-chuck actuator rods 334 are biased in the extended position and, thus, the magnets 320 are biased in the magnetically engaged position. For example, the magnetic chuck 310 may include at least one spring coupled to and between the actuator transmission component 380 (e.g., the panel member) and the magnetic-chuck support member 328 so that the magnetic-chuck actuator rods 334 automatically and passively extend to position the magnets 320 in the magnetically engaged position when the magnetic-chuck actuator 324 is de-energized (e.g., deflated).

It should be recognized that the magnetic-chuck actuator 324 is not limited to an inflatable member. The magnetic-chuck actuator 324 may include any one or various types of selectively controlled actuators. In other examples, the magnetic-chuck actuator 324 may include, or take the form of, a linear actuator, such as a pneumatic actuator, electromechanical actuator and the like. In yet other examples, the magnets 320 may be electromagnets and the magnetic-chuck actuator 324 may include a switching member that is configured to selectively energize (e.g., magnetize) and de-energize (e.g., demagnetize) the magnets 320.

Figure 11:
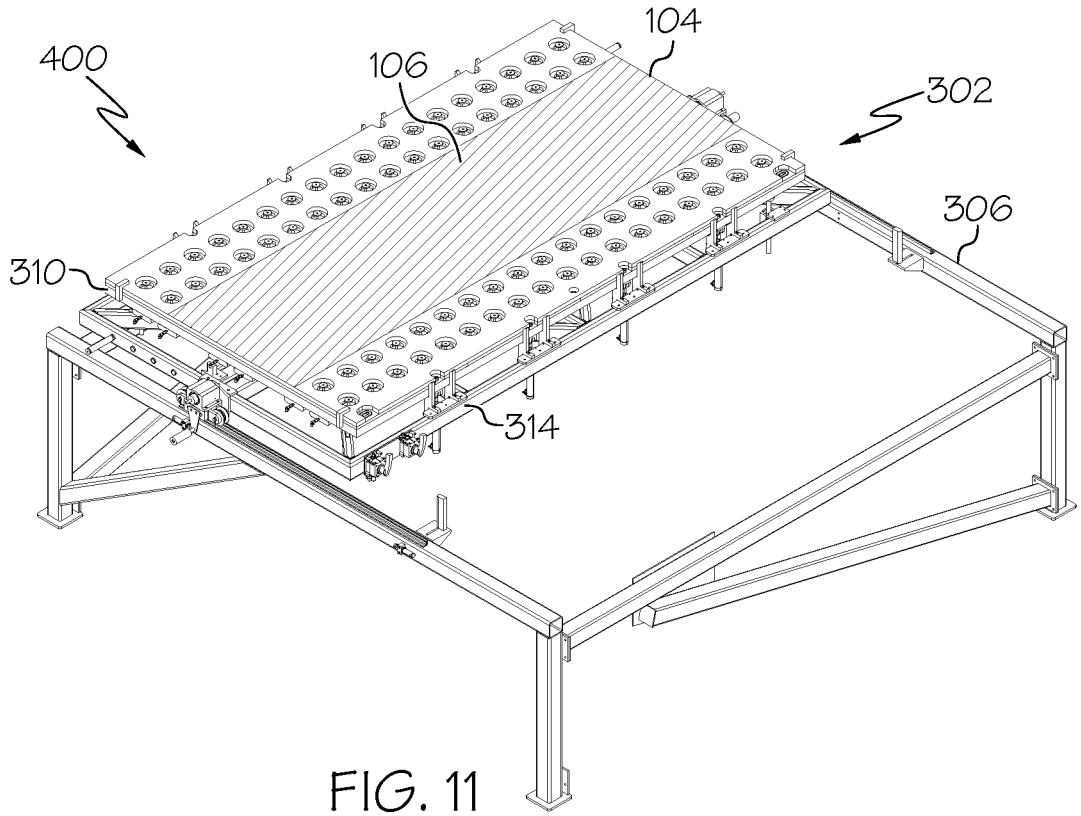
FIG. 11 is a schematic, perspective view on an example of the transfer apparatus, depicting the transfer end effector in a hand-off orientation.
Figure 12:
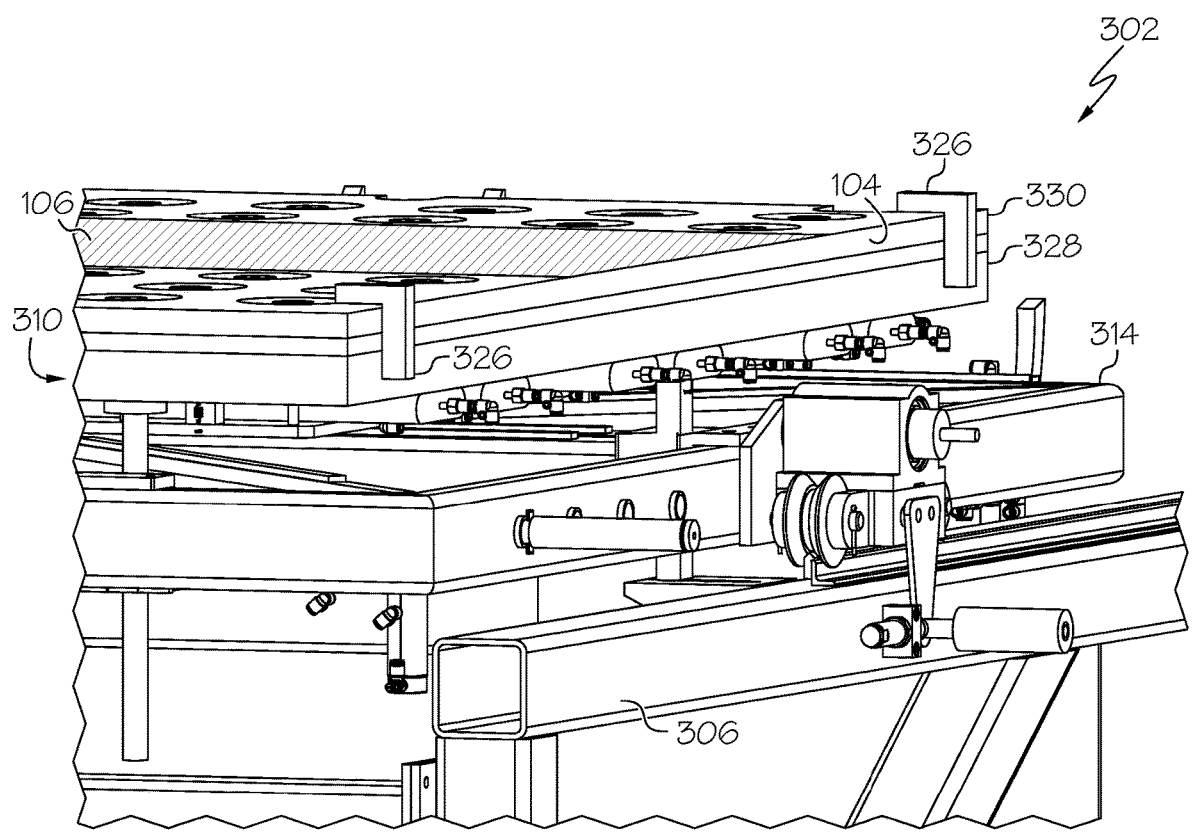
FIG. 12 is a schematic, perspective view of a portion of an example of the transfer end effector.
Figure 36:
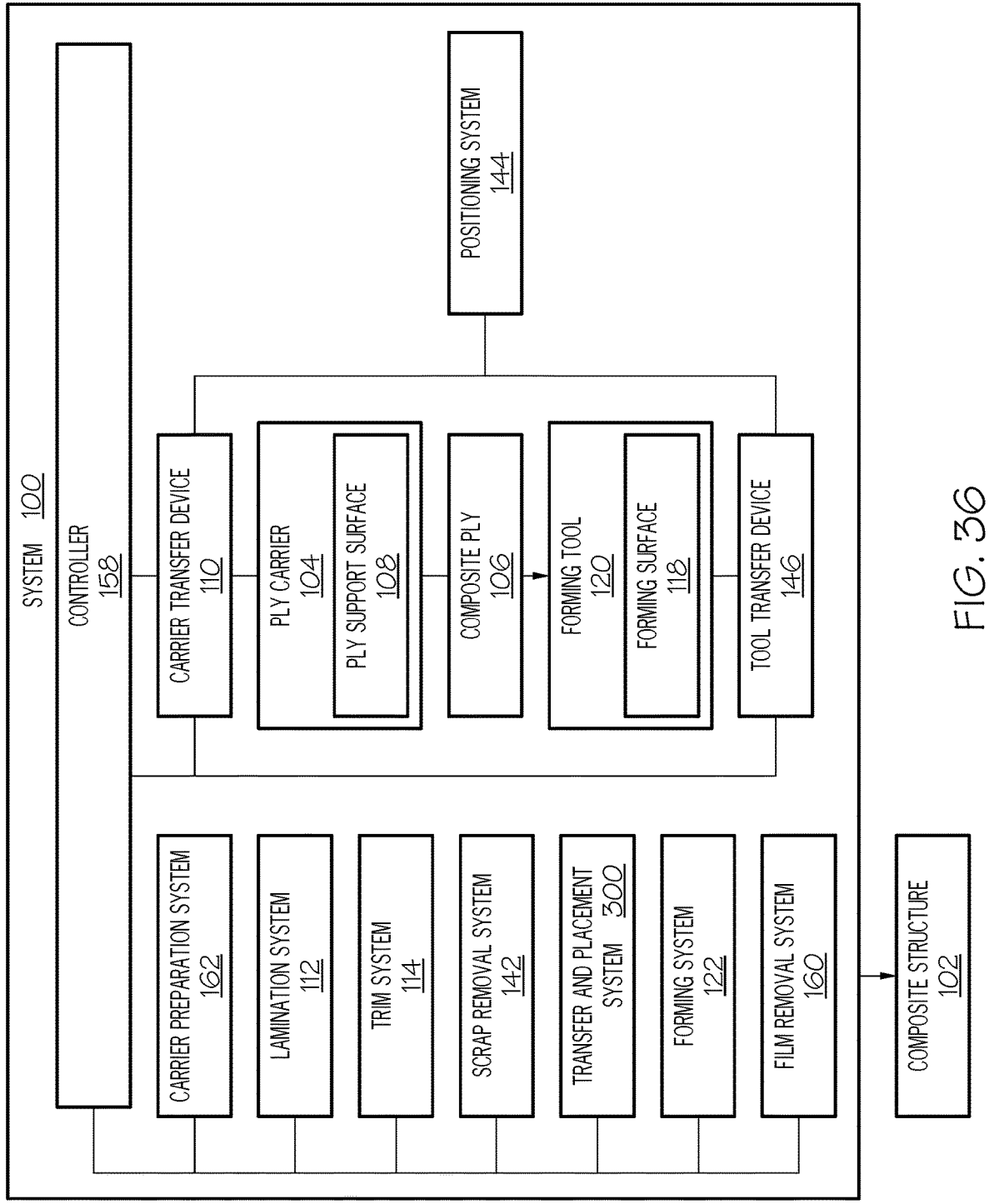
FIG. 36 is a schematic block diagram of an example of a system for fabricating a composite structure.

Referring briefly to FIG. 12, in one or more examples, the transfer end effector 302 includes a plurality of clamps 326. The clamps 326 are configured to fix the ply carrier 104 against the magnetic-chuck contact surface 318 of the magnetic chuck 310. The clamps 326 provide a secondary mechanism (e.g., in addition to the magnets 320) to securely hold the ply carrier 104 in position during a ply transfer operation, such as illustrated in FIGS. 5, 6, 10 and 11. In an example, the clamps 326 are located around and are coupled to a perimeter of the magnetic-chuck support member 328. The clamps 326 are configured to engage a perimeter of the ply carrier 104 to clamp the ply carrier 104 between the clamps 326 and the magnetic-chuck contact surface 318. The clamps 326 may be automatically engaged, such as under direction from a controller 158 (FIG. 36).

Referring now to FIGS. 5, 6, 10, 11 and 13, which illustrate an example of a ply transfer operation. Generally, the ply transfer operation utilizes the transfer apparatus 400 and, more particularly, the transfer end effector 302 to: (1) remove the ply carrier 104 from the carrier transfer device 110; (2) reposition and/or reorient the ply carrier 104 for hand-off to the placement end effector 304; and (3) facilitate removal of the ply carrier 104 by the placement end effector 304.

As illustrated in FIGS. 5 and 6, at a first stage of a ply transfer operation, the carrier transfer device 110 is used to locate the ply carrier 104 relative to the transfer apparatus 400 and the transfer end effector 302 is positioned in a pick-up orientation, such that the carrier transfer device 110 is under the transfer end effector 302 and the magnetic chuck 310 is facing the ply carrier 104. The magnetic chuck 310 is extended (e.g., moved toward the carrier transfer device 110 along the first movement axis 352) such that the magnetic-chuck contact surface 318 is in contact with the composite ply 106. With the magnetic-chuck contact surface 318 in contact with the composite ply 106, the magnetic chuck 310 magnetically engages the base plate 124 of the ply carrier 104 through the composite ply 106. With the magnetic chuck 310 magnetically engaged with the base plate 124 of the ply carrier 104, the magnetic chuck 310 is then retracted (e.g., moved away from the carrier transfer device 110 along the first movement axis 352) such that the ply carrier 104 is removed from the carrier transfer device 110. The clamps 326 (FIG. 12) may also be engaged to hold the ply carrier 104.

Figure 10:
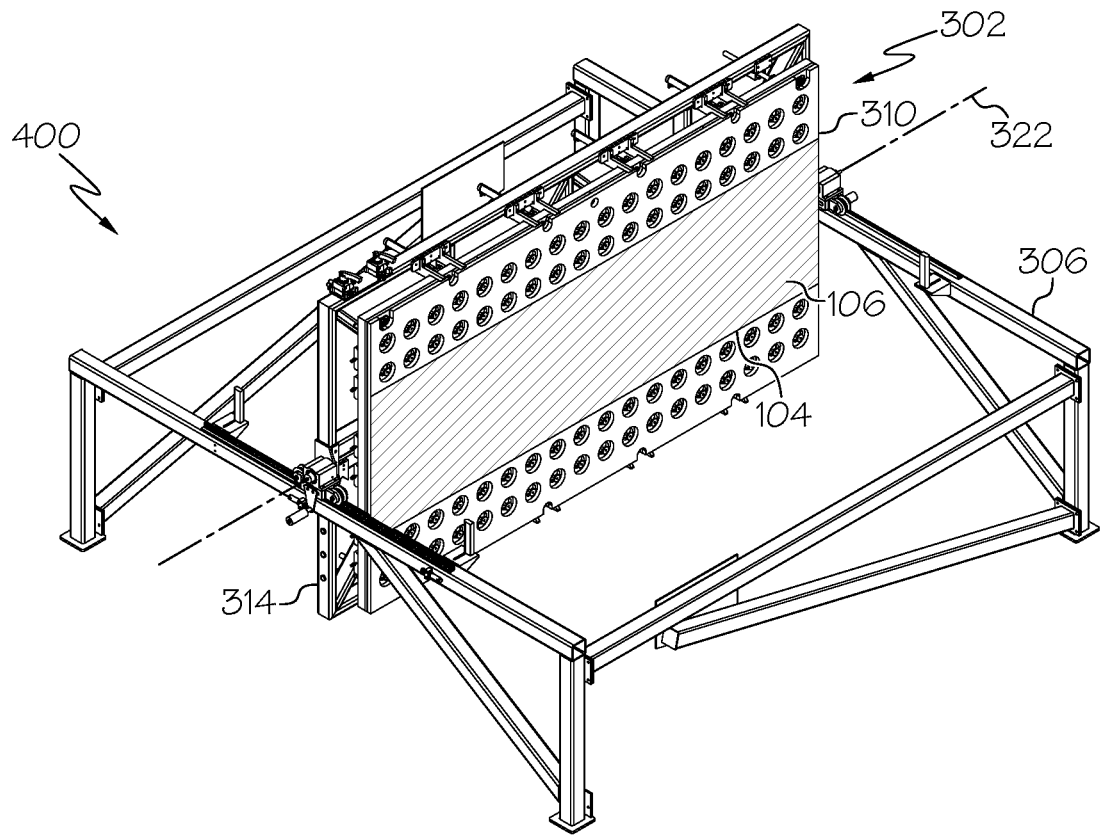
FIG. 10 is a schematic, perspective view on an example of the transfer apparatus, depicting the transfer end effector reorienting a ply carrier, supporting a composite ply.
Figure 13:
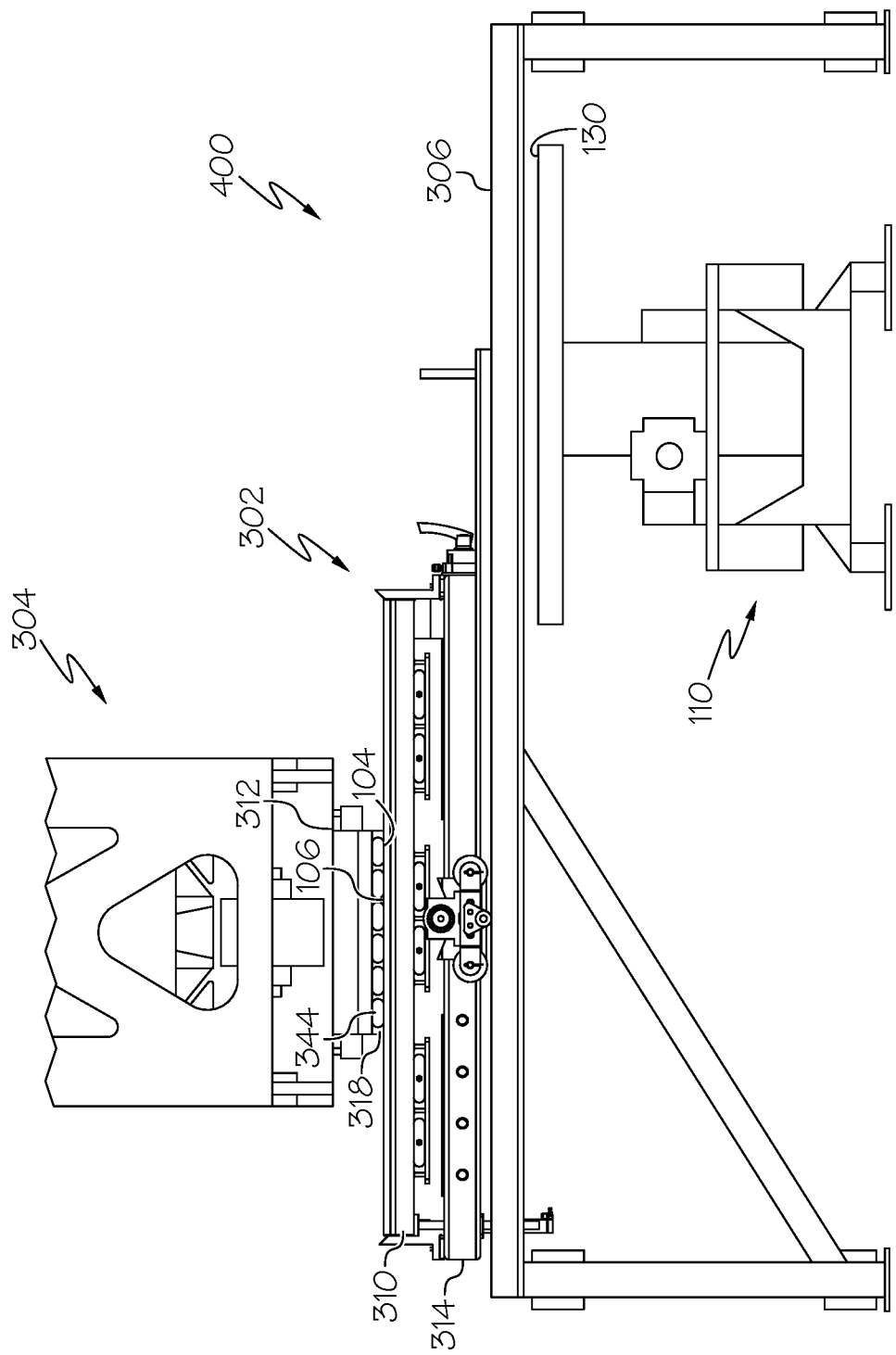
FIG. 13 is a schematic, elevation view of an example of the transfer end effector and a placement end effector of the system, depicted in the hand-off orientation.

As illustrated in FIGS. 10 and 11, at a second stage of the ply transfer operation, with the magnetic chuck 310 magnetically engaged with the base plate 124 of the ply carrier 104, the transfer end effector 302 is repositioned in a hand-off orientation, such that the ply carrier 104 is suitably positioned for removal from the transfer end effector 302 by the placement end effector 304 (FIG. 13). In one or more examples, the transfer end effector 302 is rotated approximately one hundred and eighty degrees about the rotation axis 322 (FIG. 10) to flip the ply carrier 104. As such, with the transfer end effector 302 in the hand-off orientation (e.g., as shown in FIGS. 11 and 13), the base plate 124 of the ply carrier 104 is facing approximately upward and the composite ply 106 is facing downward.

As illustrated in FIG. 13, at a third stage of the ply transfer operation, with the magnetic chuck 310 magnetically engaged with the base plate 124 of the ply carrier 104 and the transfer end effector 302 in the hand-off orientation, the placement end effector 304 is positioned to engage the base plate 124 of the ply carrier 104. For example, the placement end effector 304 is moved toward the transfer end effector 302 and, thus, the ply carrier 104, supporting the composite ply 106, such that the placement end effector 304 engages the base plate 124. The placement end effector 304 is then moved away from the transfer end effector 302 to remove the ply carrier 104, and the composite ply 106 supported by the ply carrier 104, from the transfer end effector 302. With the ply carrier 104 removed from the transfer end effector 302 and supported by the placement end effector 304, the composite ply 106 is facing away from the placement end effector 304 for application to the forming tool 120.

Referring now to FIGS. 14-26, which illustrate examples of the placement end effector 304. In one or more examples, the placement end effector 304 includes a vacuum chuck 312. The vacuum chuck 312 is configured to selectively apply a retention vacuum to the base plate 124 for removal of the ply carrier 104 from the transfer end effector 302 by the placement end effector 304. The vacuum chuck 312 is further configured to selectively remove the retention vacuum from the base plate 124 for removal of the composite ply 106 from the ply carrier 104 during application of the composite ply 106 on the forming tool 120 (FIGS. 1 and 2).

Figure 17:
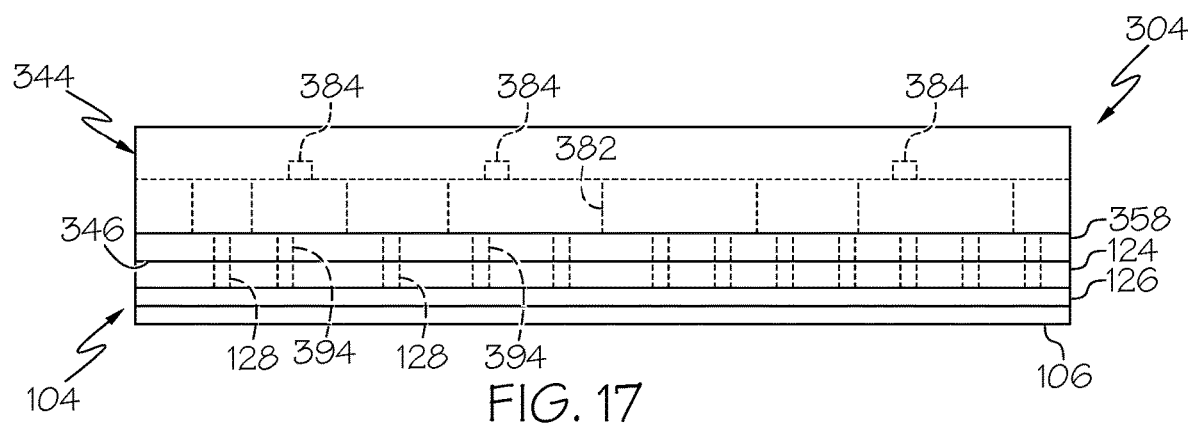
FIG. 17 is a schematic, elevation view of an example of a vacuum table of the placement end effector and the ply carrier.
Figure 18:
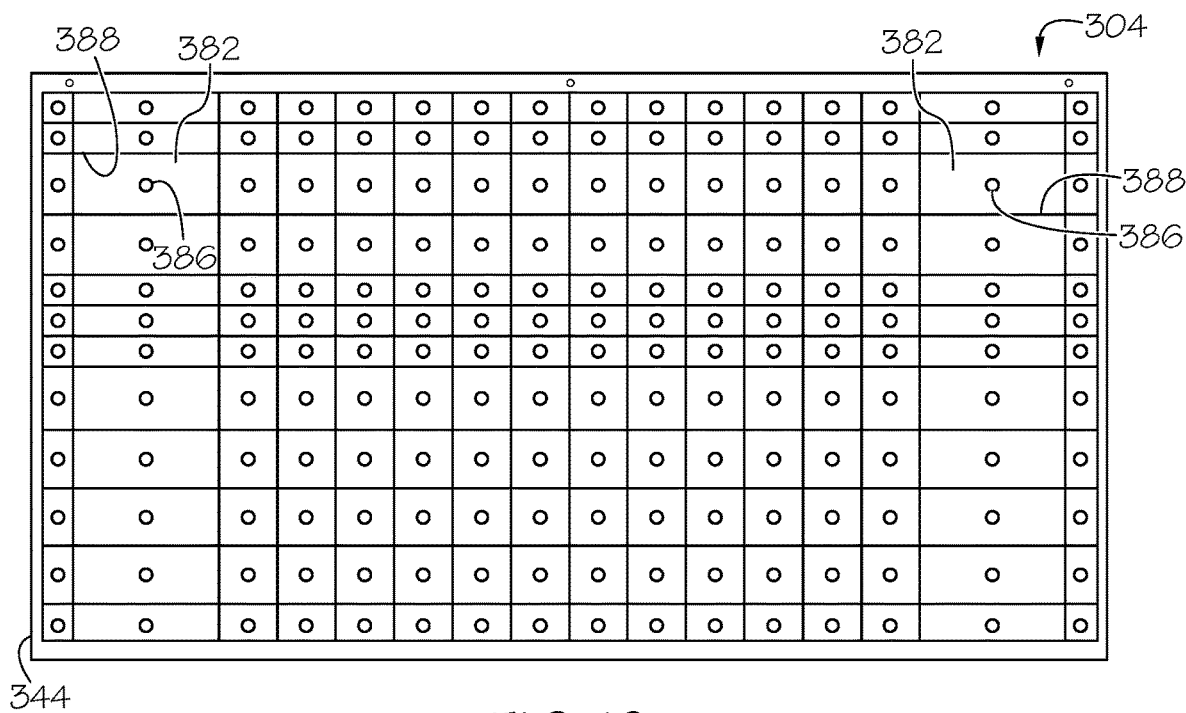
FIG. 18 is a schematic, plan view of an example of the vacuum table of the placement end effector.
Figure 41:
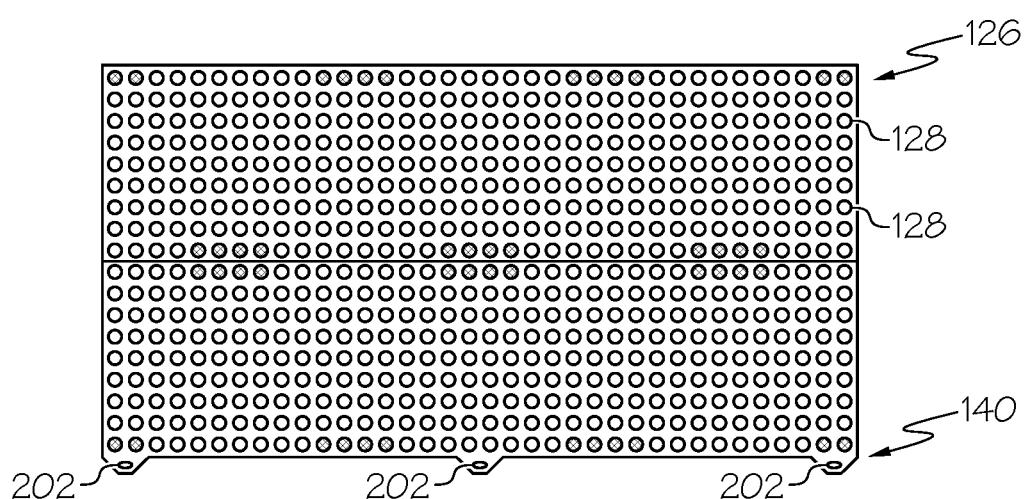
FIG. 41 is a schematic, plan view of an example of a base plate of the ply carrier.

As illustrated in FIGS. 17, 18 and 41, in one or more examples, the base plate 124 includes a plurality of vacuum apertures 128. The vacuum chuck 312 is configured to apply the retention vacuum through the plurality of vacuum apertures 128 to retain the film 126 (FIG. 18) on the base plate 124. The film 126, coupled to the base plate 124, and the composite ply 106, coupled to the film 126, are not shown in FIG. 17.

As illustrated in FIG. 18, in one or more examples, the film 126 is releasably coupled to the base plate 124 via vacuum retention during removal of the ply carrier 104 from the transfer end effector 302 and application of the composite ply 106 on the forming tool 120 by the placement end effector 304. In these examples, the base plate 124 facilitates vacuum to move through the base plate 124 and engage the film 126.

As illustrated in FIGS. 14-17, in one or more examples, the vacuum chuck 312 includes a vacuum table 344. The vacuum table 130 may include a perforated top and a vacuum chamber that is in fluid communication with a vacuum source. The vacuum table 344 is configured to apply the retention vacuum to the ply carrier 104. Application of the retention vacuum holds the base plate 124 on the vacuum table 344 and holds the film 126 on the base plate 124. The plurality of vacuum apertures 128 in the base plate 124 allow for vacuum to move through the base plate 124. With the placement end effector 304 in contact with the ply carrier 104, the vacuum table 130 is in fluid communication with the plurality of vacuum apertures 128.

In one or more examples, the vacuum table 130 is configured to selectively apply the retention vacuum to select portions of the ply carrier 104. Selective application of the retention vacuum temporarily holds the base plate 124 on the placement end effector 304 during removal of the ply carrier 104 from the transfer end effector 302 and application of the composite ply 106 on the forming tool 120. Selective application of the retention vacuum temporarily holds the film 126 and, thus, the composite ply 106 on the base plate 124 during removal of the ply carrier 104 from the transfer end effector 302 and application of the composite ply 106 on the forming tool 120. Selective removal of the retention vacuum from select portions of the ply carrier 104 releases the film 126 and, thus, the composite ply 106 from the base plate 124 after application of the composite ply 106 on the forming tool 120. Selective removal of the retention vacuum releases the base plate 124 from the placement end effector 304 during hand-off of the ply carrier 104 back to the transfer end effector 302.

In one or more examples, the placement end effector 304 includes parts and components (e.g., vacuum source, vacuum ports, plumbing, actuators, valves and the like) that enable production, application and selective control of the retention vacuum. The vacuum source (e.g., a vacuum pump) may be component of the system 300 or a component of the placement apparatus 402. Alternatively, the vacuum source may be an integral component of the placement end effector 304. During hand-off and placement operations, the retention vacuum is provided by the vacuum table 344, which is then applied to the film 126 through the plurality of vacuum apertures 128 formed in the base plate 124.

Referring now to FIGS. 17 and 18, which schematically illustrate examples of the vacuum table 344 of the placement end effector 304. In one or more examples, the vacuum table 344 includes a plurality of vacuum zones 382. Each vacuum zone 382 may include one or more vacuum apertures or vacuum ports 386 (FIG. 18) in fluid communication with and configured to apply vacuum within the corresponding vacuum zone 382. Each one of the plurality of vacuum zones 382 is controllable to selectively apply or remove vacuum to a corresponding set of the vacuum apertures 128 of the base plate 124 (FIGS. 16 and 41) positioned over the respective vacuum zone 382. For example, each one of the plurality of vacuum zones 382 includes a valve 384 (FIG. 17) that is selectively open or closed to control application of vacuum to the respective vacuum zone 382. The vacuum zones 382 enable the vacuum table 344 to apply vacuum where needed to retain the base plate 124 (FIGS. 16 and 17) on the vacuum table 344 and to retain the film 126 (FIG. 17) on the base plate 124. The vacuum zones 382 also enable the vacuum table 344 to cease application of vacuum to select areas of the base plate 124, such as during release of the film 126 and the composite ply 106 after application of the composite ply 106 to the forming tool 120 (FIGS. 1 and 2). The vacuum table 344 and the plurality of vacuum apertures 128 formed in the base plate 124 may be arranged to adequately distribute a sufficient retention vacuum to retain the film 126 on the surface of the base plate 124 during movement of the ply carrier 104.

As illustrated in FIG. 18, in one or more examples, the vacuum table 344 includes a plurality of lip seals 388. Each lip seal 388 is located between adjacent ones of the plurality of vacuum zones 382. For example, the lip seals 388 form the peripheral boundaries of the vacuum zones 382 and isolate each one of the vacuum zones 382 from an adjacent one of the vacuum zones 382. The plurality of lip seals 388 provide a sealing interface with the base plate 124 without affecting the surface flatness of the vacuum table 344.

Figure 38:
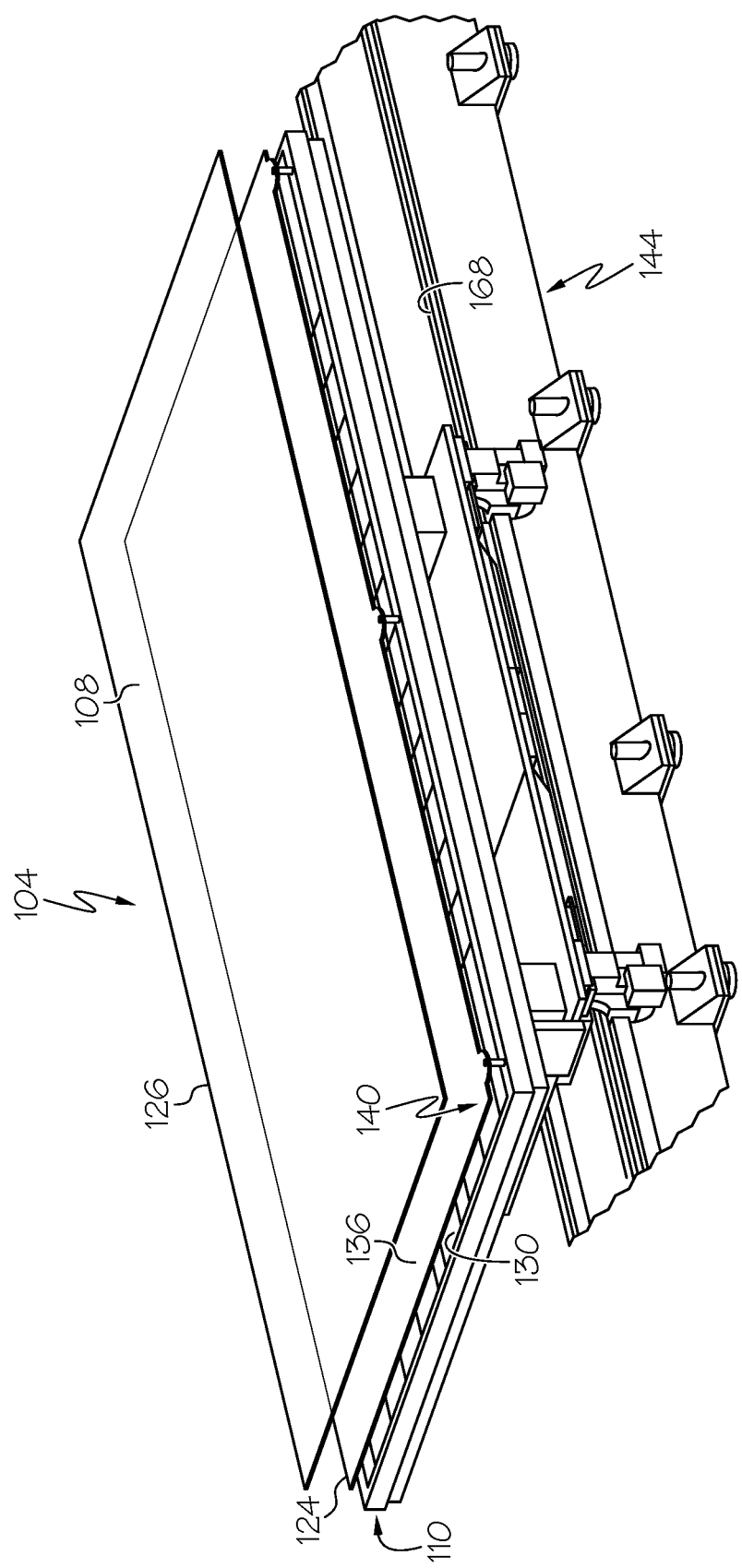
FIG. 38 is a perspective view of an example of the ply carrier and the carrier transfer device of the system shown in FIG. 36.

Referring briefly to FIG. 38, in one or more examples, the ply carrier 104 also includes a liner 136. The liner 136 is coupled to the base plate 124. Generally, the liner 136 is a relatively thin sheet of material that covers the base plate 124. For example, the liner 136 is coupled to and covers the surface of the base plate 124 and is located between the base plate 124 and the film 126. The liner 136 may be coupled to the base plate 124 in any one of various techniques, such as via adhesive bonding, mechanical fasteners and the like. In these examples, the film 126 is positioned on the liner 136 and the liner 136 provides a contact surface onto which the film 126 is applied.

In one or more examples, the liner 136 is permeable by the retention vacuum. The liner 136 facilitates distribution of the retention vacuum from the plurality of vacuum apertures 128 of the base plate 124 to the film 126. The liner 136 also prevents the film 126 from dimpling or wrinkling at the plurality of vacuum apertures 128 in response to application of the retention vacuum.

In one or more examples, the liner 136 is made of a porous plastic material, such as a porous thermoplastic material. As an example, the liner 136 includes, or takes the form of, a sheet of polypropylene. As another example, the liner 136 includes, or takes the form of, a sheet of high-density polyethylene. As another example, the liner 136 is a sheet of VYON® porous polymer fluidizing media, commercially available from Porvair Filtration Group Inc. In other examples, the liner 136 may be made of any other suitable material, such as a material that is flexible, that permits vacuum to pass though itself and that can serve as a cutting surface.

Figure 14:
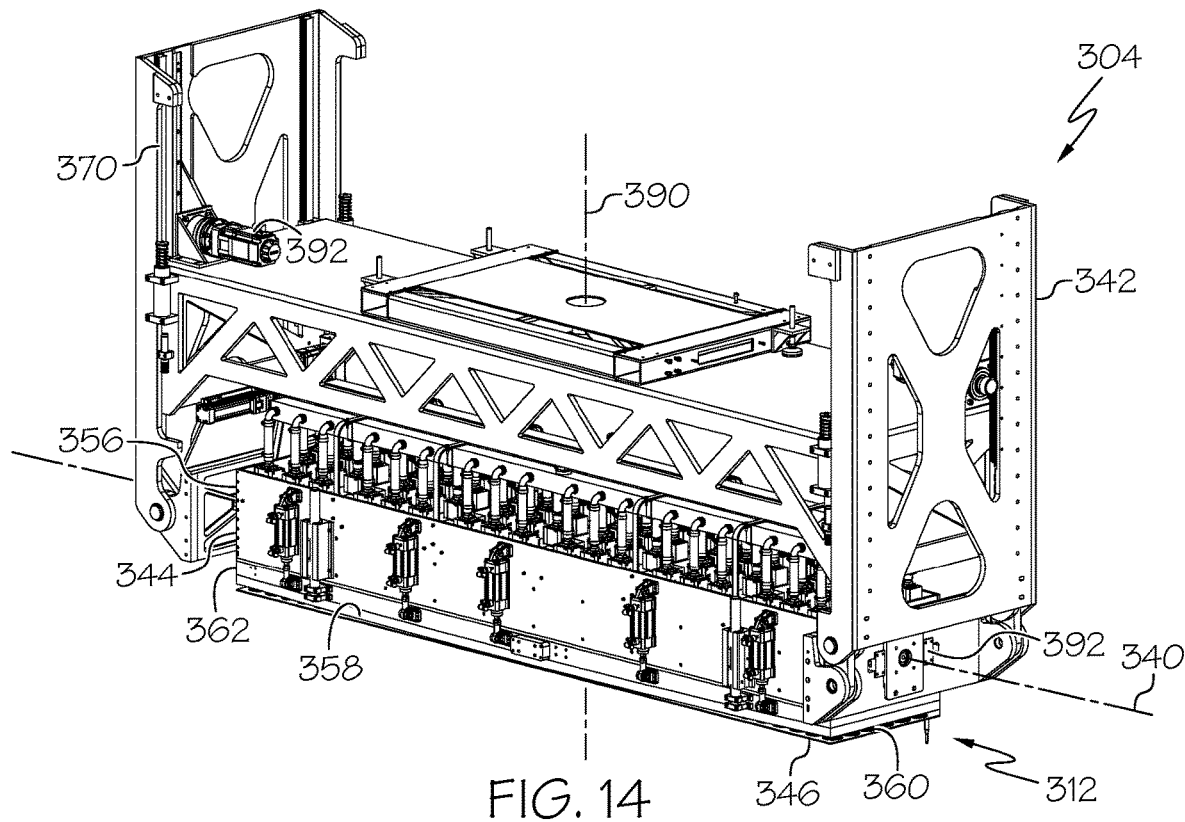
FIG. 14 is a schematic, perspective view of an example of the placement end effector of the system.
Figure 15:
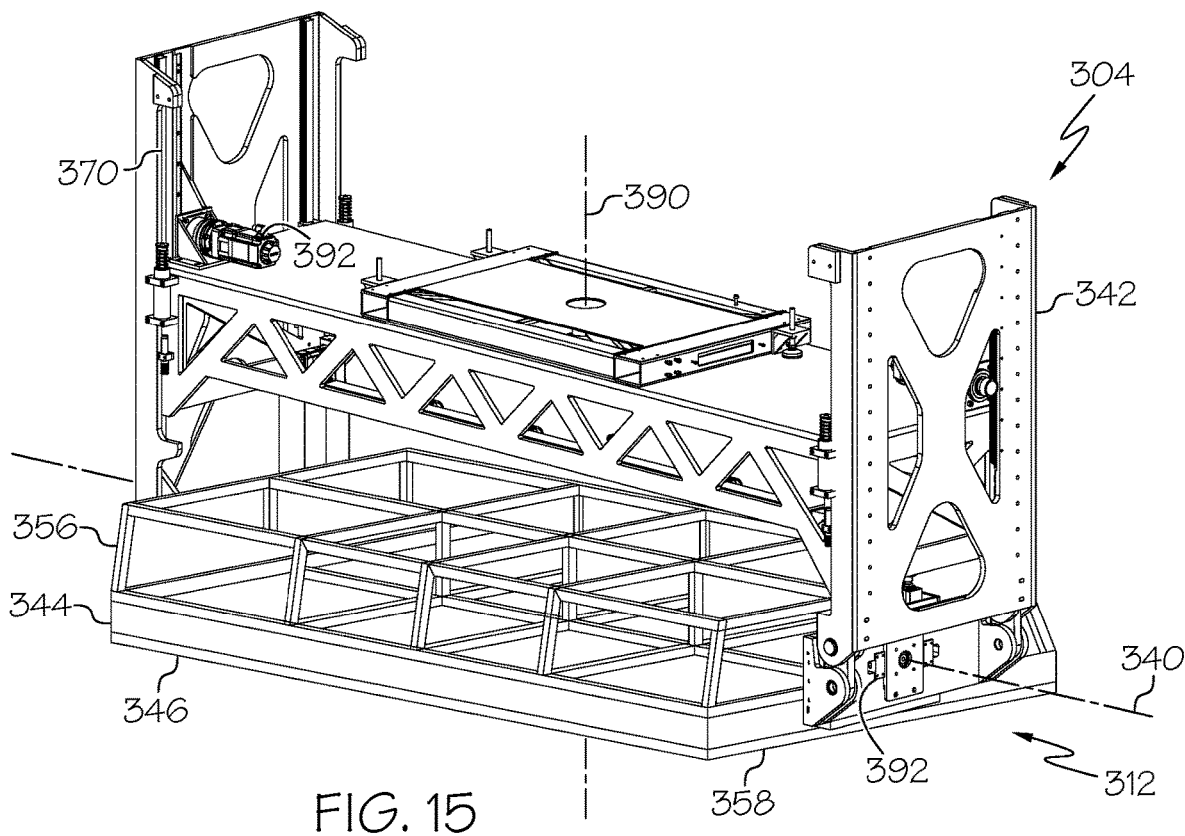
FIG. 15 is a schematic, perspective view of an example of the placement end effector.

Referring now to FIGS. 14 and 15, in one or more examples, the placement end effector 304 includes a placement frame 342. The vacuum chuck 312 is coupled to the placement frame 342. The vacuum chuck 312 includes a vacuum-chuck contact surface 346. In one or more examples, a surface of the vacuum table 344 forms the vacuum-chuck contact surface 346 (e.g., as shown in FIG. 15). In one or more examples, as will be described in more detail herein, surfaces of a plurality of vacuum cups 360 form the vacuum-chuck contact surface 346 (e.g., as shown in FIG. 14). The vacuum chuck 312 is movable relative to the placement frame 342 to position the vacuum-chuck contact surface 346 in contact with the ply carrier 104, supporting the composite ply 106, for removal of the ply carrier 104 from the transfer end effector 302 by the placement end effector 304. The vacuum chuck 312 is movable relative to the placement frame 342 to position the ply carrier 104 for application of the composite ply 106 to the forming tool 120 (FIGS. 1 and 2) by the placement end effector 304.

The placement frame 342 may include any rigid structure, formed by one or more structural and/or nonstructural frame members. The placement frame 342 provides support to the vacuum chuck 312. The placement end effector 304 may also include one or more joints, couplings and drive components (e.g., motors, actuators, etc.) configured to move the vacuum chuck 312 in one or more linear directions and/or rotational orientations relative to the transfer frame 314.

In one or more examples, the vacuum chuck 312 is linearly moveable along a second movement axis 390 relative to the placement frame 342 for hand-off and application of the ply carrier 104 by the placement end effector 304. In one or more examples, the vacuum chuck 312 is pivotable about a pivot axis 340 relative to the placement frame 342 to orient the ply carrier 104 for application of the composite ply 106 to the forming tool 120 by the placement end effector 304.

In one or more examples, the placement end effector 304 includes a placement actuator 392. The placement actuator 392 is coupled to the placement frame 342 and to the vacuum chuck 312. The placement actuator 392 is configured to selectively drive and control movement of the vacuum chuck 312 relative to the placement frame 342 along the second movement axis 390 and/or about the pivot axis 340. In one or more examples, the placement end effector 304 includes a plurality of placement actuators 392, for example, at least one placement actuator 392 configured to linearly move the vacuum chuck 312 along the second movement axis 390 and at least one placement actuator 392 configured to pivot the vacuum chuck 312 about the pivot axis 340.

The placement actuator 392 may include any one of various suitable types of selectively controlled actuators. In one or more examples, the placement actuator 392 may include, or take the form of, a linear actuator or a rotary actuator, such as a pneumatic actuator, an electro-mechanical actuator, a power screw and nut mechanism, a rack and pinion mechanism and the like.

In one or more examples, during the hand-off operation, movement of the vacuum chuck 312 relative to the placement frame 342 along the second movement axis 390 in a first direction (e.g., downward) places the vacuum-chuck contact surface 346 in contact with the base plate 124 of the ply carrier 104 for vacuum engagement with the ply carrier 104. Movement of the vacuum chuck 312 relative to the placement frame 342 along the second movement axis 390 in a second direction, opposite to the first direction, (e.g., upward) moves the vacuum-chuck contact surface 346, engaged via vacuum with the ply carrier 104, away from the transfer end effector 302 for removal of the ply carrier 104 from the transfer end effector 302.

Similarly, in one or more examples, during the placement operation, movement of the vacuum chuck 312 relative to the placement frame 342 along the second movement axis 390 in the first direction (e.g., downward) places the composite ply 106 in contact with the forming tool 120. Movement of the vacuum chuck 312 relative to the placement frame 342 along the second movement axis 390 in the second direction, opposite to the first direction, (e.g., upward) moves the base plate 124 of the ply carrier 104, released from the composite ply 106, away from the forming tool 120 after application of the composite ply 106 on the forming tool 120.

Additionally, in one or more examples, during the placement operation, movement of the vacuum chuck 312 relative to the placement frame 342 about the pivot axis 340 orients the ply carrier 104, and the composite ply 106 held on the ply carrier 104, relative to a forming surface 118 (FIGS. 1 and 2) of the forming tool 120 for application of the composite ply 106.

Referring to FIGS. 1, 2 and 31-34, in one or more examples, the system 300 includes a placement support platform 308. The placement support platform 308 may be a component of, or may form a part of, the placement apparatus 402. The placement frame 342 of the placement end effector 304 is coupled to the placement support platform 308. The placement end effector 304 is movable relative to the placement support platform 308 to remove the ply carrier 104 from the transfer end effector 302. The placement end effector 304 is movable relative to the placement support platform 308 to position the ply carrier 104 for application of the composite ply 106 to the forming tool 120 by the placement end effector 304.

The placement support platform 308 may include any rigid structure, formed by one or more structural and/or nonstructural frame members. The placement support platform 308 may also include one or more joints, couplings and drive components (e.g., motors, actuators, etc.) configured to move the placement end effector 304 in one or more linear directions and/or orient the placement end effector 304 in a plurality of rotational orientations relative to the placement support platform 308.

In one or more examples, the vacuum chuck 312 includes a vacuum-chuck support member 356. The vacuum-chuck support member 356 is coupled to and is movable relative to the placement frame 342. The vacuum table 344 is coupled to the vacuum-chuck support member 356. For example, the placement actuator 392 is arranged between and is coupled to the placement frame 342 and the vacuum-chuck support member 356 and is further configured to move the vacuum-chuck support member 356 along the second movement axis 390 and/or about the pivot axis 340 relative to the placement frame 342.

The vacuum-chuck support member 356 provides a support structure for the vacuum table 344. Generally, the vacuum-chuck support member 356 is rigid and provides a support structure to which the vacuum table 344 is coupled.

Figure 16:
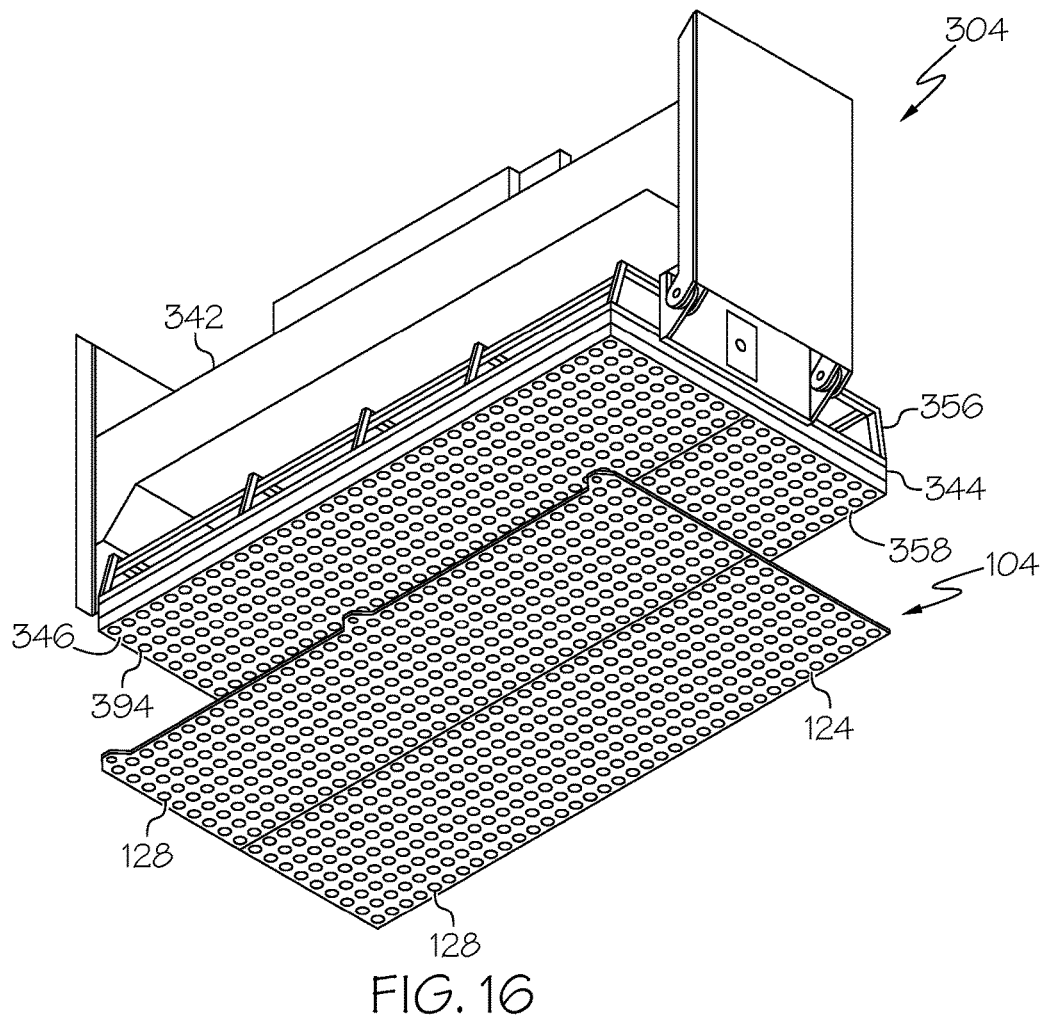
FIG. 16 is a schematic, perspective view of an example of the placement end effector and the ply carrier.
Figure 19:
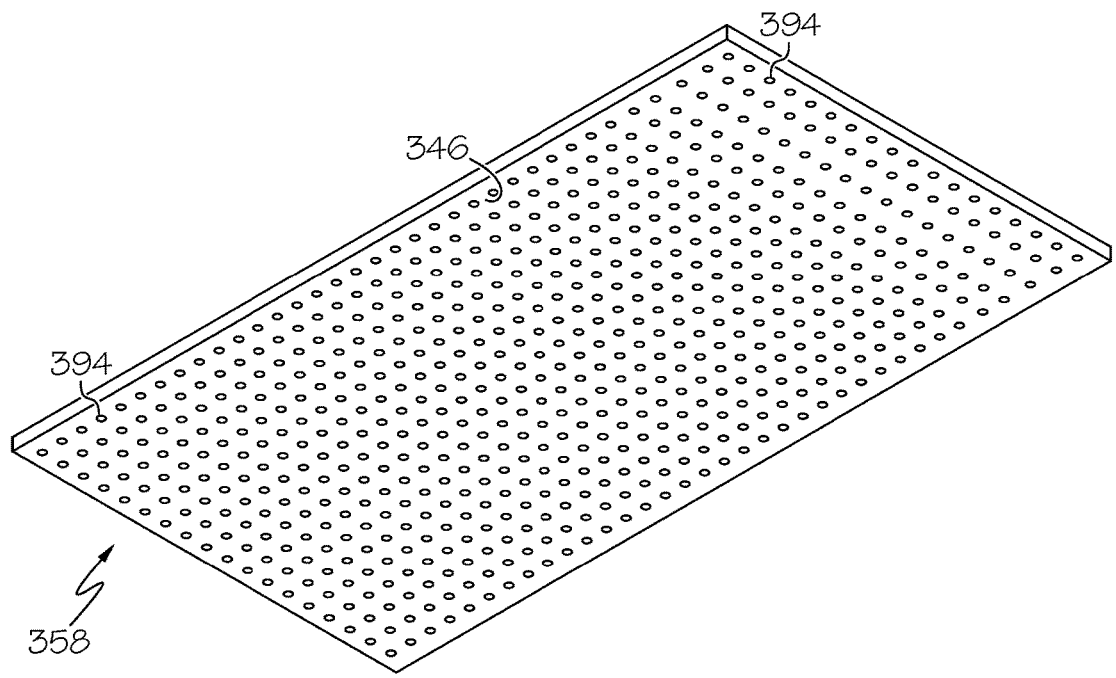
FIG. 19 is a schematic, perspective view of an example of a vacuum-chuck pliable member of the placement end effector.

Referring now to FIGS. 16, 17 and 19, in one or more examples, the vacuum chuck 312 includes a vacuum-chuck pliable member 358. The vacuum-chuck pliable member 358 is coupled to the vacuum table 344, opposite the vacuum-chuck support member 356. The vacuum-chuck pliable member 358 is permeable by the retention vacuum. In one or more examples, the vacuum-chuck pliable member 358 forms the vacuum-chuck contact surface 346.

The vacuum-chuck pliable member 358 provides a cushion for contact with the base plate 124 of the ply carrier 104 during hand-off of the ply carrier 104 from the transfer end effector 302 and application of composite ply 106 on the forming tool 120. Generally, the vacuum-chuck pliable member 358 is substantially planar or at least has a substantially planar surface for contact with the ply carrier 104. The magnetic-chuck pliable member 330 may be made of any suitable material, including, but not limited to, foam and the like.

In one or more examples, the vacuum-chuck pliable member 358 includes a plurality of vacuum apertures 394. The vacuum chuck 312 (e.g., the vacuum table 344) is configured to apply the retention vacuum through the plurality of vacuum apertures 394 of the vacuum-chuck pliable member 358 to retain base plate 124 of the ply carrier 104 on the vacuum-chuck pliable member 358 and to retain the film 126 (FIG. 17) on the base plate 124. Alternatively, the vacuum-chuck pliable member 358 is otherwise permeable by the retention vacuum.

Figure 20:
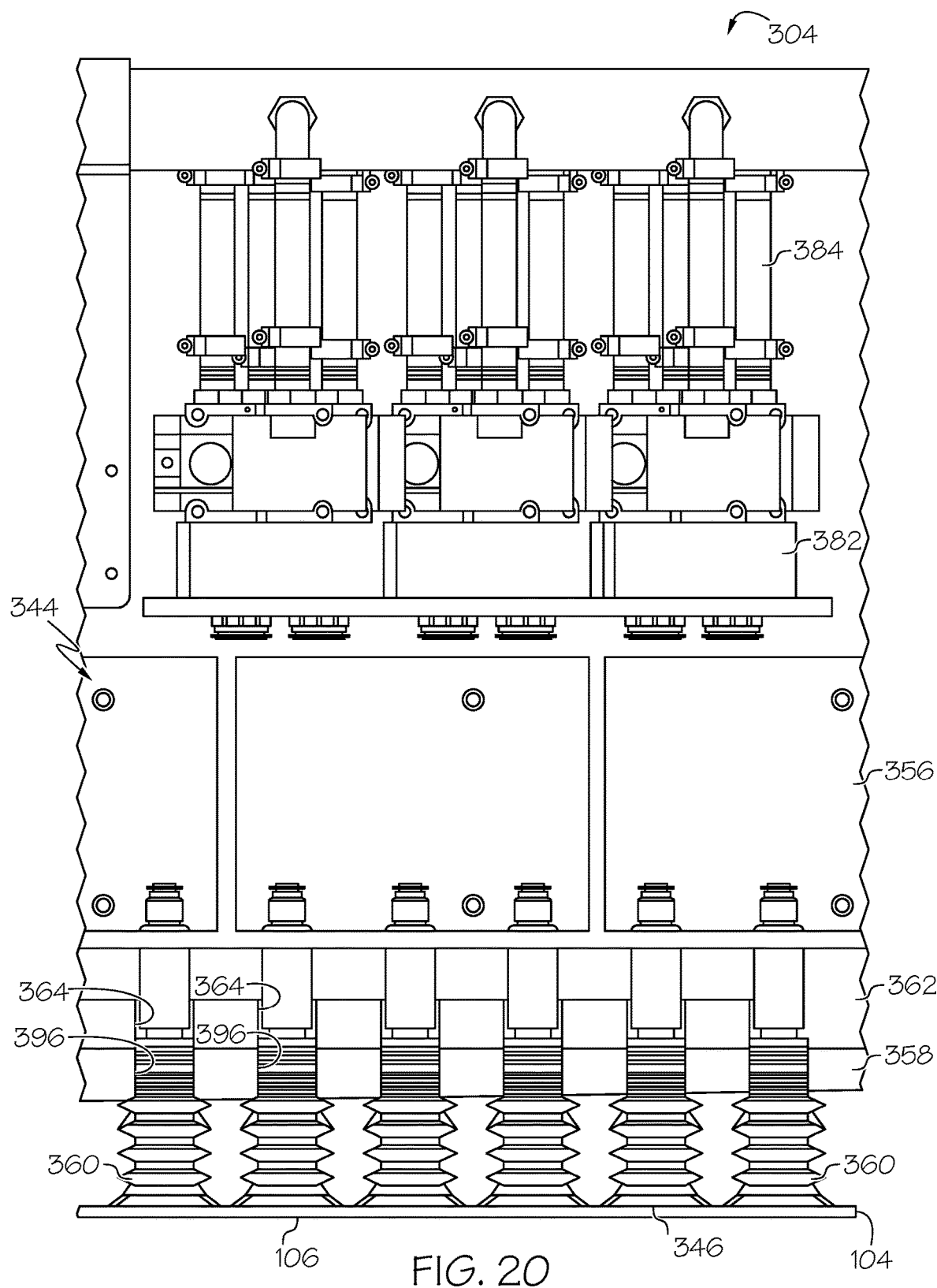
FIG. 20 is a schematic, elevation view, in partial section, of an example of the placement end effector.

Referring now to FIG. 20, which schematically illustrates an example of the placement end effector 304. In one or more examples, the vacuum chuck 312 includes the plurality of vacuum cups 360. The vacuum cups 360 are configured to apply the retention vacuum to the ply carrier 104 during hand-off of the ply carrier 104 and placement of the composite ply 106 on the forming tool 120. In these examples, surfaces of the vacuum cups 360 form the vacuum-chuck contact surface 346.

In one or more examples, the vacuum cups 360 are coupled to and in fluid communication with the vacuum table 344, such as coupled to the vacuum ports 386. In one or more examples, each one of the vacuum cups 360 is mounted on vacuum table 344 via a standoff. Alternatively, in one or more examples, the vacuum cups 360 form a part of the vacuum table 344, such as replacing the plurality of vacuum ports 386 and/or vacuum zones 382. In yet other examples, the vacuum cups 360 are coupled to the vacuum-chuck support member 356 and are coupled to and in fluid communication with the vacuum source. As such a particular operating configuration of the vacuum table 344 and the vacuum cups 360 is not intended to be limiting and configurations other than those described and illustrated are also contemplated.

In one or more examples, each one of or sets of the vacuum cups 360 are controllable to selectively apply or remove vacuum to a corresponding set of the vacuum apertures 128 of the base plate 124 (FIG. 17) positioned over the respective vacuum cup 360. For example, each one of or sets of the vacuum cups 360 are operatively coupled to a corresponding valve 384 (FIG. 20) that is selectively open or closed to control application of vacuum to one or more respective vacuum cups 360. The vacuum cups 360 enable application of vacuum where needed to retain the base plate 124 of the ply carrier 104 on the vacuum cups 360 and to retain the film 126 on the base plate 124. The vacuum cups 360 also enable cessation of vacuum to select areas of the base plate 124, such as during release of the film 126 and the composite ply 106 after application of the composite ply 106 to the forming tool 120 (FIGS. 1,2 and 31-34). The vacuum cups 360 may be arranged to adequately distribute a sufficient retention vacuum to retain base plate 124 on the placement end effector 304 and to retain the film 126 on the surface of the base plate 124 during movement of the ply carrier 104.

In one or more examples, each one of, or at least some of, the vacuum cups 360 are deformable, such as compressible, flexible and the like. The vacuum cups 360 may also be resilient such that they can be deformed and return to their original condition. For example, the vacuum cup 360 may include, or take the form of, a bellows vacuum cup.

Figure 25:
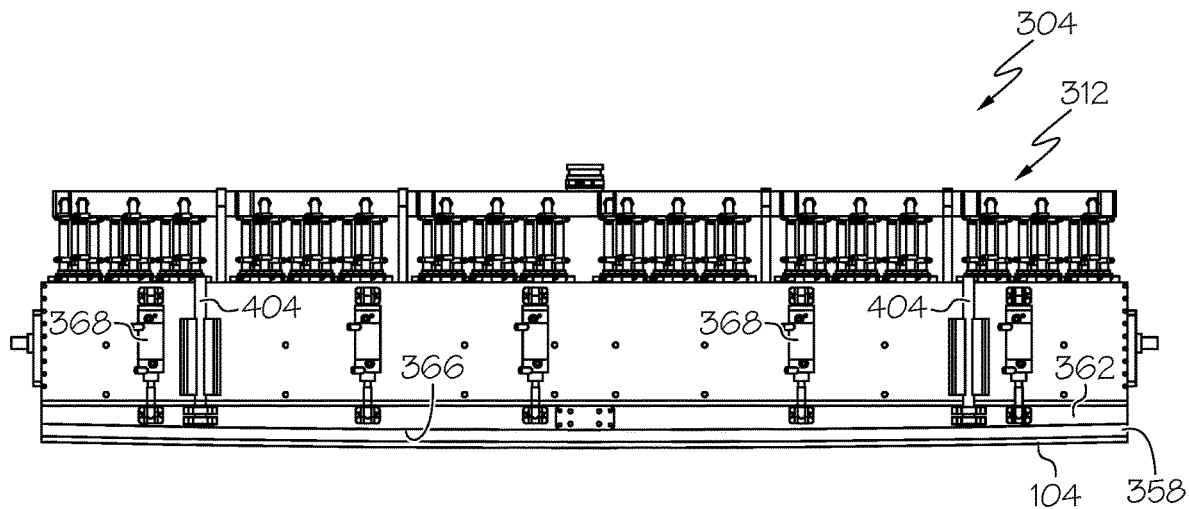
FIG. 25 is a schematic, elevation view of an example of the placement end effector.
Figure 26:
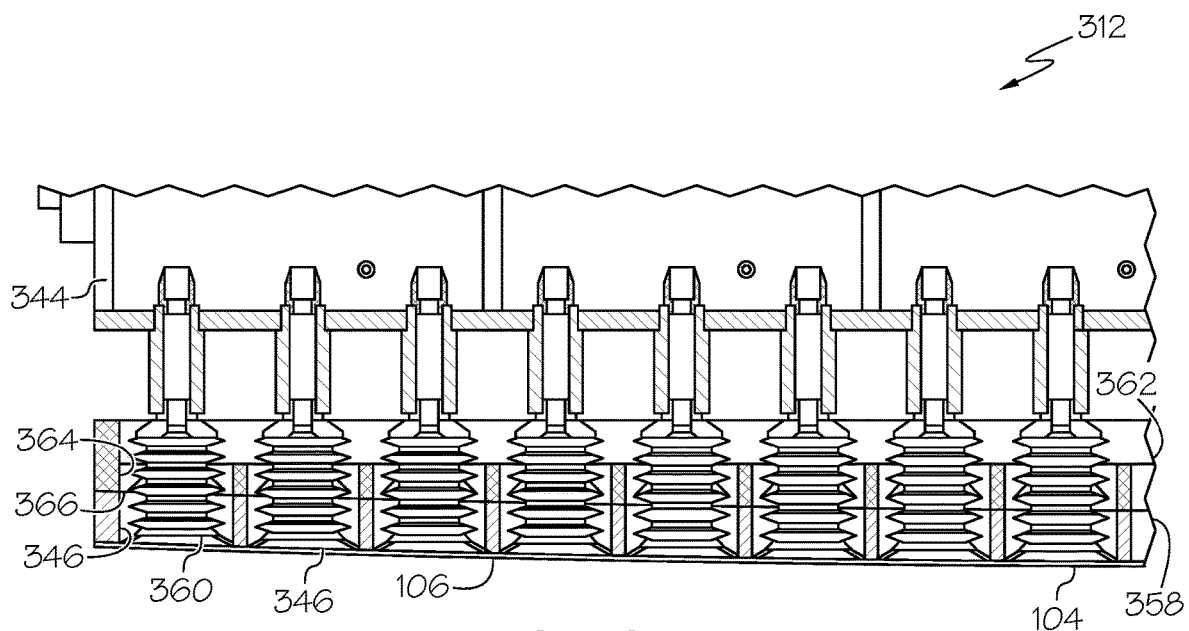
FIG. 26 is a schematic, elevation view, in partial section, of a portion of the placement end effector of FIG. 26.

In one or more examples, the vacuum chuck 312 includes a shaping member 362. The shaping member 362 is coupled to the vacuum table 344 (or the vacuum-chuck support member 356) and is movable relative to the vacuum table 344 and the plurality of vacuum cups 360. The shaping member 362 may move linearly between a retracted position (e.g., as shown in FIGS. 21-24) and an extended position (e.g., as shown in FIGS. 25 and 26). As will be described in more detail herein, the shaping member 362 may be used to create a curvature in the ply carrier 104 during placement and application of the composite ply 106 on the forming tool 120.

In one or more examples, the shaping member 362 includes a plurality of vacuum-cup openings 364. At least a portion of each one of the plurality of vacuum cups 360 is located within a corresponding one of the plurality of vacuum-cup openings 364 of the shaping member 362. The vacuum-cup openings 364 of the shaping member 362 enable the shaping member 362 to move relative to the vacuum cups 360 (e.g., as illustrated in FIGS. 21-26).

In one or more examples, the vacuum-chuck pliable member 358 coupled to the shaping member 362, opposite the vacuum table 344 (or the vacuum-chuck support member 356). In one or more examples, the vacuum-chuck pliable member 358 includes a plurality of vacuum-cup openings 396. The vacuum-cup opening 396 of the vacuum-chuck pliable member 358 are aligned with and in volumetric communication with a corresponding one of the vacuum-cup openings 364 of the shaping member 362. At least a portion of each one of the plurality of vacuum cups 360 is located within a corresponding one of the plurality of vacuum-cup openings 396 of the vacuum-chuck pliable member 358. The vacuum-cup openings 396 of the vacuum-chuck pliable member 358 enable the shaping member 362 and the vacuum-chuck pliable member 358 to move relative to the vacuum cups 360 (e.g., as illustrated in FIGS. 21-26).

Referring now to FIGS. 21-26, which schematically illustrate examples of the placement end effector 304 during removal of the ply carrier 104 and shaping of the ply carrier 104 before placement of the composite ply 106 on the forming tool 120.

Figure 21:
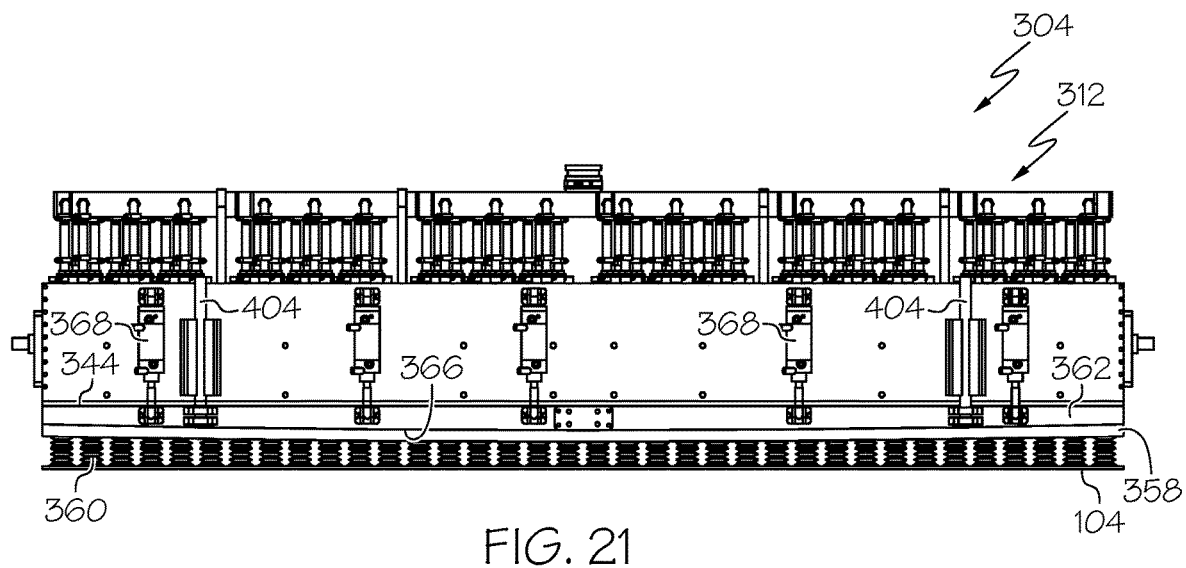
FIG. 21 is a schematic, elevation view of an example of the placement end effector.
Figure 22:
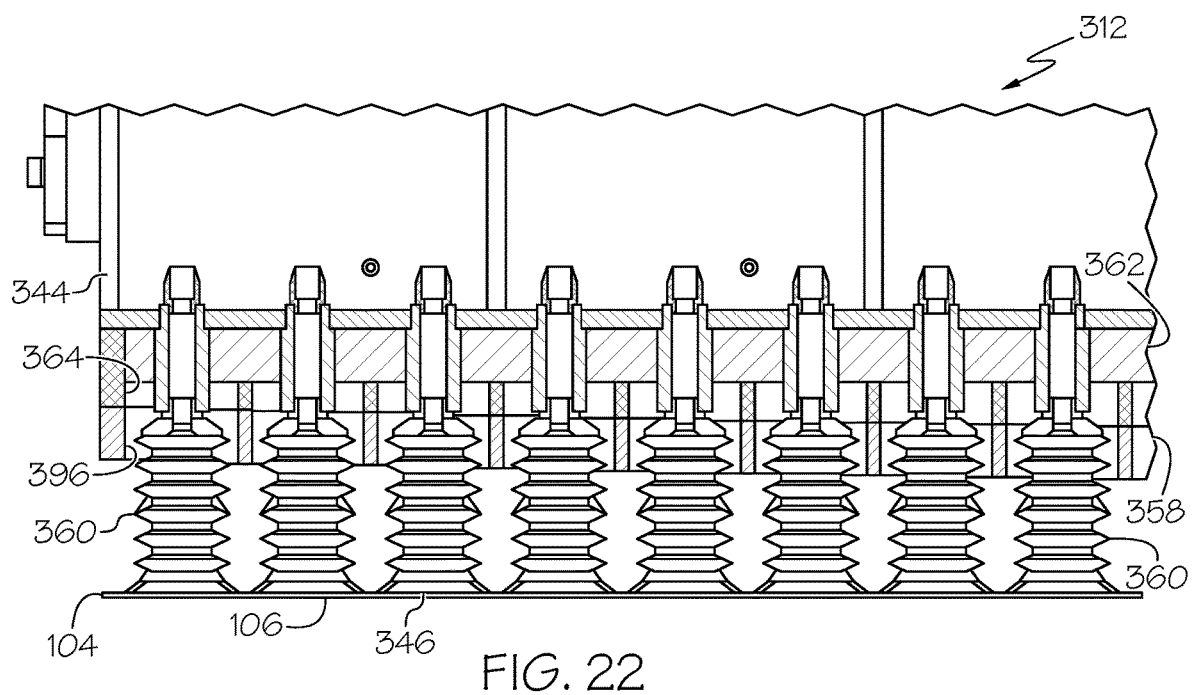
FIG. 22 is a schematic, elevation view, in partial section, of a portion of the placement end effector of FIG. 22.

As illustrated in FIGS. 21 and 22, in one or more examples, during the hand-off operation (e.g., when removing the ply carrier 104 from the transfer end effector 302), the shaping member 362 is in the retracted position and the vacuum cups 360 are in an undeformed state. The placement end effector 304 is moved to place the vacuum-chuck contact surface 346 (e.g., surfaces of the vacuum cups 360) in contact with the base plate 124 of the ply carrier 104.

Figure 23:
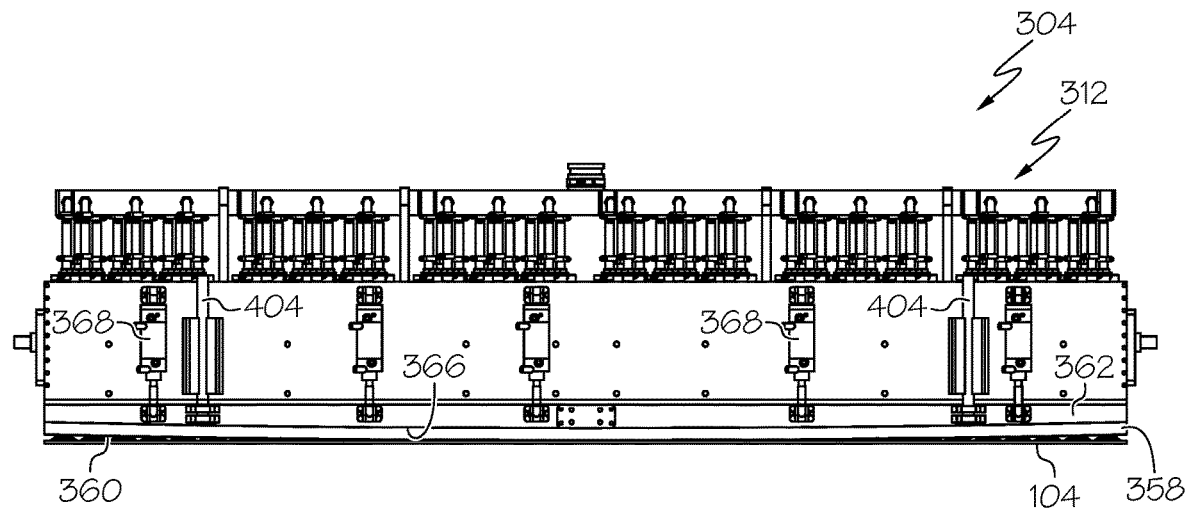
FIG. 23 is a schematic, elevation view of an example of the placement end effector.
Figure 24:
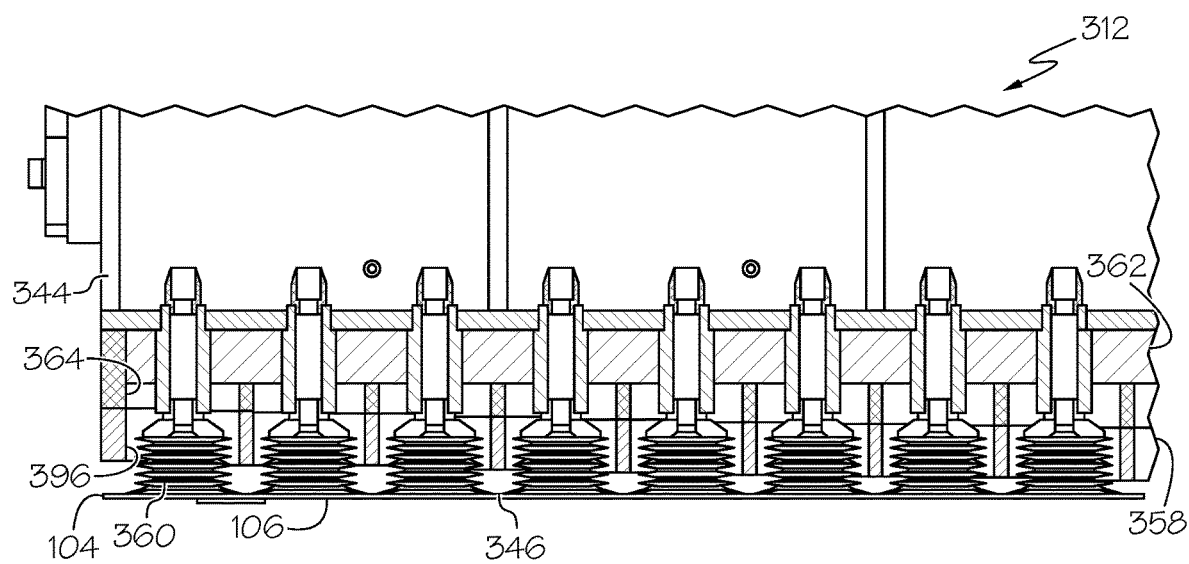
FIG. 24 is a schematic, elevation view, in partial section, of a portion of the placement end effector of FIG. 24.

As illustrated in FIGS. 23 and 24, during the hand-off operation, the retention vacuum is applied to the base plate 124 of the ply carrier 104 via the vacuum cups 360 to remove the ply carrier 104 and hold the ply carrier 104 on the placement end effector 304. Application of the retention vacuum compresses or retracts the vacuum cups 360 (e.g., as shown in FIG. 24). In one or more examples, vacuum cups 360 compress or retract substantially equally thus maintaining the ply carrier 104 in a substantially planar configuration.

In certain applications of the disclosed system 300 and method 1200, it may be beneficial or advantageous to control the curvature of the ply carrier 104 and, thus, the composite ply 106, during placement of the composite ply 106 on the forming surface 118 of the forming tool 120. For example, the forming tool 120 may have a complex shape or a portion of the forming surface 118 may have a curvature. Controlling the curvature of (e.g., creating curvature in) the ply carrier 104 and, thus, the composite ply 106 may provide an increase in contact surface area between the composite ply 106 and the forming surface 118 when the composite ply 106 is applied (e.g., stamped) onto the forming tool 120.

In one or more examples, the shaping member 362 includes a shaping surface 366. In one or more examples, the shaping surface 366 is contoured and is configured to create a contour or curvature in the ply carrier 104. For example, the shaping surface 366 may have a contour or a curve along one or more axes. In an example, the shaping surface 366 is convex (e.g., as illustrated in FIGS. 21,23 and 25). In another example, the shaping surface 366 is concave. In one or more examples, the shaping surface 366 may be substantially planar and is configured to maintain the ply carrier 104 in a substantially planar configuration.

As illustrated in FIGS. 25 and 26, a curvature may be formed in the ply carrier 104 using the shaping member 362. In one or more examples, with the ply carrier 104 held on the vacuum cups 360, the shaping member 362 is moved from the retracted position (e.g., as shown in FIGS. 23 and 24) to the extended position until the vacuum-chuck contact surface 346 of the vacuum-chuck pliable member 358 is in contact with the base plate 124 of the ply carrier 104. The vacuum-chuck pliable member 358 is sandwiched and compressed between the shaping surface 366 and the base plate 124 of the ply carrier 104. The shaping member 362 pushes on the ply carrier 104 held by the vacuum cups 360. The contoured shape of the shaping surface 366 imparts a substantially similar contour to the ply carrier 104. The vacuum cups 360 can extend in response to creation of the contour in the ply carrier 104, while maintaining the retention vacuum to hold the ply carrier 104 on the placement end effector 304.

For example, as illustrated in FIG. 26, the convex contour of the shaping surface 366 creates a convex contour in the ply carrier 104. The vacuum cups 360 in locations where there is minimal curvature (e.g., proximate to the ends of the ply carrier 104) may extend a relatively small amount in response to the shaping force applied to the ply carrier 104 by the shaping member 362. The vacuum cups 360 in location where there is maximum curvature (e.g., proximate to the center of the ply carrier 104) may extend a relatively large amount in response to the shaping force applied to the ply carrier 104 by the shaping member 362.

In one or more examples, the vacuum chuck 312 includes a shaping actuator 368. The shaping actuator 368 is arranged between and is coupled to the vacuum table 344 (or the vacuum-chuck support member 356) and to the shaping member 362. The shaping actuator 368 is configured to selectively drive and control movement of the shaping member 362 relative to the vacuum table 344. In one or more examples, the vacuum chuck 312 includes a plurality of transfer actuators 348, for example, are located around a perimeter of the vacuum table 344 and the shaping member 362.

The shaping actuator 368 may include any one of various suitable types of selectively controlled actuators. In one or more examples, the shaping actuator 368 may include, or take the form of, a linear actuator, such as a pneumatic actuator, an electro-mechanical actuator and the like.

In one or more examples, the vacuum chuck 312 also includes a shaping guide 404. The shaping guide 404 is coupled to the vacuum table 344 (or the vacuum-chuck support member 356) and to the shaping member 362. The shaping guide 404 is configured to direct and assist linear movement of the shaping member 362.

Referring now to FIGS. 13 and 31-34, which illustrate an example of a ply hand-off and placement operation. Generally, the ply hand-off and placement operation utilizes the placement apparatus 402 and, more particularly, the placement end effector 304 to: (1) remove the ply carrier 104 from the transfer end effector 302; (2) reposition and/or reorient the ply carrier 104 for placement of the composite ply 106 on the forming tool; and (3) apply the composite ply 106 to the forming tool 120.

Figure 31:
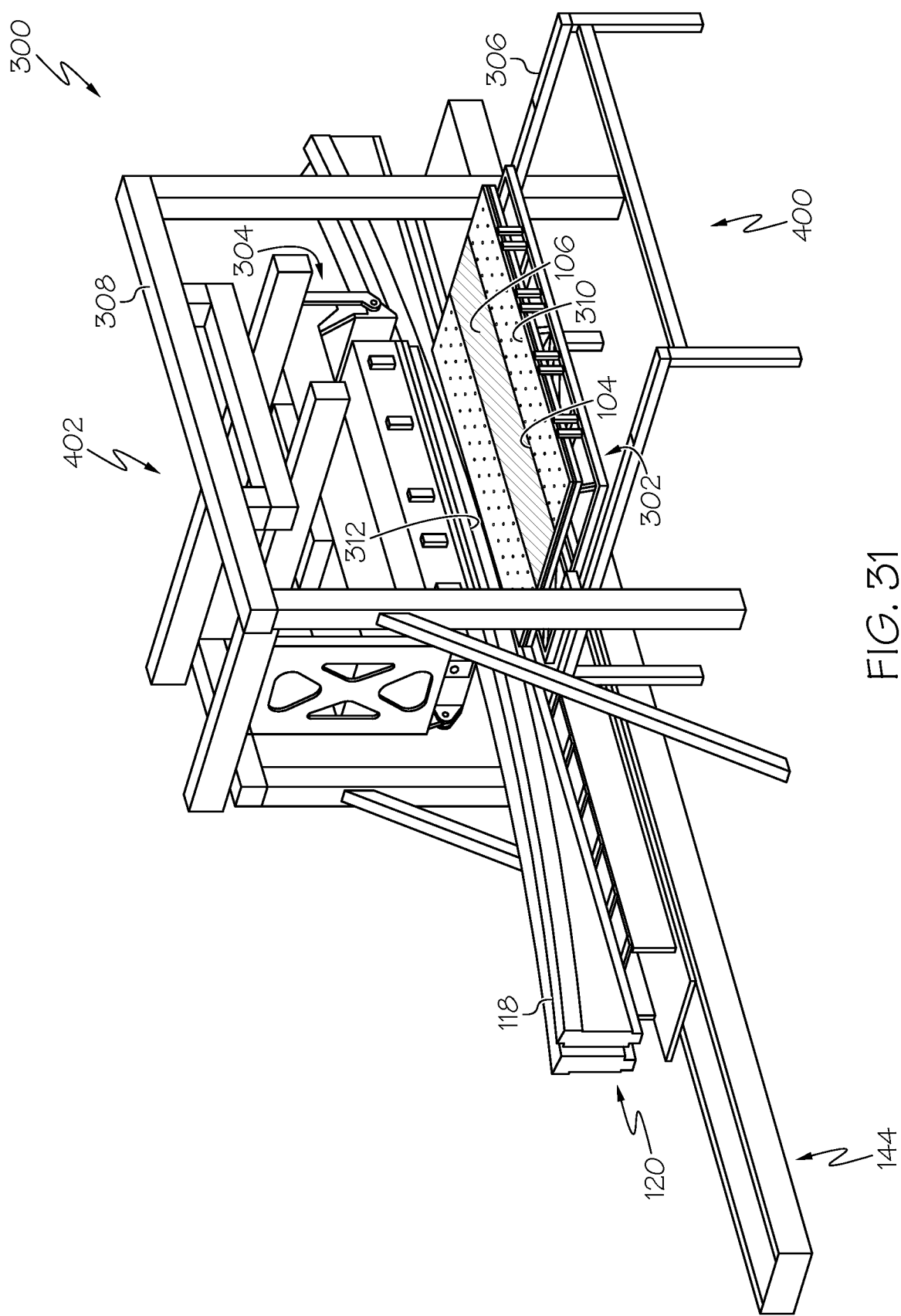
FIG. 31 is a schematic, perspective view of an example of the system, depicting the transfer end effector and the placement end effector in the hand-off orientation.
Figure 32:
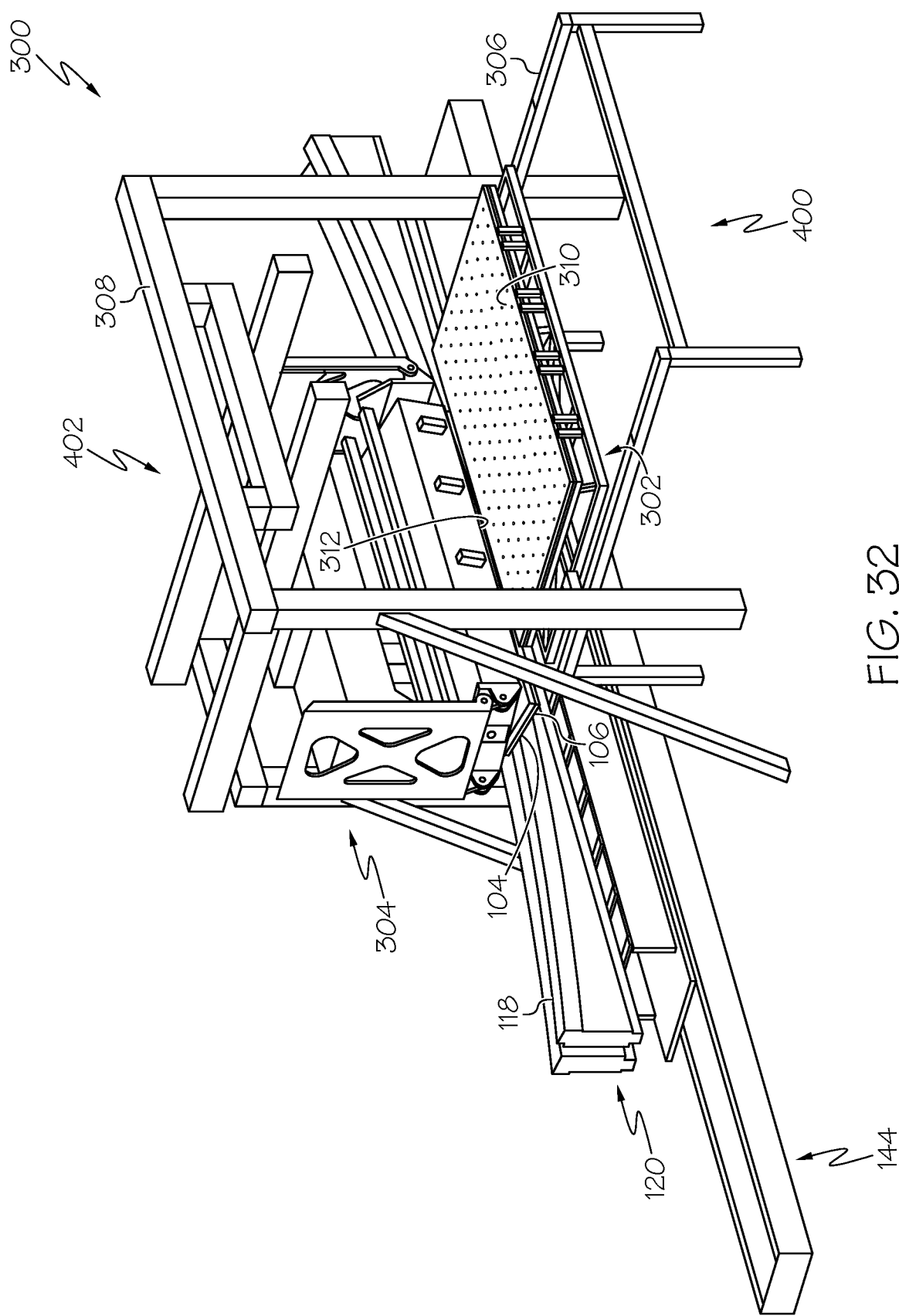
FIG. 32 is a schematic, perspective view of the system shown in FIG. 31, depicting the placement end effector applying the composite ply, supported by the ply carrier, to a forming tool of the system.

As illustrated in FIGS. 13,31 and 32, at a first stage of the ply hand-off and placement operation, the transfer end effector 302 is used to locate the ply carrier 104 relative to the placement apparatus 402 and the placement end effector 304 is positioned in a hand-off orientation, such that the vacuum chuck 312 is facing the base plate 124 of the ply carrier 104. The vacuum chuck 312 is moved toward the ply carrier 104 such that the vacuum-chuck contact surface 346 is in contact with the base plate 124 of the ply carrier 104 (e.g., as shown in FIG. 13). With the vacuum-chuck contact surface 346 in contact with the base plate 124, the vacuum chuck 312 applies the retention vacuum to engage the base plate 124 of the ply carrier 104. With the vacuum chuck 312 engaged with the base plate 124 of the ply carrier 104 via vacuum, the vacuum chuck 312 is then moved away from the transfer end effector 302 such that the ply carrier 104 is removed from the transfer end effector 302.

Figure 34:
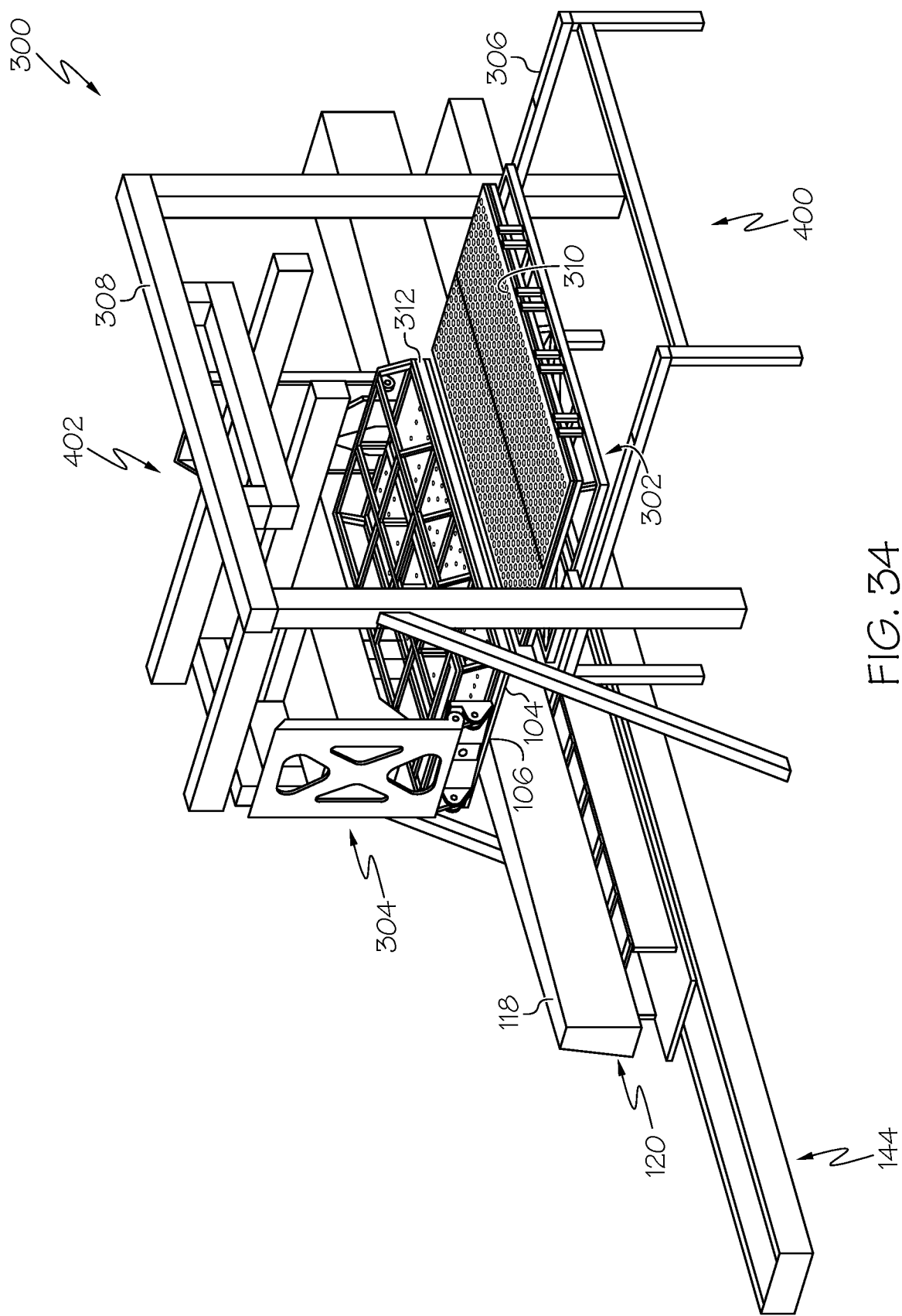
FIG. 34 is a schematic, perspective view of the system shown in FIG. 33, depicting the placement end effector applying the composite ply, supported by the ply carrier, to the forming tool of the system.
Figure 35:
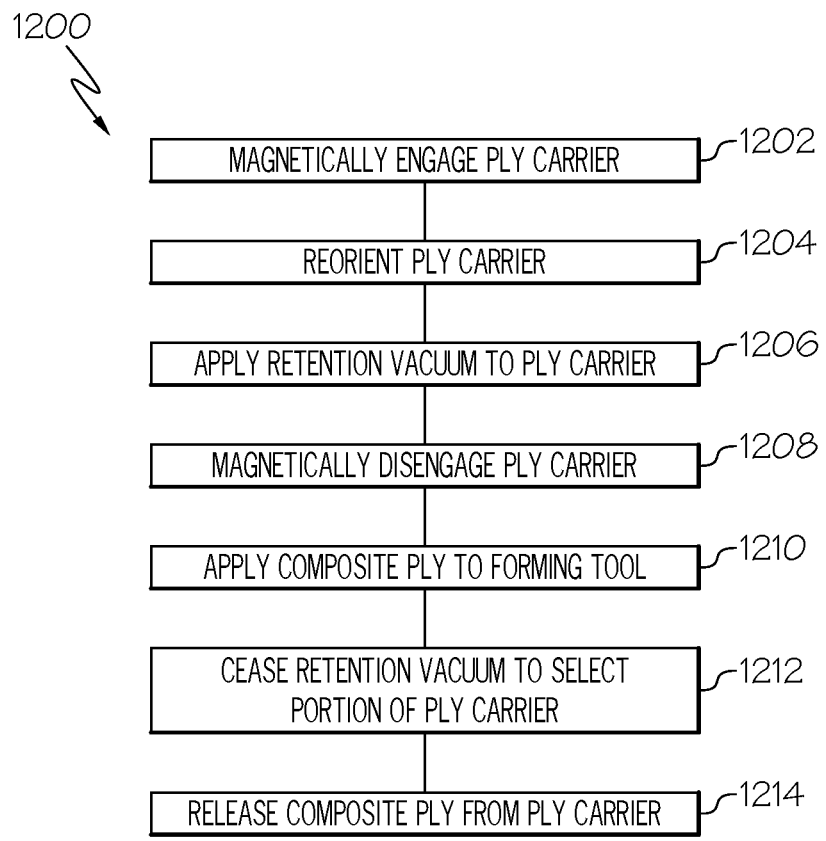
FIG. 35 is a flow diagram of an example of a method of placing a composite ply.

As illustrated in FIGS. 32 and 34, at a second stage of the ply hand-off and placement operation, with the vacuum chuck 312 engaged with the base plate 124 of the ply carrier 104, the placement end effector 304 is repositioned in placement orientation, such that the ply carrier 104 is suitably positioned for placement of the composite ply 106 on the forming surface 118 of the forming tool 120. The ply carrier 104 is oriented such that the composite ply 106 is approximately parallel to at least a portion of the forming surface 118 of the forming tool 120. In one or more examples, the placement end effector 304 is pivoted about the pivot axis 340 (FIGS. 14 and 15) to properly orient the ply carrier 104 (e.g., as shown in FIG. 32). As such, with the placement end effector 304 in the placement orientation, the composite ply 106 is facing the forming surface 118 of the forming tool 120 to which it is to be applied.

At a third stage of the ply transfer operation, with the vacuum chuck 312 engaged with the base plate 124 of the ply carrier 104 and the placement end effector 304 in the placement orientation, the placement end effector 304 moves to press the composite ply 106 against the forming surface 118 of the forming tool 120 and apply the composite ply 106. For example, the placement end effector 304 and, thus, the ply carrier 104, supporting the composite ply 106, is moved toward the forming tool 120, such that the composite ply 106 engages the forming tool 120. During application, the composite ply 106 is sandwiched between the forming surface 118 of the forming tool 120 and the base plate 124 of the ply carrier 104. The composite ply 106 adheres to a portion of the forming surface 118 via the resin matrix. The vacuum chuck 312 then selectively removes the retention vacuum from a select portion of the ply carrier 104 to release the film 126 and, thus, the composite ply 106. The composite ply 106 adheres to a portion of the forming surface 118 via the resin matrix. The placement end effector 304 is then moved away from the forming tool 120 to remove the empty ply carrier 104.

Figure 27:
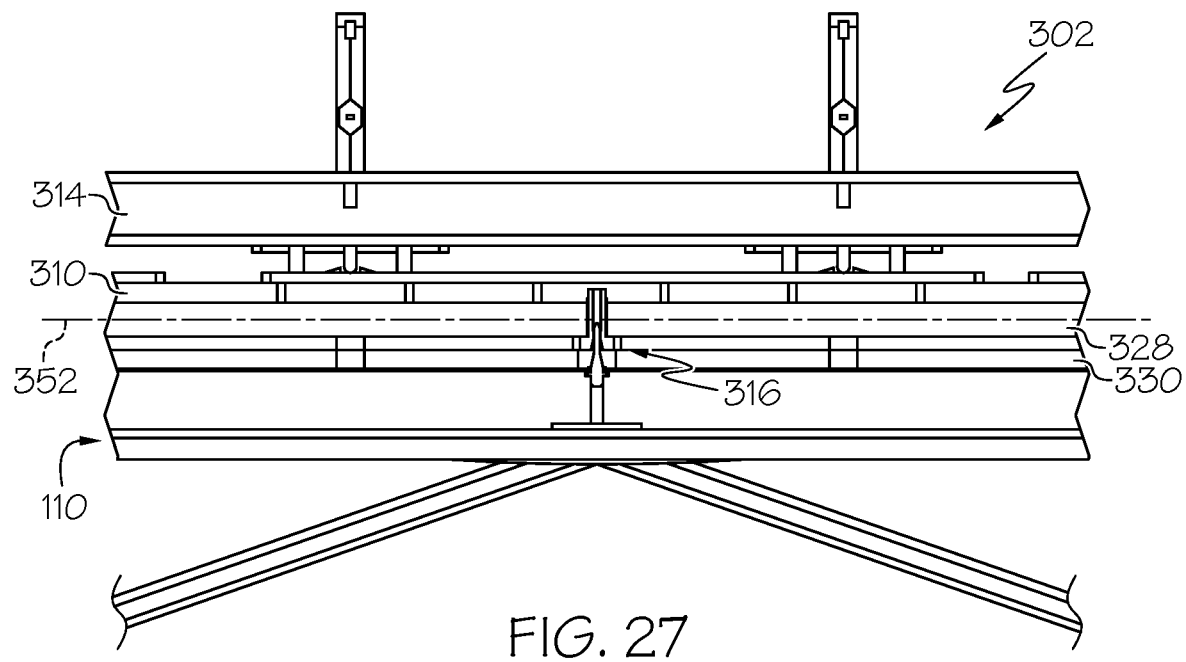
FIG. 27 is a schematic, elevation view of a portion of the transfer end effector and a portion of the ply carrier, depicting a first indexing device.
Figure 28:
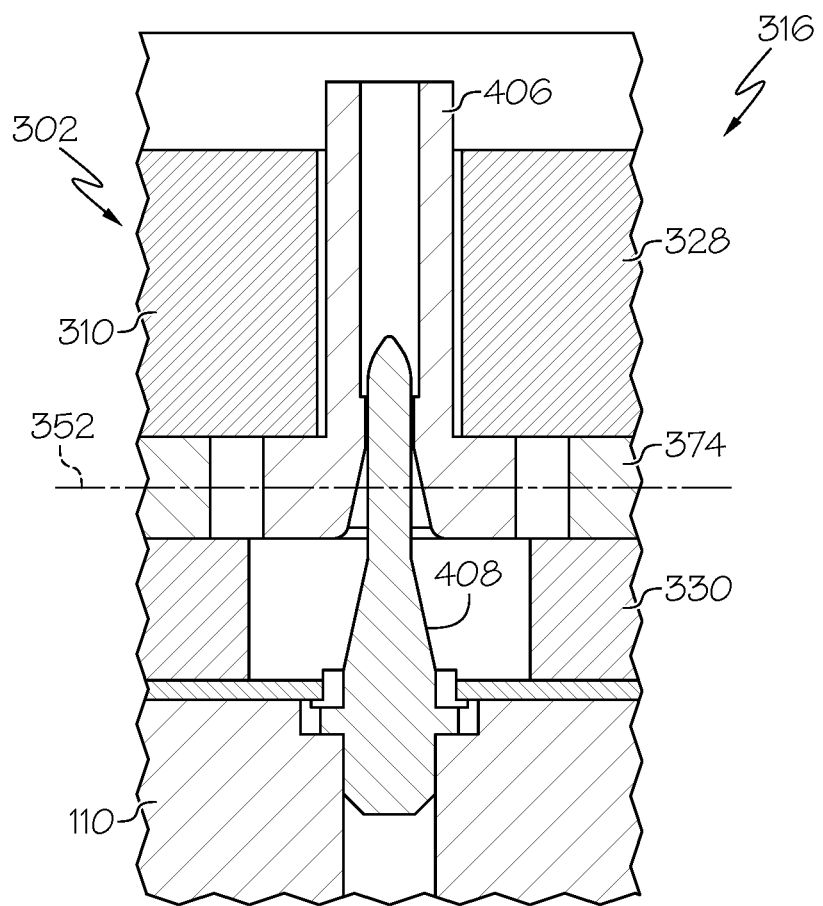
FIG. 28 is a schematic, elevation view, in section, of the first indexing device shown in FIG. 28.

Referring now to FIGS. 27 and 28, which schematically illustrate examples of a first indexing device 316. In one or more examples, the transfer end effector 302 includes a first portion of the first indexing device 316 that is configured to cooperate with a second portion of the first indexing device 316 located on the carrier transfer device 110. Alignment and engagement of the first portion and the second portion of the first indexing device 316 enables indexing of the magnetic chuck 310 relative to the carrier transfer device 110 during the pick-up operation for removal of the ply carrier 104 from the carrier transfer device 110 by the transfer end effector 302.

In one or more examples, the first portion of the first indexing device 316 includes, or takes the form of, a pin receiver 406. The second portion of the first indexing device 316 includes, or takes the form of, a locating pin 408. The pin receiver 406 is coupled to the magnetic chuck 310, such as to the magnetic-chuck support member 328. The locating pin 408 is coupled to and projects from the carrier transfer device 110. The pin receiver 406 is configured to receive the locating pin 408 when the transfer end effector 302 moves into position to remove the ply carrier 104 from the carrier transfer device 110. In these examples, the magnetic-chuck pliable member 330 may include a pin opening that is aligned with the pin receiver 406 such that the locating pin 408 can pass through the magnetic-chuck pliable member 330.

Referring now to FIGS. 29 and 30, which schematically illustrate examples of a second indexing device 338. In one or more examples, the transfer end effector 302 includes a first portion of the second indexing device 338. The placement end effector 304 includes a second portion of the second indexing device 338. The first portion and the second portion of the second indexing device 338 are configured to cooperate. Alignment and engagement of the first portion and the second portion of the second indexing device 338 enables indexing of the placement end effector 304 relative to the transfer end effector 302 during the hand-off operation for removal of the ply carrier 104 from the transfer end effector 302 by the placement end effector 304.

In one or more examples, the first portion of the second indexing device 338 includes, or takes the form of, the pin receiver 406. The second portion of the second indexing device 338 includes, or takes the form of, the locating pin 408. The pin receiver 406 is coupled to the magnetic chuck 310, such as to the magnetic-chuck support member 328. The locating pin 408 is coupled to and projects from the vacuum chuck 312, such as the vacuum table 344 or the vacuum-chuck support member 356. The pin receiver 406 is configured to receive the locating pin 408 when the placement end effector 304 moves into position to remove the ply carrier 104 from the transfer end effector 302. In these examples, the magnetic-chuck pliable member 330 may include a pin opening that is aligned with the pin receiver 406 such that the locating pin 408 can pass through the magnetic-chuck pliable member 330.

In one or more examples, the first portion of the first indexing device 316 and the first portion of the second indexing device 338 are the same component of the transfer end effector 302. In other words, the pin receiver 406 of the magnetic chuck 310 is configured to receive the locating pin 408 of the carrier transfer device 110 during pick-up and to receive the locating pin 408 of the placement end effector 304 during hand-off.

It can be appreciated that the system 300 may include a plurality of (e.g., at least two) first indexing devices 316 to properly index the transfer end effector 302 relative to the carrier transfer device 110 and a plurality of (e.g., at least two) second indexing devices 338 to properly index the placement end effector 304 relative to the transfer end effector 302.

Referring now to FIGS. 3 and 27-30, the system 300 may also be configured to accommodate and correct for slight misalignment during an indexing of the transfer end effector 302 to the carrier transfer device 110 using the first indexing device 316 and during an indexing of placement end effector 304 to the transfer end effector 302 using the second indexing device 338. In one or more examples, the magnetic chuck 310 is configured to move relative to the transfer frame 314 along a float axis 354. The float axis 352 is approximately perpendicular to the first movement axis 352 (FIG. 3). For example, the transfer actuators 348 and the transfer guides 350 of the transfer end effector 302 have a small degree of free movement and are configured to enable movement of the magnetic chuck 310 relative to the transfer frame 314 along the float axis. Movement of the magnetic chuck 310 relative to the transfer frame 314 along the float axis 354 facilitates indexing of the transfer end effector 302 relative to the carrier transfer device 110. Movement of the magnetic chuck 310 relative to the transfer frame 314 along the float axis 354 also facilitates indexing of the transfer end effector 302 relative to the placement end effector 304.

Additionally, the first indexing device 316 (FIGS. 27 and 28) and the second indexing device 338 (FIGS. 29 and 30) are configured to urge movement of the magnetic chuck 310 relative to the transfer frame 314 during indexing. For example, the pin receiver 406 includes a conical opening for receiving the locating pin 408 and that forms a conical indexing surface. As best illustrated in FIG. 29, if a slight misalignment is present upon initially locating the transfer end effector 302, the locating pin 408 engages a portion of the conical indexing surface. As the locating pin 408 is further received by the pin receiver 406, the locating pin 408 applies a force on the conical indexing surface and the magnetic chuck 310 moves along the float axis 354 in response to the force to coaxially align the pin receiver 406 and the locating pin 408, as best illustrated in FIGS. 28 and 30.

Referring to FIG. 35, which illustrates an example of the method 1200 of placing the composite ply 106. Implementations of the method 1200 are performed using the system 300, as illustrated in FIGS. 1-34.

In one or more examples, the method 1200 includes a step of (block 1202) magnetically engaging the ply carrier 104, supporting the composite ply 106. For example, the carrier transfer device 110 is loaded with the ply carrier 104, supporting the composite ply 106 (e.g., as shown in FIG. 38). The carrier transfer device 110 and the transfer end effector 302 are positioned relative to each other for pick-up and removal of the ply carrier 104 (e.g., as shown in FIG. 6). The magnetic chuck 310 indexes and moves into contact with the ply carrier 104 and/or the composite ply 106, supported on the ply carrier 104 (e.g., as shown in FIGS. 27 and 28). The magnetic-chuck actuator 324 positions the magnets 320 into magnetic engagement with the base plate 124 of the ply carrier 104 (e.g., as shown in FIGS. 7-9).

In one or more examples, the method 1200 includes a step of (block 1204) reorienting the ply carrier 104. For example, transfer end effector 302 picks up and removes (e.g., lifts off) the ply carrier 104 and the composite ply 106, supported on the ply carrier 104, from the carrier transfer device 110. The transfer end effector 302 rotates about the rotation axis 322 to flip the ply carrier 104 over such that the base plate 124 is accessible by the placement end effector 304 (e.g., as shown in FIGS. 10, 11, 31 and 33).

Figure 33:
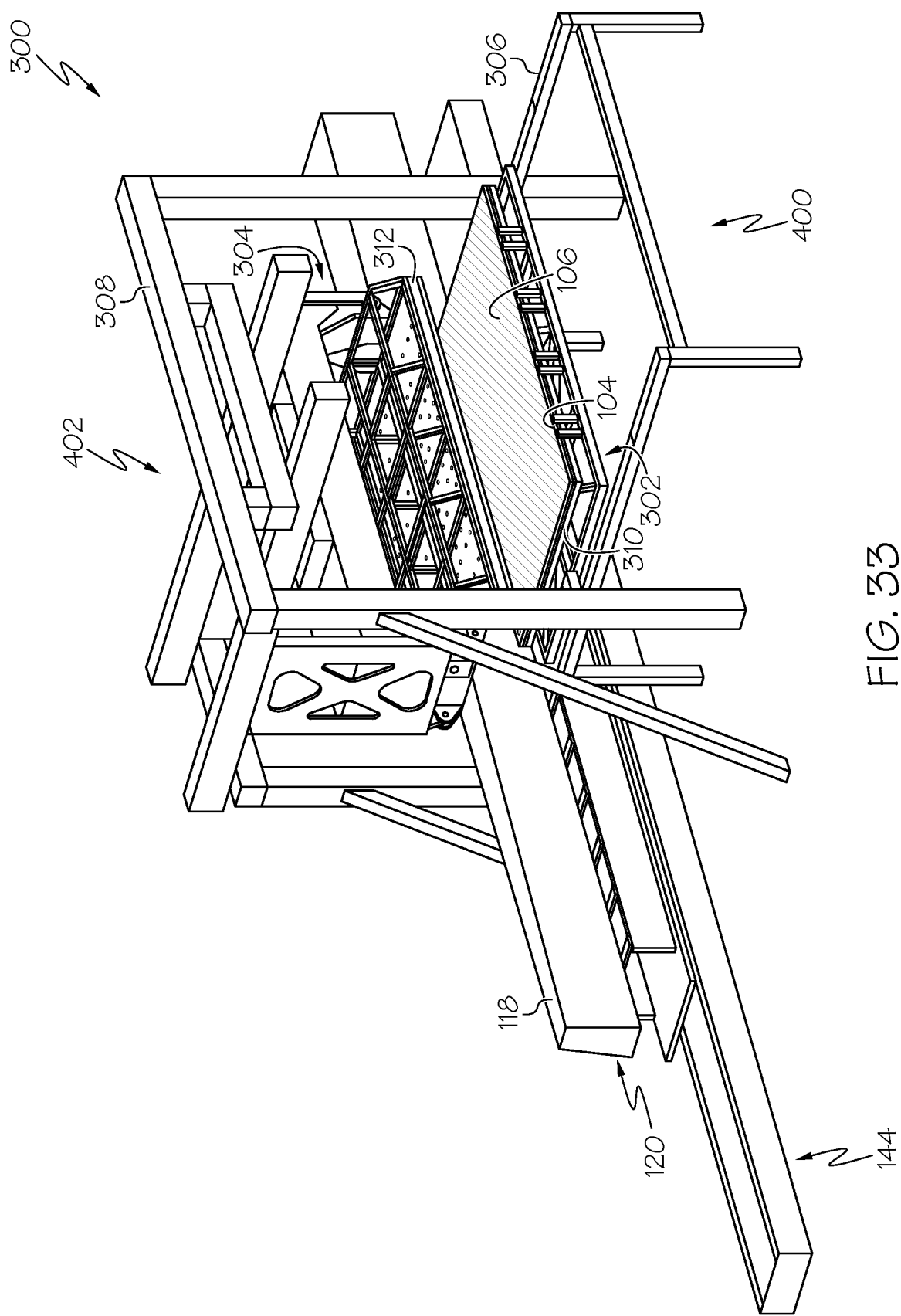
FIG. 33 is a schematic, perspective view of an example of the system, depicting the transfer end effector and the placement end effector in the hand-off orientation.

In one or more examples, the method 1200 includes a step of (block 1206) applying the retention vacuum to the ply carrier 104. For example, the transfer end effector 302 and the placement end effector 304 are positioned relative to each other for hand-off of the ply carrier 104 (e.g., as shown in FIGS. 31 and 33). The vacuum chuck 312 indexes and moves into contact with the base plate 124 of the ply carrier 104 (e.g., as shown in FIGS. 13, 29 and 30). The vacuum chuck 312 applies the retention vacuum to the ply carrier 104 using the vacuum table 344 or the plurality of vacuum cups 360.

In one or more examples, the method 1200 includes a step of (block 1208) magnetically disengaging the ply carrier 104. For example, the magnetic-chuck actuator 324 positions the magnets 320 into magnetic disengagement from the base plate 124 of the ply carrier 104 (e.g., as shown in FIGS. 7-9). The placement end effector 304 picks up and removes (e.g., lifts off) the ply carrier 104 and the composite ply 106, supported on the ply carrier 104, from the transfer end effector 302.

In one or more examples, the method 1200 includes a step of (block 1210) applying the composite ply 106 to the forming tool 120. For example, the placement end effector 304 is positioned relative to the forming tool 120 for placement (e.g., application) of the ply carrier 104 (e.g., as shown in FIGS. 32 and 34). The placement end effector 304 moves the composite ply 106 into contact with the forming surface 118 of the forming tool 120 and presses (e.g., stamps) the ply carrier 104 and, thus, the composite ply 106 against the forming surface 118.

It can be appreciated that the configuration of the vacuum chuck 312, such as use of the vacuum table 344 or the vacuum cups 360, may depend on various manufacturing factors, such as the type of composite structure 102 (FIG. 36) being fabricated, the size and/or shape of the composite ply 106, the type and/or geometry of the forming tool 120 and the like. As an example, the vacuum table 344 may be used to place the composite ply 106 on the forming tool 120 where a portion of the forming surface 118 on which the composite ply 106 is placed is generally planar (e.g., as shown in FIG. 34). As another example, the vacuum cups 360 may be used to place the composite ply 106 on the forming tool 120 where a portion of the forming surface 118 on which the composite ply 106 is placed is contoured (e.g., as shown in FIG. 32).

In one or more examples, the method 1200 includes a step of forming a curvature in the ply carrier 104 and, thus, the composite ply 106 using the shaping member 362. It can be appreciated that the shape of the contour and/or the degree of curvature formed using the shaping member 362 may depend on various factors, such as the type of composite structure 102 (FIG. 36) being fabricated, the size and/or shape of the composite ply 106, the type and/or geometry of the forming tool 120 and the like. The step of forming the curvature is performed before the step of (block 1210) applying the composite ply 106 to the forming tool 120.

In one or more examples, the method 1200 includes a step of (block 1212) ceasing the retention vacuum to a select portion of the ply carrier 104. For example, the composite ply 106 is tacked to the forming tool 120 via the resin matrix. The vacuum chuck 312 selectively ceases (e.g., removes) the retention vacuum from a select portion of the ply carrier 104 to release the film 126, and the composite ply 106 attached (e.g., adhered via the resin matrix) to the film 126, from the base plate 124, while selectively applying (e g, maintaining) the retention vacuum to a select different portion of the ply carrier 104 to hold the base plate 124 on the vacuum chuck 312.

In one or more examples, the method 1200 includes a step of (block 1214) releasing the composite ply 106 from the ply carrier 104. For example, the placement end effector 304 moves away from the forming tool 120 keeping the ply carrier 104 (e.g., the base plate 124) and leaving the composite ply 106, with the attached film 126, on the forming tool 120.

In one or more examples, the method 1200 includes a step of returning the ply carrier 104. For example, the transfer end effector 302 and the placement end effector 304 are positioned relative to each other for hand-off of the ply carrier 104 back to the transfer end effector 302. The magnetic-chuck actuator 324 positions the magnets 320 into magnetic engagement with the base plate 124 of the ply carrier 104. The vacuum chuck 312 selectively ceases (e.g., removes) the retention vacuum from the ply carrier 104 to release the ply carrier 104. The carrier transfer device 110 and the transfer end effector 302 are positioned relative to each other for return of the ply carrier 104 to the carrier transfer device 110. The carrier transfer device 110 is re-loaded with another composite ply 106, supported on the ply carrier 104.

In one or more examples, the operations described above are repeated a number of times to transfer and place any number of composite plies 106.

Referring now to FIGS. 36-41, by way of examples, the present disclosure is further directed to a system for fabricating a composite structure (referred to herein as "system" 100). Referring to FIG. 42, by way of examples, the present disclosure is additionally directed to a method of fabricating a composite structure. The present disclosure is also directed to a composite structure 102 fabricated using the system 300 and/or the system 100 or according to the method 1200 and/or the method 1000.

Examples of the system 100 and method 1000 enable automated fabrication of the composite structure 102 and, more particularly, automated fabrication of at least one composite ply 106 and formation of at least one composite ply 106 over a forming tool 120 for manufacture of the composite structure 102. Automation of the fabrication process can provide a reduction in processing time, a reduction in labor and costs, and/or a reduction of process variations (e.g., human error) that may lead to undesired inconsistencies in the finished composite structure as compared to conventional composite fabrication. The system 100 and method 1000 also enable ply-by-ply application and formation of the composite material to fabricate the composite structure 102. Ply-by-ply formation facilitates fabrication of large composite structures, thick composite structures, and/or composite structures with complex shapes. Ply-by-ply formation also can provide a reduction in buckling or wrinkling of plies within the composite structure as compared to conventional composite fabrication.

Figure 37:
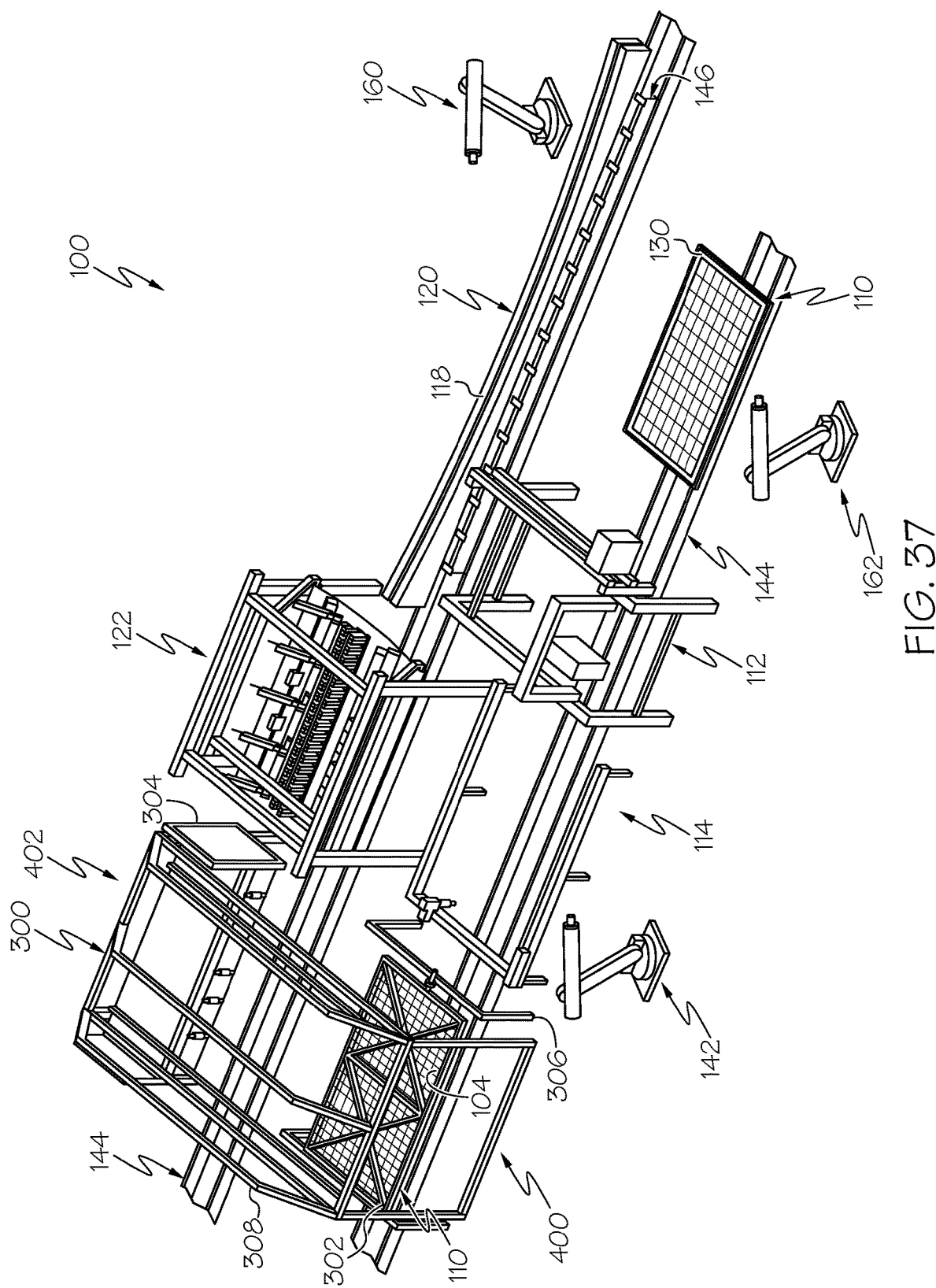
FIG. 37 is a schematic illustration of an example of the system for fabricating a composite structure shown in FIG. 36.

Referring to FIGS. 36 and 37, which schematically illustrate examples of the disclosed system 100. The system 100 includes a plurality of sub-systems that facilitate and correspond to different fabrication operations associated with the manufacture of the composite structure 102. The sub-systems of the system 100 are interlinked and cooperate to automate at least a portion of the fabrication process. Throughout the present disclosure, the sub-systems of the disclosed system 100 may be referred to as "systems" themselves or stations in which one or more fabrication operations occur.

The examples of the system 100 and method 1000 described herein utilize the plurality of semi-automated or automated sub-systems to perform ply-by-ply formation and compaction of individual composite plies 106 on the forming tool 120. Ply-by-ply formation refers to the laydown of composite plies 106 on the forming tool 120 in a predetermined sequence and/or predetermined ply angle, and the composite plies 106 are compacted onto the forming tool 120 individually after each composite ply 106 is laid down, or after more than one composite ply 106 had been laid down.

In one or more examples, the system 100 includes a lamination system 112 (e.g., laminating sub-system or station), the transfer and placement system 300, also referred to herein generally as a transfer system or a placement system (e.g., transfer and placement sub-system or station) and a forming system 122 (e.g., forming sub-system or station). In one or more examples, the system 100 also includes a trim system 114 (e.g., trim sub-system or station) and a scrap removal system 142 (e.g., a scrap removal sub-system of station). In one or more examples, the system 100 further includes a film removal system 160 (e.g., film removal sub-system or station). In one or more examples, the system 100 additionally includes a carrier preparation system 162 (e.g., carrier preparation sub-system or station). In one or more examples, the system 100 also includes a positioning system 144 (e.g., positioning sub-system).

Generally, the ply carrier 104 is movable relative to an individual sub-system or station of the system 100. Once at least one composite ply 106 is formed on the ply carrier 104, the ply carrier 104 facilitates sequential conveyance of the composite ply 106 to the individual sub-systems or stations of the system 100. The carrier transfer device 110 supports the ply carrier 104 and moves the ply carrier 104 between the sub-systems of the system 100 that implement composite ply fabrication operations of the composite manufacturing process.

In one or more examples, the system 100 includes a tool transfer device 146. The tool transfer device 146 is configured to convey the forming tool 120. For example, the tool transfer device 146 includes, or takes the form of, a mobile platform that supports the forming tool 120 and moves the forming tool 120 between the sub-systems of the system 100 that implement composite structure fabrication operations of the composite manufacturing process.

Referring to FIG. 38-41, which schematically illustrate examples of the carrier transfer device 110 and the ply carrier 104. In one or more examples, the film 126 is releasably coupled to the base plate 124 via vacuum retention. In these examples, the base plate 124 facilitates vacuum to move through the ply carrier 104 and engage the film 126. For example, the carrier transfer device 110 includes a vacuum table 130 (e.g., FIGS. 38-40) and the base plate 124 includes the plurality of vacuum apertures 128 (e.g., FIG. 41). The plurality of vacuum apertures 128 allow for vacuum to move through the base plate 124. With the ply carrier 104 positioned on the carrier transfer device 110, the vacuum table 130 is in fluid communication with the plurality of vacuum apertures 128. The vacuum table 130 includes a perforated top and a vacuum chamber that is in fluid communication with a vacuum source. The vacuum table 130 is configured to apply a retention vacuum to the plurality of vacuum apertures 128 of the base plate 124 to temporarily hold and retain the film 126 on the base plate 124.

In one or more examples, the carrier transfer device 110 includes parts and components (e.g., vacuum source, vacuum ports, plumbing, actuators, valves and the like) that enable production, application and selective control of the retention vacuum. The vacuum source (e.g., a vacuum pump) may be component of the system 100 or a part of a sub-system (e.g., the positioning system 144) of the system 100. Alternatively, the vacuum source may be an integral component of the carrier transfer device 110. In production, the retention vacuum is provided by the vacuum table 130, which is then applied to the film 126 through the plurality of vacuum apertures 128 formed in the base plate 124.

Figure 39:
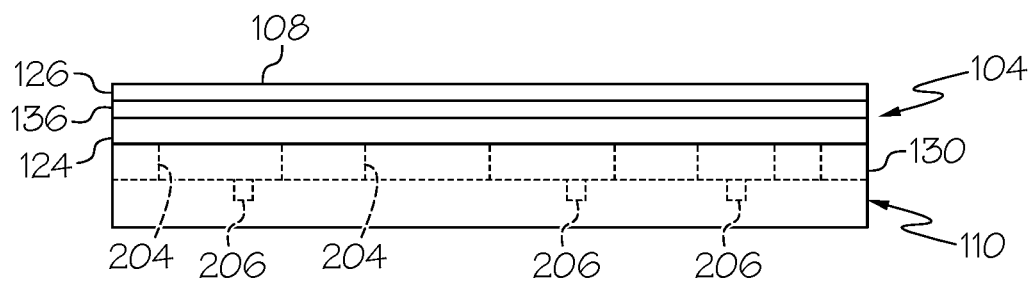
FIG. 39 is a schematic, elevational view of an example of the ply carrier and the carrier transfer device.
Figure 40:
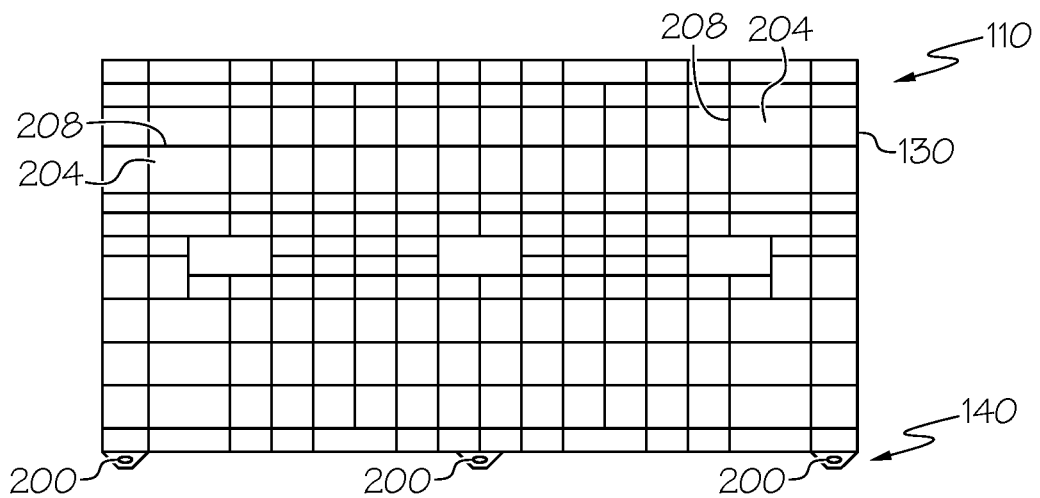
FIG. 40 is a schematic, plan view of an example of a vacuum table of the carrier transfer device.

Referring to FIGS. 39 and 40, in one or more examples, the vacuum table 130 includes a plurality of vacuum zones 204. Each one of the plurality of vacuum zones 204 is controllable to selectively apply and remove vacuum to a corresponding set of vacuum apertures 128 (FIG. 41) positioned over the respective vacuum zone 204. For example, each one of the plurality of vacuum zones 204 includes a valve 206 that is selectively open or closed to control application of vacuum to the respective vacuum zone 204. The vacuum zones 204 enable the vacuum table 130 to apply vacuum where needed to retain the film 126 on the base plate 124. The vacuum zones 204 also enable the vacuum table 130 to cease application of vacuum to select areas of the base plate 124, such as during removal of scrap remnants of the composite ply 106 after a trimming operation. The vacuum table 130 and the plurality of vacuum apertures 128 formed in the base plate 124 are arranged to adequately distribute a sufficient retention vacuum to retain the film 126 on the surface of the base plate 124 during movement of the ply carrier 104 through the system 100.

In one or more examples, the vacuum table 130 includes a plurality of lip seals 208. Each lip seal 208 is located between adjacent ones of the plurality of vacuum zones 204. For example, the lip seals 208 form the peripheral boundaries of the vacuum zones 204 and isolate each one of the vacuum zones 204 from an adjacent one of the vacuum zones 204. The plurality of lip seals 208 provide a sealing interface with the base plate 124 without affecting the surface flatness of the vacuum table 130.

Referring to FIGS. 38, 40 and 41, in one or more examples, the system 100 includes an indexing structure 140. The indexing structure 140 is configured to operatively locate the ply carrier 104 at a specified location on the carrier transfer device 110. In one or more examples, the indexing structure 140 includes mating components located on the carrier transfer device 110 and the base plate 124 of the ply carrier 104. For example, as illustrated in FIGS. 40 and 41, the carrier transfer device 110 includes at least one indexing pin 200 (e.g., at least two indexing pins 200) and the base plate 124 includes at least one indexing aperture 202 (e.g., at least two indexing apertures 202) that corresponds to the indexing pin 200. The indexing pin 200 and the indexing aperture 202 cooperate to position the ply carrier 104 on the carrier transfer device 110.

Referring again to FIG. 37, the sub-systems of the system 100 are generally arranged in operational sequence with each other within a manufacturing environment. In one or more examples, the lamination system 112 is in sequential relation to the carrier preparation system 162. In one or more examples, the trim system 114 is in sequential relation to the lamination system 112. In one or more examples, the scrap removal system 142 is in sequential relation to the trim system 114. In one or more examples, the transfer and placement system 300 is in sequential relation to the scrap removal system 142. In one or more examples, the forming system 122 is in sequential relation to the transfer and placement system 300. In one or more examples, the film removal system 160 is in sequential relation to the forming system 122.

It should be recognized that not every sub-system is required, or certain sub-systems may not be utilized in every implementation of the disclosed system 100. For example, in certain implementations, the carrier preparation system 162, the trim system 114 and/or the scrap removal system 142 may not be utilized in fabrication of the composite structure 102 and, thus, may not be included as a sub-system within the system 100. As such, in one or more examples, the transfer and placement system 300 is in sequential relation to the lamination system 112.

In one or more examples, the carrier transfer device 110 conveys the ply carrier 104 to the carrier preparation system 162 for preparation of the ply carrier 104. In one or more examples, the carrier transfer device 110 coveys the ply carrier 104 from the carrier preparation system 162 to the lamination system 112 for application of the composite ply 106 to the ply carrier 104. In one or more examples, the carrier transfer device 110 conveys the ply carrier 104, and the composite ply 106 supported on the ply carrier 104, from the lamination system 112 to the trim system 114 for cutting the composite ply 106. In one or more examples, the carrier transfer device 110 conveys the ply carrier 104, and the composite ply 106 supported on the ply carrier 104, from the trim system 114 to the scrap removal system 142 for removal of remnants (e.g., scrap composite material) from the ply carrier 104 after cutting. In one or more examples, the carrier transfer device 110 conveys the ply carrier 104, and the composite ply 106 supported on the ply carrier 104, from the trim system 114 to the transfer and placement system 300 for application of the composite ply 106 to the forming tool 120.

In one or more examples, the tool transfer device 146 conveys the forming tool 120 to the transfer and placement system 300 for application of the composite ply 106 to the forming tool 120. In one or more examples, the tool transfer device 146 conveys the forming tool 120, and the composite ply 106 applied to the forming tool 120, from the transfer and placement system 300 to the forming system 122 for formation and compaction of the composite ply 106 over the forming tool 120. In one or more examples, the tool transfer device 146 conveys the forming tool 120, and the composite ply 106 formed over the forming tool 120, from the forming system 122 to the film removal system 160 for removal of the film 126 from the composite ply 106.

The positioning system 144 may be any suitable system that guides the carrier transfer device 110 and the tool transfer device 146 along a predetermined workflow or path. In one or more examples, the positioning system 144 is configured to selectively position the carrier transfer device 110 relative to individual sub-systems or workstations of the system 100 (e.g., the carrier preparation system 162, the lamination system 112, the trim system 114, the scrap removal system 142 and the transfer and placement system 300). In one or more examples, the positioning system 144 is configured to selectively position the tool transfer device 146 relative to individual sub-systems or workstations of the system 100 (e.g., the transfer and placement system 300, the forming system 122 and the film removal system 160).

In one or more examples, as illustrated in FIG. 38, the positioning system 144 includes a rail assembly 168 or similar conveyor assembly that physically guides the carrier transfer device 110 and the tool transfer device 146 through the system 100. In these examples, the carrier transfer device 110 and the tool transfer device 146 may include a cart, a pallet, a carriage, or similar platform that is configured to travel along the rail assembly 168. As such, in these examples, the positioning system 144, the carrier transfer device 110 and the tool transfer device 146 include cooperating parts and components (e.g., drive motors, tracks, actuators, gears, wheels, sensors and the like) that enable selectively controlled transportation of the carrier transfer device 110 and the tool transfer device 146 along the positioning system 144.

In one or more examples, the positioning system 144 includes a linear carrier guide. The linear carrier guide is configured to operatively translate the carrier transfer device 110 through the sub-systems or workstations of the system 100, for example, along a linear workflow path. For example, a portion of rail assembly 168 dedicated to conveying the carrier transfer device 110 is a linear segment with discrete terminal ends.

In one or more examples, the positioning system 144 includes a linear tool guide. The linear tool guide is configured to operatively translate the tool transfer device 146 through the sub-systems or workstations of the system 100, for example, along a linear workflow path. For example, a portion of rail assembly 168 dedicated to conveying the tool transfer device 146 is a linear segment with discrete terminal ends.

In one or more examples, the positioning system 144 includes a closed-loop carrier guide. The closed-loop carrier guide is configured to operatively circulate the carrier transfer device 110 through the sub-systems or workstations of the system 100, for example, along a continuous workflow path. For example, a portion of rail assembly 168 dedicated to conveying the carrier transfer device 110 is a continuous loop.

In one or more examples, the positioning system 144 includes a closed-loop tool guide. The closed-loop tool guide is configured to operatively circulate the tool transfer device 146 through the sub-systems or workstations of the system 100, for example, along a continuous workflow path. For example, a portion of rail assembly 168 dedicated to conveying the tool transfer device 146 is a continuous loop.

In either of the example configurations of the positioning system 144 described above (e.g., utilizing a translating workflow or a continuous workflow), the positioning system 144 includes access areas that enable on-loading and off-loading of the carrier transfer device 110 and the tool transfer device 146.

In one or more examples, the system 100 utilizes a plurality of carrier transfer devices 110. Each one of the plurality of carrier transfer devices 110 conveys a respective one of a plurality of ply carriers 104 through the system 100. Thus, in production, multiple operations can be performed simultaneously on different ones of the plurality of ply carriers 104, thereby reducing cycle time. Similarly, in one or more examples, the system 100 utilizes a plurality of tool transfer devices 146. Each one of the plurality of tool transfer devices 146 conveys a respective one of a plurality of forming tool 120 through the system 100. Thus, in production, multiple operations can be performed simultaneously on different ones of the plurality of forming tools 120, thereby reducing cycle time.

Referring now to FIG. 41, which illustrates an example of the method 1000 that utilizes the system 100 (e.g., shown in FIGS. 36 and 37) to fabricate the composite structure 102.

In one or more examples, the method 1000 includes a step of (block 1002) preparing the ply carrier 104 using the carrier preparation system 162. The method 1000 includes a step of (block 1004) selectively applying the retention vacuum to retain the film 126 on the base plate 124 using the carrier transfer device 110. The method 1000 includes a step of (block 1006) conveying the ply carrier 104 to the lamination system 112 using the carrier transfer device 110. The method 1000 includes a step of (block 1008) selectively applying the composite ply 106 to the ply support surface 108 of the ply carrier 104 using the lamination system 112. The method 1000 includes a step of (block 1010) conveying the ply carrier 104 from the lamination system 112 to the trim system 114 using the carrier transfer device 110. The method 1000 includes a step of (block 1012) selectively cutting the composite ply 106 into the predetermined shape using the trim system 114. The method 1000 includes a step of (block 1014) removing a remnant of the at least one composite ply 106 from the ply support surface 108 using the scrap removal system 142, after the step of (block 1012) selectively cutting the at least one composite ply 106. The method 1000 includes a step of (block 1016) conveying the ply carrier 104 from the trim system 114 to the transfer and placing system 300 using the carrier transfer device 110. The method 1000 includes a step of (block 1018) removing the ply carrier 104 from the carrier transfer device 110 and a step of (block 1022) reorienting (e.g., rotating) the ply carrier 104 using the transfer apparatus 400 of the transfer and placement system 300. The method 1000 includes a step of (block 1020) maintaining the retention vacuum to retain the film 126 on the base plate 124 using the placement apparatus 402 of the transfer and placement system 300.

In one or more examples, the method 1000 includes a step of (block 1024) conveying the forming tool 120 to the transfer and placement system 300 using the tool transfer device 146. The method 1000 includes a step of (block 1026) applying the composite ply 106 to at least a portion of the forming surface 118 of the forming tool 120 using the placement apparatus 402 of the transfer and placement system 300. For example, the ply carrier 104 is positioned at a predefined location along the forming tool 120 according to the predetermined ply laydown sequence. The ply carrier 104 is oriented such that the composite ply 106 is parallel to at least a portion of the forming surface 118 of the forming tool 120. The ply carrier 104 is pressed on the forming tool 120 to compress the composite ply 106 against a portion of the forming surface 118 of the forming tool 120. In one or more examples, the ply carrier 104 may deform when pressed against the forming tool 120, thereby enabling the composite ply 106 to be applied to a greater portion of the contoured forming surface 118.

In one or more examples, the method 1000 includes a step of releasing the film 126 from the base plate 124 and a step of removing the ply carrier 104 (e.g., the base plate 124) from the forming tool 120 using the placement apparatus 402 of the transfer and placement system 300, after the step of (block 1026) applying the composite ply 106 to at least a portion of the forming surface 118 of the forming tool 120. For example, the method 1000 includes a step of (block 1028) selectively removing the retention vacuum to release the film 126 from the base plate 124 while retaining the base plate 124 using the placement apparatus 402 of the transfer and placement system 300. Following application of the composite ply 106 to the forming tool 120, the composite ply 106 is coupled (e.g., adhered or tacked) to the forming surface 118 and the film 126 remains coupled (e.g., adhered or tacked) to the composite ply 106 by the resin matrix of the composite ply 106.

In one or more examples, the method 1000 includes a step of (block 1030) conveying the forming tool 120 from the transfer and placement system 300 to the forming system 122 using the tool transfer device 146. The method 1000 includes a step of (block 1032) forming the composite ply 106 over the at least a portion of the forming surface 118 of the forming tool 120 using the forming system 122. The method 1000 includes a step of (block 1034) removing the film 126 from the composite ply 106 using the film removal system 160. The step of (block 1034) removing the film 126 is preformed after the step of (block 1032) forming the composite ply 106.

In one or more examples, the method 1000 includes a step of (block 1036) returning the ply carrier 104 (e.g., the base plate 124) to the carrier transfer device 110 using the transfer and placement system 300. The step of (block 1036) returning the ply carrier 104 is performed after the step of (block 1026) applying the composite ply 106 to the forming tool 120.

In one or more examples, the above operations are repeated a number of times to fully form the composite structure 102 (block 1038), at which point the process terminates. In one or more examples, a plurality of composite plies 106 are sequentially fabricated and applied to and formed over the forming tool 120 according the ply-by-ply laydown sequence. For example, a first one of the plurality of composite plies 106 is applied to and is formed over a first portion of the forming tool 120. During a second iteration of the above process, a second one of the plurality of composite plies 106 is applied to and is formed over a second portion of the forming tool 120. This iterative process is repeated until the composite structure 102 is formed.

In one or more examples, the forming tool 120 may be simultaneously located at the transfer and placement system 300 and the forming system 122. For example, the first portion of the forming tool 120 may be conveyed to the transfer and placement system 300 for application of the first one of the plurality of composite plies 106. The first portion of the forming tool 120 may then be conveyed to forming system 122 while a second portion of the forming tool 120 is conveyed to the transfer and placement system 300. The second one of the composite plies 106 may be applied to the second portion of the forming tool 120 while the first one of the composite plies 106 is being formed over the forming tool 120. As such, the step of (block 1026) applying the second one of the composite plies 106 and the step of (block 1032) forming the first one of the composite plies 106 are performed simultaneously, thereby reducing cycle time.

In one or more examples, the steps of conveying the ply carrier (e.g., blocks 1006, 1010 and 1016) include a step of operatively translating the carrier transfer device 110 between the carrier preparation system 162, the lamination system 112, the trim system 114 (when applicable), the scrap removal system 142 (when applicable) and the transfer and placement system 300. In one or more examples, the steps of conveying the ply carrier (e.g., blocks 1006, 1010 and 1016) include a step of operatively circulating the carrier transfer device 110 through the carrier preparation system 162, the lamination system 112, the trim system 114 (when applicable), the scrap removal system 142 (when applicable) and the transfer and placement system 300.

In one or more examples, the steps of conveying the forming tool 120 (e.g., blocks 1024 and 1030) include a step of operatively translating the tool transfer device 146 between the transfer and placement system 300, the forming system 122 and the film removal system 160. In one or more examples, the steps of conveying the forming tool 120 (e.g., blocks 1024 and 1030) include a step of operatively circulating the tool transfer device 146 through the transfer and placement system 300, the forming system 122 and the film removal system 160.

Referring to FIG. 36, in one or more examples, the system 100 includes a controller 158. In one or more examples, the controller 158 is configured to control operation of the system 100 and/or implement the operational steps of the method 1000. In one or more examples, the controller 158 is configured to control operation of the system 300 and/or implement the operational steps of the method 1200.

The controller 158 is in communication with and is programmed to control operation of at least one of the carrier transfer device 110, the tool transfer device 146, the positioning system 144, the carrier preparation system 162, the lamination system 112, the trim system 114, the scrap removal system 142, the transfer and placement system 300, the forming system 122 and the film removal system 160. In one or more examples, the on-demand fabrication, transfer, application and formation of the composite ply 106 is facilitated by the controller 158. The controller 158 may be any device capable of facilitating communication between itself and the various sub-systems of the system 100. For example, the controller 158 may be a computer workstation, a programmable logic controller (PLC), a mobile device or other electronic controller.

In one or more examples, one or more of the components, devices or sub-systems of the system 100 and/or the system 300 may include a dedicated controller that is in communication with and receives instructions from the controller 158.

In one or more examples, the controller 158 is programmed to track a plurality of composite plies 106 fabricated during manufacture of the composite structure 102. For example, the controller 158 tracks which one of the plurality of composite plies 106 is fabricated, applied and formed during the composite structure fabrication process according to the ply laydown sequence. In one or more examples, the controller 158 is programmed to track a plurality of ply carriers 104 and/or carrier transfer devices 110 flowing through the system 100. In one or more examples, the controller 158 is programmed to track a plurality of forming tools 120 and/or tool transfer devices 146 flowing through the system 100.

In one or more examples, the system 100 is configured to perform multiple operations substantially simultaneously or concurrently. For example, a first composite ply 106 may be formed over the forming tool 120, while a second composite ply 106 is being transferred and applied to the forming tool 120 (e.g., the same forming tool in the translating workflow or a different forming tool in the continuous workflow), while a third composite ply 106 is being cut, and while a fourth composite ply 106 is being laid down. As such, more than one carrier transfer device 110 and, thus, more than one composite ply 106 may be moved through the system 100 at the same time and more than one forming tool 120 and, thus, more than one composite structure 102 may be moved through the system 100 at the same time.

In one or more examples, the controller 158 is programmed to control more than one of the sub-systems and, thus, perform more than one operation simultaneously or in parallel. In one or more examples, the controller 158 is programmed to control all the sub-systems and, thus, perform all the operations simultaneously or in parallel.

Figure 43:
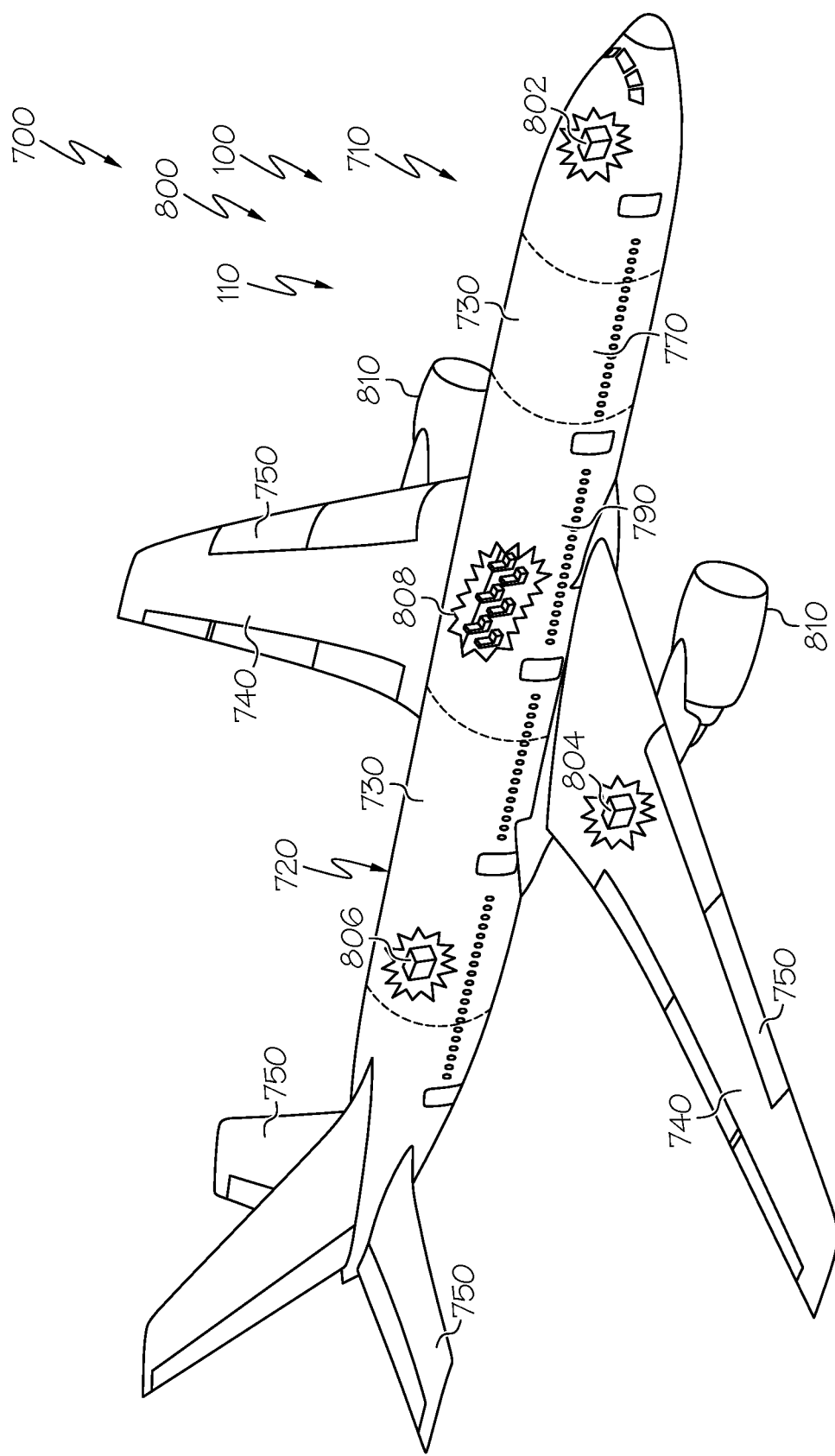
FIG. 43 is a schematic illustration of an aircraft that includes at least one composite structure.
Figure 44:
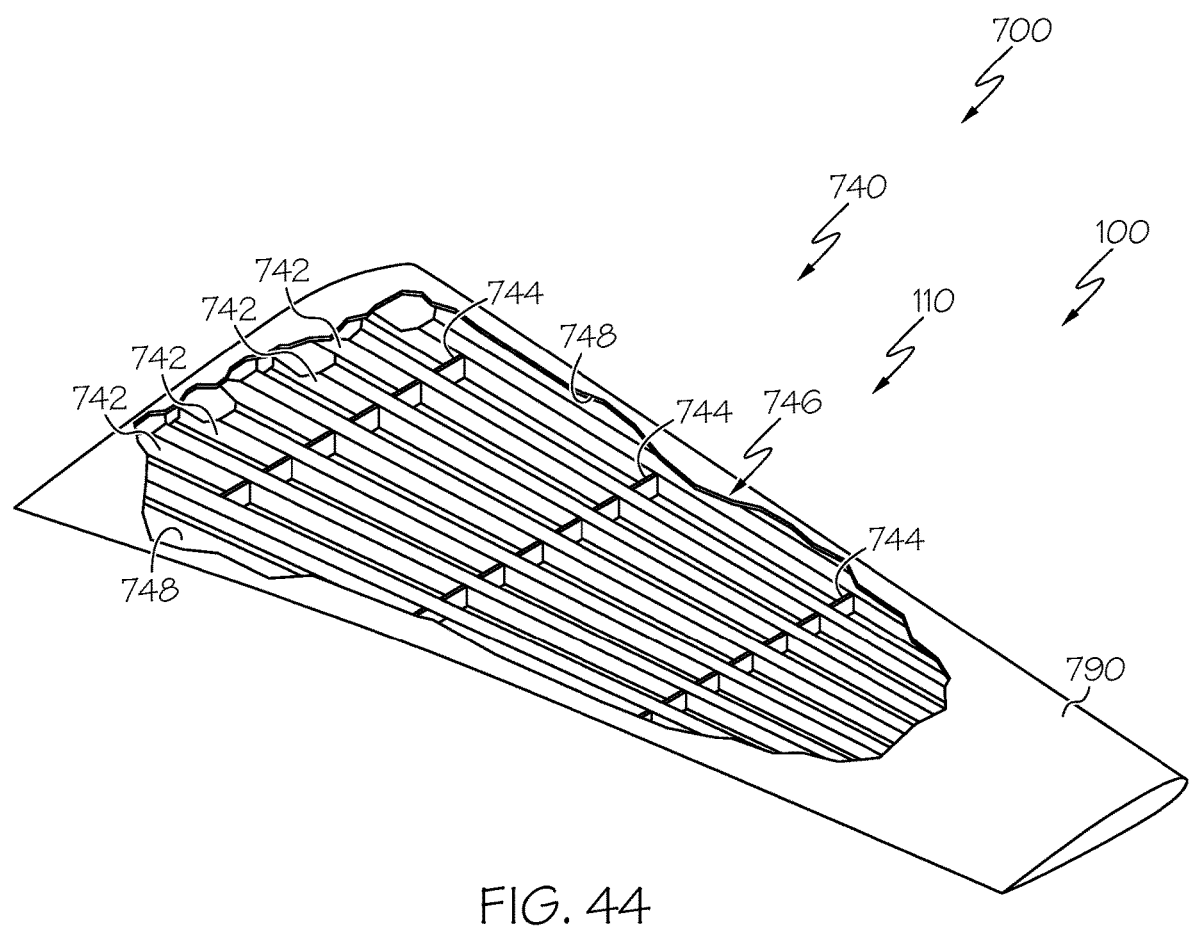
FIG. 44 is a schematic illustration of an example of a wing of the aircraft shown in FIG. 43.
Figure 45:
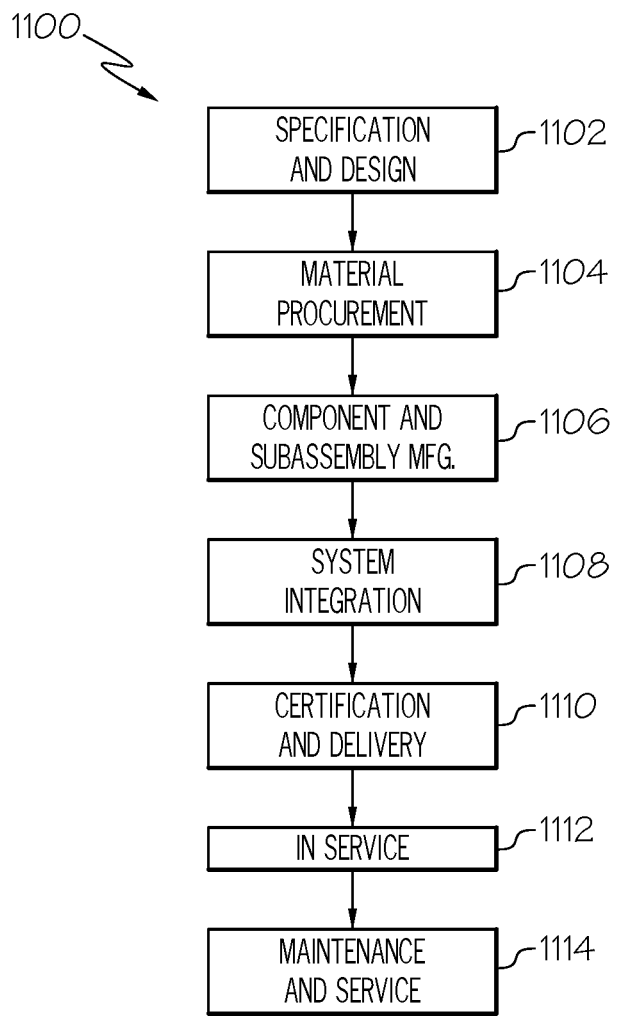
FIG. 45 is a flow diagram of an aircraft manufacturing and service methodology.

Referring now to FIGS. 43-45, examples of the system 100, the system 300, the method 1000 and the method 1200 may be related to, or used in the context of, an aircraft manufacturing and service method 1100, as shown in the flow diagram of FIG. 45 and an aircraft 700, as schematically illustrated in FIG. 43. The composite structure 102 manufactured using the system 100 or in accordance with the method 1000 may be any one of a structure, an assembly, a sub-assembly, a component, a part, or any other portion of the aircraft 700, such as a portion of an airframe, interior, and one or more of the high-level systems. For example, the composite structure 102 may be any one of an aircraft spar, a wing section, a fuselage barrel section, an interior panel, an exterior skin panel, and the like.

FIG. 43 schematically illustrates an example of the aircraft 700. The aircraft 700 includes a plurality of high-level systems 800. Examples of the high-level systems 800 include one or more of a propulsion system 810, an electrical system 802, a hydraulic system 804, and an environmental control ("environmental") system 806. In other examples, the aircraft 700 may include any number of other types of systems, such as a communications system, a flight control system, a guidance system, a weapons system, and the like.

The aircraft 700 includes at least one composite structure 102. The composite structure 102 is at least partially fabricated utilizing the system 100 and/or the method 1000. The aircraft 700 may include a plurality of components, including an airframe 710, a fuselage 720, a fuselage barrel 730, an interior 808, a wing 740, and/or a stabilizer 750.

In one or more examples, the composite structure 102 includes at least one composite ply 106, such as a plurality of composite plies 106. The composite structure 102 may form a composite part or a portion of any suitable component of the aircraft 700. As an example, and as illustrated in FIG. 43, the aircraft 700 includes skin segments 790 that cover and/or form an outer surface of any suitable portion of the aircraft 700 and/or a plurality of stringers 770 that, together with a plurality of frames, may support an inner surface of the skin segments 790.

FIG. 44 schematically illustrates an example of the wing 740. In one or more examples, the wing 740 includes a plurality of wing stringers 742, which may extend along a length of the wing 740. The wing 740 may also include a plurality of spars 744, which also may be referred to herein as ribs. The wing stringers 742 and spars 744 together may form and/or define at least a portion of an inner support structure 746 for the wing 740, which may support an inner surface 748 of the skin segments 790 that cover the wing 740. The skin segments 790 may also be referred to herein as wing skin segments.

It is within the scope of the present disclosure that the skin segments 790 (e.g., wing skin or fuselage skin), stringers 770 (e.g., fuselage stringers), frames (e.g., multiple piece frames or one piece frames), wing stringers 742, spars 744, the inner support structure 746, floor beams, interior panels or various other components may be at least partially, or even completely, formed from the plies of composite material and/or may be a composite part that may be formed utilizing the system 100, the system 300, the method 1000 and/or the method 1200 disclosed herein.

Referring to FIG. 45, during pre-production, the method 1100 includes specification and design of the aircraft 700 (block 1102) and material procurement (block 1104). During production of the aircraft 700, component and subassembly manufacturing (block 1106) and system integration (block 1108) of the aircraft 700 take place. Thereafter, the aircraft 700 goes through certification and delivery (block 1110) to be placed in service (block 1112). Routine maintenance and service (block 1114) includes modification, reconfiguration, refurbishment, etc. of one or more systems of the aircraft 700. For example, the composite structure 102 manufactured in accordance with the method 1000 may be produced during material procurement (block 1104), component and subassembly manufacturing (block 1106), and/or maintenance and service (block 1114).

Each of the processes of the method 1100 illustrated in FIG. 45 may be performed or carried out by a system integrator, a third party, and/or an operator (e.g., a customer). For the purposes of this description, a system integrator may include, without limitation, any number of spacecraft manufacturers and major-system subcontractors;

a third party may include, without limitation, any number of vendors, subcontractors, and suppliers; and an operator may be an airline, leasing company, military entity, service organization, and so on.

Examples of the aircraft 700, the composite structure 102, the system 100, the system 300, the method 1000 and the method 1200 shown and described herein may be employed during any one or more of the stages of the manufacturing and service method 1100 shown in the flow diagram illustrated by FIG. 45. In an example, implementations of the system 100, the system 300, the method 1000 and the method 1200 may form a portion of component and subassembly manufacturing (block 1106) and/or system integration (block 1108). For example, composite structures 102 made using implementations of the disclosed system 100, system 300, method 1000 and method 1200 may correspond to component and subassembly manufacturing (block 1106) and may be utilized in a manner similar to components or subassemblies prepared while the aircraft 700 is in service (block 1112). Also, implementations of the disclosed system 100, system 300, method 1000 and method 1200 may be utilized during system integration (block 1108) and certification and delivery (block 1110). Similarly, implementations of the disclosed system 100, system 300, method 1000 and method 1200 may be utilized, for example and without limitation, while the aircraft 700 is in service (block 1112) and during maintenance and service (block 1114).

Accordingly, referring to FIGS. 1-44, also disclosed is a method of fabricating a portion of the aircraft 700 (FIG. 43) using the system 100 and/or the system 300. Also disclosed is a portion of the aircraft 700 manufactured in accordance with the method 1000 or the method 1200.

Although an aerospace example is shown, the examples and principles disclosed herein may be applied to other industries, such as the automotive industry, the space industry, the construction industry, and other design and manufacturing industries. Accordingly, in addition to aircraft, the examples and principles disclosed herein may apply to systems for disinfecting an interior of other types of vehicles (e.g., land vehicles, marine vehicles, space vehicles, etc.) and stand-alone structures.

As used herein, a system, apparatus, device, structure, article, element, component, or hardware "configured to" perform a specified function is indeed capable of performing the specified function without any alteration, rather than merely having potential to perform the specified function after further modification. In other words, the system, apparatus, device, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware that enable the system, apparatus, structure, article, element, component, or hardware to perform the specified function without further modification. For purposes of this disclosure, a system, apparatus, device, structure, article, element, component, or hardware described as being "configured to" perform a particular function may additionally or alternatively be described as being "adapted to" and/or as being "operative to" perform that function.

Unless otherwise indicated, the terms "first," "second," "third," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, the phrase "at least one of", when used with a list of items, means different combinations of one or more of the listed items may be used and only one of each item in the list may be needed. For example, "at least one of item A, item B, and item C" may include, without limitation, item A or item A and item B. This example also may include item A, item B, and item C, or item B and item C. In other examples, "at least one of" may be, for example, without limitation, two of item A, one of item B, and ten of item C; four of item B and seven of item C; and other suitable combinations.

For the purpose of this disclosure, the terms "coupled," "coupling," and similar terms refer to two or more elements that are joined, linked, fastened, attached, connected, put in communication, or otherwise associated (e.g., mechanically, electrically, fluidly, optically, electromagnetically) with one another. In various examples, the elements may be associated directly or indirectly. As an example, element A may be directly associated with element B. As another example, element A may be indirectly associated with element B, for example, via another element C. It will be understood that not all associations among the various disclosed elements are necessarily represented. Accordingly, couplings other than those depicted in the figures may also exist.

As used herein, the term "approximately" refers to or represent a condition that is close to, but not exactly, the stated condition that still performs the desired function or achieves the desired result. As an example, the term "approximately" refers to a condition that is within an acceptable predetermined tolerance or accuracy, such as to a condition that is within 10% of the stated condition. However, the term "approximately" does not exclude a condition that is exactly the stated condition. As used herein, the term "substantially" refers to a condition that is essentially the stated condition that performs the desired function or achieves the desired result.

In FIG. 36, referred to above, the blocks may represent functional elements, features, or components thereof and lines connecting the various blocks do not necessarily imply any particular structure. Accordingly, modifications, additions and/or omissions may be made to the illustrated structure. Additionally, those skilled in the art will appreciate that not all elements, features, and/or components described and illustrated in FIGS. 1-34, 36-41, 43 and 44, referred to above, need be included in every example and not all elements, features, and/or components described herein are necessarily depicted in each illustrative example. Accordingly, some of the elements, features, and/or components described and illustrated in FIGS. 1-34, 36-41, 43 and 44 may be combined in various ways without the need to include other features described and illustrated in FIGS. 1-34, 36-41, 43 and 44, other drawing figures, and/or the accompanying disclosure, even though such combination or combinations are not explicitly illustrated herein. Similarly, additional features not limited to the examples presented, may be combined with some or all of the features shown and described herein. Unless otherwise explicitly stated, the schematic illustrations of the examples depicted in FIGS. 1-34, 36-41, 43 and 44, referred to above, are not meant to imply structural limitations with respect to the illustrative example. Rather, although one illustrative structure is indicated, it is to be understood that the structure may be modified when appropriate. Accordingly, modifications, additions and/or omissions may be made to the illustrated structure. Furthermore, elements, features, and/or components that serve a similar, or at least substantially similar, purpose are labeled with like numbers in each of FIGS. 1-34, 36-41, 43 and 44, and such elements, features, and/or components may not be discussed in detail herein with reference to each of FIGS. 1-34, 36-41, 43 and 44. Similarly, all elements, features, and/or components may not be labeled in each of FIGS. 1-34, 36-41, 43 and 44, but reference numerals associated therewith may be utilized herein for consistency.

In FIGS. 35, 42 and 45, referred to above, the blocks may represent operations, steps, and/or portions thereof and lines connecting the various blocks do not imply any particular order or dependency of the operations or portions thereof. It will be understood that not all dependencies among the various disclosed operations are necessarily represented. FIGS. 35, 42 and 45 and the accompanying disclosure describing the operations of the disclosed methods set forth herein should not be interpreted as necessarily determining a sequence in which the operations are to be performed. Rather, although one illustrative order is indicated, it is to be understood that the sequence of the operations may be modified when appropriate. Accordingly, modifications, additions and/or omissions may be made to the operations illustrated and certain operations may be performed in a different order or simultaneously. Additionally, those skilled in the art will appreciate that not all operations described need be performed.

Further, references throughout the present specification to features, advantages, or similar language used herein do not imply that all of the features and advantages that may be realized with the examples disclosed herein should be, or are in, any single example. Rather, language referring to the features and advantages is understood to mean that a specific feature, advantage, or characteristic described in connection with an example is included in at least one example. Thus, discussion of features, advantages, and similar language used throughout the present disclosure may, but do not necessarily, refer to the same example.

Further, the disclosure comprises embodiments according to the following clauses:

Clause 1. A system (300) for placing a composite ply (106), the system (300) comprising:
a transfer end effector (302) that is movable relative to a carrier transfer device (110), configured to convey a ply carrier (104) that supports the composite ply (106); and
a placement end effector (304) that is movable relative to the transfer end effector (302) and to a forming tool (120), wherein:
the transfer end effector (302) is configured to remove the ply carrier (104), supporting the composite ply (106), from the carrier transfer device (110) and to position the ply carrier (104) for removal by the placement end effector (304); and
the placement end effector (304) is configured to remove the ply carrier (104) from the transfer end effector (302) and to apply the composite ply (106) to the forming tool (120).

Clause 2. The system (300) of Clause 1, further comprising the ply carrier (104), wherein the ply carrier (104) comprises:
a base plate (124); and
a film (126) positioned on the base plate (124) and forming a ply support surface (108) for the composite ply (106).

Clause 3. The system (300) of Clause 2, wherein:
the base plate (124) is magnetic;
the transfer end effector (302) comprises a magnetic chuck (310);
the magnetic chuck (310) is configured to magnetically engage the base plate (124) for removal of the ply carrier (104) from the carrier transfer device (110) by the transfer end effector (302); and
the magnetic chuck (310) is further configured to magnetically disengage the base plate (124) for removal of the ply carrier (104) from the transfer end effector (302) by the placement end effector (304).

Clause 4. The system (300) of Clause 2, wherein:
the placement end effector (304) comprises a vacuum chuck (312); and
the vacuum chuck (312) is configured to selectively apply a retention vacuum to the base plate (124) for removal of the ply carrier (104) from the transfer end effector (302) by the placement end effector (304).

Clause 5. The system (300) of Clause 4, wherein:
the base plate (124) comprises a plurality of vacuum apertures (128); and
the vacuum chuck (312) is further configured to apply the retention vacuum through the plurality of vacuum apertures (128) to retain the film (126) on the base plate (124).

Clause 6. The system (300) of Clause 1, wherein:
the transfer end effector (302) comprises:
a transfer frame (314); and
a magnetic chuck (310) coupled to the transfer frame (314) and comprising a magnetic-chuck contact surface (318); and
the magnetic chuck (310) is movable relative to the transfer frame (314) to position the magnetic-chuck contact surface (318) in contact with the composite ply (106), supported by the ply carrier (104), for removal of the ply carrier (104) from the carrier transfer device (110) by the transfer end effector (302).

Clause 7. The system (300) of claim 6, wherein the magnetic chuck (310) further comprises:
a magnetic-chuck support member (328) coupled to and movable relative to the transfer frame (314); and
a plurality of magnets (320) coupled to the magnetic-chuck support member (328).

Clause 8. The system (300) of Clause 7, wherein the magnetic chuck (310) further comprises a magnetic-chuck pliable member (330) coupled to the magnetic-chuck support member (328), opposite the transfer frame (314).

Clause 9. The system (300) of Clause 8, wherein the magnetic chuck (310) further comprises a magnetic-chuck liner (336) coupled to the magnetic-chuck pliable member (330).

Clause 10. The system (300) of Clause 8, wherein the plurality of magnets (320) is movable relative to the magnetic-chuck support member (328).

Clause 11. The system (300) of Clause 10, wherein:
the magnetic-chuck pliable member (330) comprises a plurality of magnet openings (332); and
each one of the plurality of magnets (320) is located within a corresponding one of the plurality of magnet openings (332) of the magnetic-chuck pliable member (330).

Clause 12. The system (300) of Clause 10, wherein the magnetic chuck (310) further comprises:
a plurality of magnetic-chuck actuator rods (334) extending through the magnetic-chuck support member (328) and coupled to the plurality of magnets (320); and a magnetic-chuck actuator (324) configured to selectively extend or retract the plurality of magnetic-chuck actuator rods (334) relative to the magnetic-chuck support member (328) to move the plurality of magnets (320).

Clause 13. The system (300) of Clause 6, wherein the transfer end effector (302) further comprises a plurality of clamps (326) configured to fix the ply carrier (104) against the magnetic-chuck contact surface (318) of the magnetic chuck (310).

Clause 14. The system (300) of Clause 6, further comprising a transfer support platform (306) coupled to the transfer frame (314) of the transfer end effector (302), wherein the transfer end effector (302) is rotatable about a rotation axis (322) relative to the transfer support platform (306) to position the ply carrier (104) for removal from the transfer end effector (302) by the placement end effector (304).

Clause 15. The system (300) of Clause 6, wherein:
the transfer end effector (302) further comprises:
a transfer actuator (348) coupled to the transfer frame (314) and to the magnetic chuck (310); and
a transfer guide (350) coupled to the transfer frame (314) and to the magnetic chuck (310);
the transfer actuator (348) is configured to control movement of the magnetic chuck (310) relative to the transfer frame (314) along a first movement axis (352);
the transfer guide (350) is configured to direct movement of the magnetic chuck (310) along the first movement axis (352); and
the transfer guide (350) is further configured to enable movement of the magnetic chuck (310) relative to the transfer frame (314) along a float axis (354) that is perpendicular to the first movement axis (352).

Clause 16. The system (300) of Clause 15, wherein the transfer end effector (302) comprises a first portion of a first indexing device (316) that is configured to cooperate with a second portion of the first indexing device (316) located on the carrier transfer device (110) to index the magnetic chuck (310) relative to the carrier transfer device (110).

Clause 17. The system (300) of Clause 1, wherein:
the placement end effector (304) comprises:
a placement frame (342); and
a vacuum chuck (312) coupled to the placement frame (342) and comprising a vacuum-chuck contact surface (346); and
the vacuum chuck (312) is movable relative to the placement frame (342) to position the vacuum-chuck contact surface (346) in contact with the ply carrier (104), supporting the composite ply (106), for removal of the ply carrier (104) from the transfer end effector (302) by the placement end effector (304) and to position the ply carrier (104) for application of the composite ply (106) to the forming tool (120) by the placement end effector (304).

Clause 18. The system (300) of Clause 17, wherein the vacuum chuck (312) further comprises a vacuum table (344) configured to apply a retention vacuum to the ply carrier (104).

Clause 19. The system (300) of Clause 18, wherein the vacuum table (344) is configured to apply the retention vacuum to select portions of the ply carrier (104).

Clause 20. The system (300) of Clause 19, wherein:
the vacuum chuck (312) further comprises a vacuum-chuck support member (356) coupled to and movable relative to the placement frame (342); and
the vacuum table (344) is coupled to the vacuum-chuck support member (356).

Clause 21. The system (300) of Clause 20, wherein:
the vacuum chuck (312) further comprises a vacuum-chuck pliable member (358) coupled to the vacuum table (344), opposite the vacuum-chuck support member (356); and
the vacuum-chuck pliable member (358) is permeable by the retention vacuum.

Clause 22. The system (300) of Clause 19, wherein the vacuum chuck (344) further comprises a plurality of vacuum cups (360) coupled to and in fluid communication with the vacuum table (344).

Clause 23. The system (300) of Clause 22, wherein each one of the plurality of vacuum cups (360) is deformable.

Clause 24. The system (300) of Clause 22, wherein the vacuum chuck (344) further comprises a shaping member (362) coupled to the vacuum table (344) and movable relative to the vacuum table (344) and the plurality of vacuum cups (360).

Clause 25. The system (300) of Clause 24, wherein the vacuum chuck (344) further comprises a vacuum-chuck pliable member (358) coupled to the shaping member (362), opposite the vacuum table (344).

Clause 26. The system (300) of Clause 24, wherein:
the shaping member (362) comprises a plurality of vacuum-cup openings (364); and
each one of the plurality of vacuum cups (360) is located within a corresponding one of the plurality of vacuum-cup openings (364) of the shaping member (362).

Clause 27. The system (300) of Clause 24, wherein:
the shaping member (362) comprises a shaping surface (366); and
the shaping surface (366) is contoured.

Clause 28. The system (300) of Clause 24, wherein:
the vacuum chuck (312) further comprises a shaping actuator (368) coupled to the vacuum table (344) and to the shaping member (362); and
the shaping actuator (368) is configured to control movement of the shaping member (362) relative to the vacuum table (344).

Clause 29. The system (300) of Clause 17, wherein the vacuum chuck (312) is pivotable about a pivot axis (340) relative to the placement frame (342) to orient the ply carrier (104) for application of the composite ply (106) to the forming tool (120) by the placement end effector (302).

Clause 30. The system (300) of Clause 17, further comprising a placement support platform (308) coupled to the placement frame (342) of the placement end effector (304), wherein the placement end effector (304) is movable relative to the placement support platform (308) to position the ply carrier (104) for application of the composite ply (104) to the forming tool (120) by the placement end effector (304).

Clause 31. The system (300) of Clause 17, wherein:
the placement end effector (304) further comprises a placement actuator (370) coupled to the placement frame (342) and to the vacuum chuck (312); and
the placement actuator (370) is configured to control movement of the vacuum chuck (312) relative to the placement frame (342).

Clause 32. The system (300) of Clause 17, wherein:
the transfer end effector (302) comprises a first portion of a second indexing device (338);
the placement end effector (304) comprises a second portion of the second indexing device (338); and
the first portion and the second portion of the second indexing device (338) are configured to cooperate to index the placement end effector (304) relative to the transfer end effector (302).

Clause 33. A method (1000) of placing the composite ply (106) using the system (300) of Clause 1.

Clause 34. A transfer apparatus (400) comprising:
a magnetic chuck (310) comprising:
a magnetic-chuck support member (328);
a magnet (320) coupled to the magnetic-chuck support member (328);
a magnetic-chuck pliable member (330) coupled to the magnetic-chuck support member (328); and
a magnetic-chuck actuator (324) coupled to the magnetic-chuck support member (328) and the magnet (320),
wherein:
the magnetic-chuck pliable member (330) is configured to contact a ply carrier (104), supporting a composite ply (106); and
the magnetic-chuck actuator (324) is configured to selectively move the magnet (320) relative to the magnetic-chuck support member (328) and to the magnetic-chuck pliable member (330) to magnetically engage or magnetically disengage the ply carrier (104).

Clause 35. A method of transferring the composite ply (106) using the transfer apparatus (400) of Clause 34.

Clause 36. A placement apparatus (402) comprising:
a vacuum chuck (312) comprising:
a vacuum table (344); and
a vacuum-chuck pliable member (358) coupled to the vacuum table (344),
wherein:
the vacuum-chuck pliable member (358) is configured to contact a ply carrier (104), supporting a composite ply (106); and
the vacuum table (344) is configured to selectively apply a retention vacuum to the ply carrier (104) through the vacuum-chuck pliable member (358).

Clause 37. A method of placing the composite ply (106) using the placement apparatus (402) of Clause 36.

Clause 38. A method (1200) of placing a composite ply (106), the method (1200) comprising:
magnetically engaging a ply carrier (104), supporting the composite ply (106);
reorienting the ply carrier (104);
applying a retention vacuum to the ply carrier (104);
magnetically disengaging the ply carrier (104);
applying the composite ply (106) to a forming tool (120);
ceasing the retention vacuum to a select portion of the ply carrier (104); and
releasing the composite ply (106) from the ply carrier (104).

Clause 39. A system (300) for placing a composite ply (106), the system (300) comprising:
a transfer apparatus (400);
a placement apparatus (402); and
a controller (158) in communication with the transfer apparatus (400) and the placement apparatus (402) and programmed to:
magnetically engage a ply carrier (104), supporting the composite ply (106), using the transfer apparatus (400);
reorient the ply carrier (104) using the transfer apparatus (400);
apply a retention vacuum to the ply carrier (104) using the placement apparatus (402);
magnetically disengage the ply carrier (104) using the transfer apparatus (400);
apply the composite ply (106) to a forming tool (120) using the placement apparatus (402);
cease the retention vacuum to a select portion of the ply carrier (104) using the placement apparatus (402); and
release the composite ply (106) from the ply carrier (104) using the placement apparatus (402).

Clause 40. A manufacturing system (100) for fabricating a composite structure (102), the system (100) comprising:
a ply carrier (104) comprising a ply support surface (108) configured to support at least one composite ply (106);
a carrier transfer device (110) configured to convey the ply carrier (104);
a lamination system (112) configured to selectively apply the at least one composite ply (106) to the ply support surface (108) of the ply carrier (104);
a transfer system (300) configured to remove the ply carrier (104) from the carrier transfer device (110) and to apply the at least one composite ply (106) to at least a portion of a forming surface (118) of a forming tool (120), wherein the transfer system (300) comprises:
the transfer end effector (302) and the placement end effector (304) of claim 1; and
a forming system (122) configured to form the at least one composite ply (106) over the at least a portion of the forming surface (118) of the forming tool (120).

Clause 41. A method (1000) of fabricating a composite structure (102), the method (1000) comprising steps of:
conveying a ply carrier (104) to a lamination system (112) using a carrier transfer device (110);
selectively applying at least one composite ply (106) to a ply support surface (108) of the ply carrier (104) using the lamination system (112);
conveying the ply carrier (104) from the lamination system (112) to a transfer system (300) using the carrier transfer device (110);
removing the ply carrier (104) from the carrier transfer device (110) and applying the at least one composite ply (106) to at least a portion of a forming surface (118) of a forming tool (120) using the transfer system (300), the transfer system (300) comprising:
the transfer end effector (302) and the placement end effector (304) of claim 1; and
forming the at least one composite ply (106) over the at least a portion of the forming surface (118) of the forming tool (120) using a forming system (122).

The described features, advantages, and characteristics of one example may be combined in any suitable manner in one or more other examples. One skilled in the relevant art will recognize that the examples described herein may be practiced without one or more of the specific features or advantages of a particular example. In other instances, additional features and advantages may be recognized in certain examples that may not be present in all examples. Furthermore, although various examples of the system 100, the system 300, the method 1000 and the method 1200 have been shown and described, modifications may occur to those skilled in the art upon reading the specification. The present application includes such modifications and is limited only by the scope of the claims.

What is claimed is:

1. A system for placing a composite ply, the system comprising:
a transfer end effector that is movable relative to a carrier transfer device, configured to convey a ply carrier that supports the composite ply; and
a placement end effector that is movable relative to the transfer end effector and to a forming tool,
wherein:
the transfer end effector comprises a magnetic chuck that is configured to magnetically engage the ply carrier, supporting the composite ply, to remove the ply carrier from the carrier transfer device and to position the ply carrier for removal by the placement end effector; and the placement end effector is configured to remove the ply carrier from the transfer end effector and to apply the composite ply to the forming tool.

2. The system of claim 1, further comprising the ply carrier, wherein the ply carrier comprises:
a base plate, wherein the base plate is magnetic; and
a film positioned on the base plate and forming a ply support surface for the composite ply.

3. The system of claim 2, wherein:
the magnetic chuck is configured to magnetically engage the base plate for removal of the ply carrier from the carrier transfer device by the transfer end effector; and
the magnetic chuck is further configured to magnetically disengage the base plate for removal of the ply carrier from the transfer end effector by the placement end effector.

4. The system of claim 2, wherein:
the placement end effector comprises a vacuum chuck; and
the vacuum chuck is configured to selectively apply a retention vacuum to the base plate for removal of the ply carrier from the transfer end effector by the placement end effector.

5. The system of claim 1, wherein:
the transfer end effector comprises:
a transfer frame; and
the magnetic chuck is coupled to the transfer frame and comprises a magnetic-chuck contact surface; and
the magnetic chuck is movable relative to the transfer frame to position the magnetic-chuck contact surface in contact with the composite ply, supported by the ply carrier, for removal of the ply carrier from the carrier transfer device by the transfer end effector.

6. The system of claim 5, wherein the magnetic chuck further comprises:
a magnetic-chuck support member coupled to and movable relative to the transfer frame; and
a plurality of magnets coupled to the magnetic-chuck support member.

7. The system of claim 6, wherein the magnetic chuck further comprises a magnetic-chuck pliable member coupled to the magnetic-chuck support member, opposite the transfer frame.

8. The system of claim 7, wherein the plurality of magnets is movable relative to the magnetic-chuck support member.

9. The system of claim 8, wherein:
the magnetic-chuck pliable member comprises a plurality of magnet openings; and
each one of the plurality of magnets is located within a corresponding one of the plurality of magnet openings of the magnetic-chuck pliable member.

10. The system of claim 8, wherein the magnetic chuck further comprises:
a plurality of magnetic-chuck actuator rods extending through the magnetic-chuck support member and coupled to the plurality of magnets; and
a magnetic-chuck actuator configured to selectively extend or retract the plurality of magnetic-chuck actuator rods relative to the magnetic-chuck support member to move the plurality of magnets.

11. The system of claim 5, wherein the transfer end effector further comprises a plurality of clamps configured to fix the ply carrier against the magnetic-chuck contact surface of the magnetic chuck.

12. The system of claim 5, further comprising a transfer support platform coupled to the transfer frame of the transfer end effector,
wherein the transfer end effector is rotatable about a rotation axis relative to the transfer support platform to position the ply carrier for removal from the transfer end effector by the placement end effector.

13. The system of claim 5, wherein:
the transfer end effector further comprises:
a transfer actuator coupled to the transfer frame and to the magnetic chuck; and
a transfer guide coupled to the transfer frame and to the magnetic chuck;
the transfer actuator is configured to control movement of the magnetic chuck relative to the transfer frame along a first movement axis;
the transfer guide is configured to direct movement of the magnetic chuck along the first movement axis; and
the transfer guide is further configured to enable movement of the magnetic chuck relative to the transfer frame along a float axis that is perpendicular to the first movement axis.

14. The system of claim 13, wherein the transfer end effector comprises a first portion of a first indexing device that is configured to cooperate with a second portion of the first indexing device located on the carrier transfer device to index the magnetic chuck relative to the carrier transfer device.

15. The system of claim 1, wherein:
the placement end effector comprises:
a placement frame; and
a vacuum chuck coupled to the placement frame and comprising a vacuum-chuck contact surface; and
the vacuum chuck is movable relative to the placement frame to position the vacuum-chuck contact surface in contact with the ply carrier, supporting the composite ply, for removal of the ply carrier from the transfer end effector by the placement end effector and to position the ply carrier for application of the composite ply to the forming tool by the placement end effector.

16. The system of claim 15, wherein the vacuum chuck is pivotable about a pivot axis relative to the placement frame to orient the ply carrier for application of the composite ply to the forming tool by the placement end effector.

17. The system of claim 15, further comprising a placement support platform coupled to the placement frame of the placement end effector, wherein the placement end effector is movable relative to the placement support platform to position the ply carrier for application of the composite ply to the forming tool by the placement end effector.

18. The system of claim 15, wherein:
the placement end effector further comprises a placement actuator coupled to the placement frame and to the vacuum chuck; and
the placement actuator is configured to control movement of the vacuum chuck relative to the placement frame.

19. The system of claim 15, wherein:
the transfer end effector comprises a first portion of a second indexing device;
the placement end effector comprises a second portion of the second indexing device; and
the first portion and the second portion of the second indexing device are configured to cooperate to index the placement end effector relative to the transfer end effector.

20. A manufacturing system for fabricating a composite structure, the system comprising:

a ply carrier comprising a ply support surface configured to support at least one composite ply, wherein the ply carrier is magnetic;
a carrier transfer device configured to convey the ply carrier;
a lamination system configured to selectively apply the at least one composite ply to the ply support surface of the ply carrier;
a transfer system configured to remove the ply carrier from the carrier transfer device and to apply the at least one composite ply to at least a portion of a forming surface of a forming tool, wherein the transfer system comprises:
the transfer end effector and the placement end effector of claim 1; and
a forming system configured to form the at least one composite ply over the at least a portion of the forming surface of the forming tool.

21. A method of fabricating a composite structure, the method comprising steps of:

conveying a ply carrier to a lamination system using a carrier transfer device, wherein the ply carrier is magnetic;
selectively applying at least one composite ply to a ply support surface of the ply carrier using the lamination system;
conveying the ply carrier from the lamination system to a transfer system using the carrier transfer device;
removing the ply carrier from the carrier transfer device and applying the at least one composite ply to at least a portion of a forming surface of a forming tool using the transfer system, the transfer system comprising:
the transfer end effector and the placement end effector of claim 1; and
forming the at least one composite ply over the at least a portion of the forming surface of the forming tool using a forming system.

* * * * *